US007752052B2

(12) United States Patent
Oshikiri

(10) Patent No.: US 7,752,052 B2
(45) Date of Patent: Jul. 6, 2010

(54) SCALABLE CODER AND DECODER PERFORMING AMPLITUDE FLATTENING FOR ERROR SPECTRUM ESTIMATION

(75) Inventor: Masahiro Oshikiri, Yokohama (JP)

(73) Assignee: Panasonic Corporation, Osaka (JP)

( * ) Notice: Subject to any disclaimer, the term of this patent is extended or adjusted under 35 U.S.C. 154(b) by 877 days.

(21) Appl. No.: 10/512,407

(22) PCT Filed: Apr. 28, 2003

(86) PCT No.: PCT/JP03/05419

§ 371 (c)(1),
(2), (4) Date: Oct. 25, 2004

(87) PCT Pub. No.: WO03/091989

PCT Pub. Date: Nov. 6, 2003

(65) Prior Publication Data

US 2005/0163323 A1 Jul. 28, 2005

(30) Foreign Application Priority Data

Apr. 26, 2002 (JP) ............................ 2002-127541
Sep. 12, 2002 (JP) ............................ 2002-267436

(51) Int. Cl.
*G10L 19/00* (2006.01)
*G10L 19/14* (2006.01)
*G10L 11/06* (2006.01)
*G10L 19/02* (2006.01)
*H04N 11/02* (2006.01)

(52) U.S. Cl. ....................... 704/500; 704/207; 704/219; 704/220; 704/229; 704/501; 704/205; 375/240.03; 348/384.1

(58) Field of Classification Search ................. 704/219, 704/220, 207, 500, 501, 229
See application file for complete search history.

(56) References Cited

U.S. PATENT DOCUMENTS 5,649,053 A * 7/1997 Kim ........................... 704/229
5,819,213 A * 10/1998 Oshikiri et al. ............. 704/222
5,826,224 A * 10/1998 Gerson et al. ............... 704/222
6,092,041 A * 7/2000 Pan et al. .................... 704/229

(Continued)

FOREIGN PATENT DOCUMENTS

EP 1173028 1/2002

(Continued)

OTHER PUBLICATIONS

European Search Report dated Oct. 26, 2005.

(Continued)

*Primary Examiner*—David R Hudspeth
*Assistant Examiner*—Paras Shah
(74) *Attorney, Agent, or Firm*—Dickinson Wright PLLC

(57) ABSTRACT

A down-sampler 101 down-samples the sampling rate of an input signal from sampling rate FH to sampling rate FL. A base layer coder 102 encodes the sampling rate FL acoustic signal. A local decoder 103 decodes coding information output from base layer coder 102. An up-sampler 104 raises the sampling rate of the decoded signal to FH. A subtracter 106 subtracts the decoded signal from the sampling rate FH acoustic signal. An enhancement layer coder 107 encodes the signal output from subtracter 106 using a decoding result parameter output from local decoder 103.

14 Claims, 39 Drawing Sheets

U.S. PATENT DOCUMENTS

| | | | | |
|---|---|---|---|---|
| 6,122,338 | A | 9/2000 | Yamauchi | |
| 6,208,957 | B1 | 3/2001 | Nomura | |
| 6,438,525 | B1 * | 8/2002 | Park | 704/500 |
| 6,502,069 | B1 * | 12/2002 | Grill et al. | 704/219 |
| 6,611,798 | B2 * | 8/2003 | Bruhn et al. | 704/219 |
| 6,865,534 | B1 | 3/2005 | Murashima | |
| 6,871,106 | B1 * | 3/2005 | Ishikawa et al. | 700/94 |
| 7,013,268 | B1 * | 3/2006 | Gao | 704/219 |
| 2002/0107686 | A1 * | 8/2002 | Unno | 704/219 |
| 2003/0212551 | A1 * | 11/2003 | Rose et al. | 704/230 |

FOREIGN PATENT DOCUMENTS

| | | | |
|---|---|---|---|
| JP | 02266400 | | 10/1990 |
| JP | 8 46517 | | 2/1996 |
| JP | 08046517 | A * | 2/1996 |
| JP | 0 8263096 | | 10/1996 |
| JP | 1 0097295 | | 4/1998 |
| JP | 1 0105193 | | 4/1998 |
| JP | 1 130997 | | 2/1999 |
| JP | 1 1251917 | | 9/1999 |
| JP | 11251917 | A * | 9/1999 |
| JP | 1 1330977 | | 11/1999 |
| JP | 2000-3193 | | 1/2000 |
| JP | 2000322097 | A * | 11/2000 |
| JP | 2001 184098 | | 7/2001 |
| JP | 2001 228888 | | 8/2001 |
| JP | 2001 230675 | | 8/2001 |

OTHER PUBLICATIONS

International Search Report dated May 27, 2003.

Japanese Office Action dated Feb. 19, 2008 with partial English translation thereof.

Japanese Office Action dated Apr. 5, 2005 with English translation.

Japanese Office Action dated Apr. 18, 2006 with English translation.

* cited by examiner

| FREQUENCY (m) | ESTIMATED DISTORTION VALUE D(m) | ORDER |
|---|---|---|
| 1 | 24.0 | 5 |
| 3 | 16.8 | 7 |
| 4 | 35.9 | 3 |
| 7 | 147.2 | 1 |
| 8 | 135.8 | 2 |
| 9 | 26.9 | 4 |
| 11 | 23.0 | 6 |
| 12 | 12.9 | 8 |

FIG.34

SCALABLE CODER AND DECODER PERFORMING AMPLITUDE FLATTENING FOR ERROR SPECTRUM ESTIMATION

TECHNICAL FIELD

The present invention relates to a coding apparatus, decoding apparatus, coding method, and decoding method that perform highly efficient compression coding of an acoustic signal such as an audio signal or speech signal, and more particularly to a coding apparatus, decoding apparatus, coding method, and decoding method that are suitable for scalable coding and decoding that enable decoding of audio or speech even from a part of coding information.

BACKGROUND ART

A sound coding technology that compresses an audio signal or speech signal at a low bit rate is important for efficient utilization of radio in mobile communications and recording media. Methods for speech coding, in which a speech signal is coded, include G726 and G729 standardized by the ITU (International Telecommunication Union). These methods encode narrowband signals (300 Hz to 3.4 kHz), and enable high-quality coding at bit rates of 8 kbits/s to 32 kbits/s.

Standard methods for wideband signals (50 Hz to 7 kHz) include the ITU's G722 and G722.1, and AMR-WB of 3GPP (The 3rd Generation Partnership Project). These methods enable high-quality coding of wideband speech signals at bit rates of 6.6 kbits/s to 64 kbits/s.

An effective method of performing highly efficient coding of speech signals at a low bit rate is CELP (Code Excited Linear Prediction). CELP is a method whereby coding is performed based on a model that simulates through engineering a human voice generation model. To be specific, in CELP, an excitation signal which consists of random values is passed to a pitch filter corresponding to the strength of periodicity and a synthesis filter corresponding to vocal tract characteristics, and coding parameters are determined so that the square error between the output signal and input signal is minimized under auditory characteristic weighting.

In many of the latest standard speech coding methods, coding is performed based on CELP. For example, G729 enables narrowband signal coding at 8 kbits/s, and AMR-WB enables narrowband signal coding at 6.6 kbits/s to 23.85 kbits/s.

Meanwhile, in the case of audio coding that encodes audio signals, methods that convert an audio signal to frequency domain and perform coding using an auditory psychoacoustic model are commonly used, such as the Layer III method and AAC method standardized by MPEG (Moving Picture Experts Group). It is known that with these methods, almost no degradation occurs at 64 kbits/s to 96 kbits/s per channel for a signal with a 44.1 kHz sampling rate.

This audio coding is a method whereby high-quality coding is performed on music. Audio coding can also perform high-quality coding for a speech signal with music or environmental sound in the background as described above, and can handle a signal band of approximately 22 kHz, which is CD quality.

However, when coding is performed using a speech coding method on a signal in which a speech signal is predominant and music or environmental sound is superimposed in the background, there is a problem in that, due to the background music or environmental sound, not only the background signal but also the speech signal degrades, and overall quality deteriorates.

This problem occurs because speech coding methods are based on a method specialized toward a CELP speech model. There is a problem in that speech coding methods can only handle signal bands up to 7 kHz, and a signal that has components in higher bands cannot be handled adequately in terms of composition.

Moreover, with an audio coding method, a high bit rate must be used in order to achieve high-quality coding. With an audio coding method, if coding should be performed with the bit rate held down to 32 kbits/s, there is a problem of a major deterioration of decoded signal quality. There is thus a problem in that use is not possible on a communication network with a low transmission rate.

DISCLOSURE OF INVENTION

It is an object of the present invention to provide a coding apparatus, decoding apparatus, coding method, and decoding method that enable high-quality coding and decoding at a low bit rate even of a signal in which a speech signal is predominant and music or environmental sound is superimposed in the background.

This object is achieved by having two layers, a base layer and an enhancement layer, performing high-quality coding at a low bit rate of an input signal narrowband or wideband frequency region based on CELP in the base layer, and performing coding in the enhancement layer of background music or environmental sound that cannot be represented in the base layer, and also signals with higher frequency components than the frequency region covered by the base layer.

BRIEF DESCRIPTION OF DRAWINGS

FIG. 34 is a drawing showing an example of ranking of estimated distortion values by a ordering section of the above embodiment;

BEST MODE FOR CARRYING OUT THE INVENTION

Essentially, the present invention has two layers, a base layer and an enhancement layer, performs high-quality coding at a low bit rate of an input signal narrowband or wideband frequency region based on CELP in the base layer, and then performs coding in the enhancement layer of background music or environmental sound that cannot be represented in the base layer, and also signals with higher frequency components than the frequency region covered by the base layer, with the enhancement layer having a configuration that enables handling of all signals as with an audio coding method.

By this means, it is possible to perform efficient coding of background music or environmental sound that cannot be represented in the base layer, and also signals with higher frequency components than the frequency region covered by the base layer. A feature of the present invention is that, at this time, enhancement layer coding is performed using information obtained by base layer coding information. By this means, an effect is obtained of being able to keep down the number of enhancement layer coded bits.

With reference now to the accompanying drawings, embodiments of the present invention will be explained in detail below.

Embodiment 1

Figure 1:
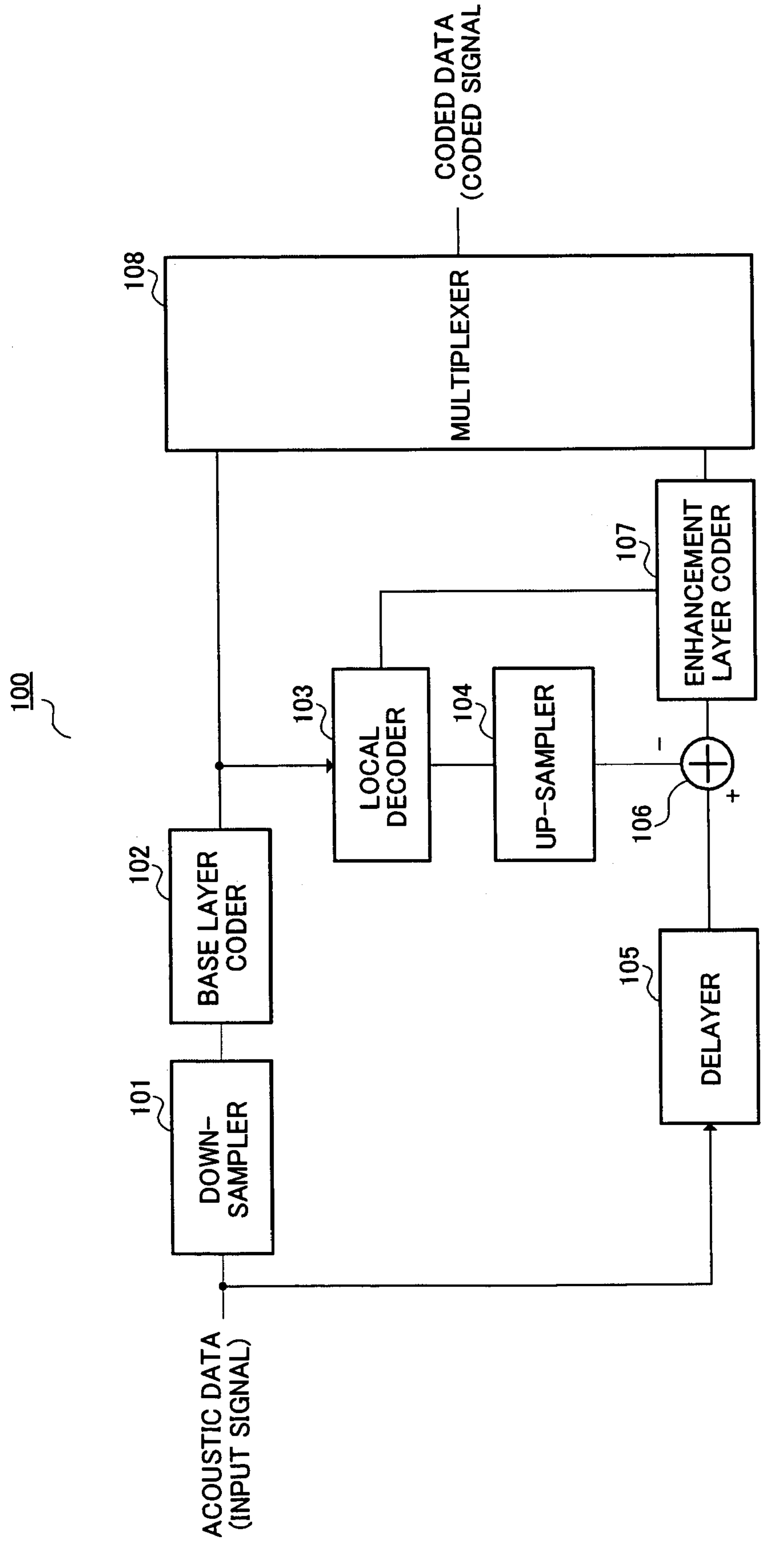
FIG. 1 is a block diagram showing the configuration of a signal processing apparatus according to Embodiment 1 of the present invention.

FIG. 1 is a block diagram showing the configuration of a signal processing apparatus according to Embodiment 1 of the present invention. Signal processing apparatus 100 in FIG. 1 mainly comprises a down-sampler 101, base layer coder 102, local decoder 103, up-sampler 104, delayer 105, subtracter 106, enhancement layer coder 107, and multiplexer 108.

Down-sampler 101 down-samples the input signal sampling rate from sampling rate FH to sampling rate FL, and outputs the sampling rate FL acoustic signal to base layer coder 102. Here, sampling rate FL is a lower frequency than sampling rate FH.

Base layer coder 102 encodes the sampling rate FL acoustic signal and outputs the coding information to local decoder 103 and multiplexer 108.

Local decoder 103 decodes the coding information output from base layer coder 102, outputs the decoded signal to up-sampler 104, and outputs parameters obtained from the decoded result to enhancement layer coder 107.

Up-sampler 104 raises the decoded signal sampling rate to FH, and outputs the result to subtracter 106.

Delayer 105 delays the input sampling rate FH acoustic signal by a predetermined time, then outputs the signal to subtracter 106. By making this delay time equal to the time delay arising in down-sampler 101, base layer coder 102, local decoder 103, and up-sampler 104, phase shift is prevented in the following subtraction processing.

Subtracter 106 subtracts the decoded signal from the sampling rate FH acoustic signal, and outputs the result of the subtraction to enhancement layer coder 107.

Enhancement layer coder 107 encodes the signal output from subtracter 106 using the decoding result parameters output from local decoder 103, and outputs the resulting signal to multiplexer 108. Multiplexer 108 multiplexes and outputs the signals coded by base layer coder 102 and enhancement layer coder 107.

Figure 2:
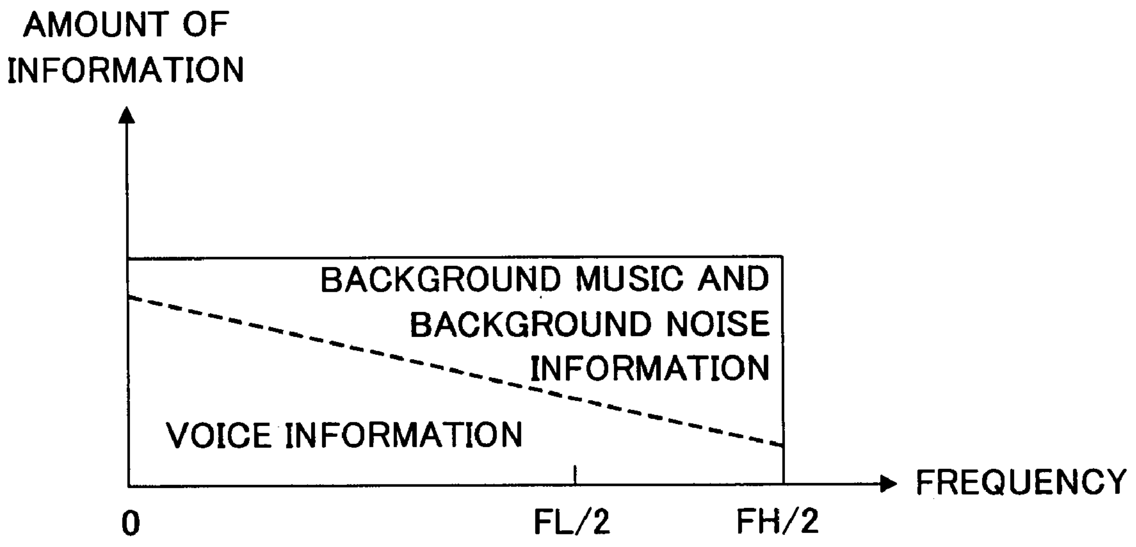
FIG. 2 is a drawing showing an example of input signal components.

Base layer coding and enhancement layer coding will now be explained. FIG. 2 is a drawing showing an example of input signal components. In FIG. 2, the vertical axis indicates the signal component information amount, and the horizontal axis indicates frequency. FIG. 2 shows the frequency bands in which speech information and background music/background noise information contained in the input signal are present.

In the case of speech information, there is a large amount of information in the low frequency region, and the amount of information decreases the higher the frequency region. Conversely, in the case of background music and background noise information, there is comparatively little information in the lower region compared with speech information, and a large amount of information in the higher region.

Thus, a signal processing apparatus of the present invention uses a plurality of coding methods, and performs different coding for each region for which the respective coding methods are appropriate.

Figure 3:
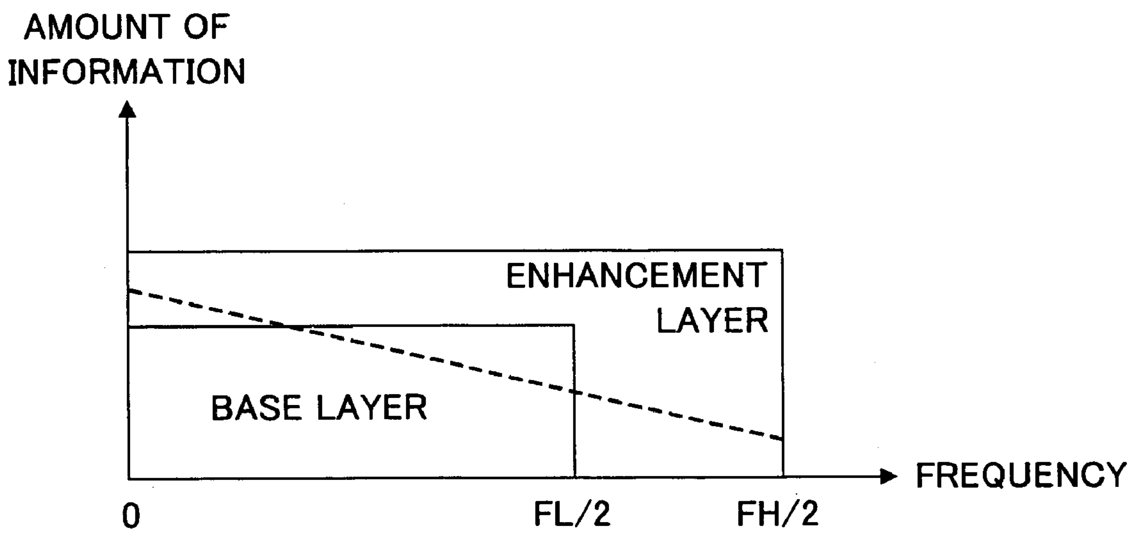
FIG. 3 is a drawing showing an example of a signal processing method of a signal processing apparatus according to the above embodiment.

FIG. 3 is a drawing showing an example of a signal processing method of a signal processing apparatus according to this embodiment. In FIG. 3, the vertical axis indicates the signal component information amount, and the horizontal axis indicates frequency.

Base layer coder 102 is designed to represent efficiently speech information in the frequency band from 0 to FL, and can perform good-quality coding of speech information in this region. However, the coding quality of background music and background noise information in the frequency band from 0 to FL is not high. Enhancement layer coder 107 encodes portions that cannot be coded by base layer coder 102, and signals in the frequency band from FL to FH.

Thus, by combining base layer coder 102 and enhancement layer coder 107, it is possible to achieve high-quality coding in a wide band. Moreover, a scalable function can be implemented whereby speech information can be decoded even with only coding information of at least a base layer coding section.

In this way, a useful parameter from among those generated by coding in local decoder 103 is supplied to enhancement layer coder 107, and enhancement layer coder 107 performs coding using this parameter.

As this parameter is generated from coding information, when a signal coded by a signal processing apparatus of this embodiment is decoded, the same parameter can be obtained in the sound decoding process, and it is not necessary to add this parameter for transmission to the decoding side. As a result, the enhancement layer coding section can achieve efficient coding processing without incurring an increase in additional information.

For example, there is a configuration whereby, of the parameters decoded by local decoder 103, a voiced/unvoiced flag, indicating whether an input signal is a signal with marked periodicity such as a vowel or a signal with marked noise characteristics such as a consonant, is used as a parameter employed by enhancement layer coder 107. It is possible to perform adaptation using the voiced/unvoiced flag, such as performing bit allocation stressing the lower region more than the higher region in the enhancement layer in a voiced section, and performing bit allocation stressing the higher region more than the lower region in an unvoiced section.

Thus, according to a signal processing apparatus of this embodiment, by extracting components not exceeding a predetermined frequency from an input signal and performing coding suitable for speech coding, and performing coding suitable for audio coding using the results of decoding the obtained coding information, it is possible to perform high-quality coding at a low bit rate.

For sampling rates FH and FL, it is only necessary for FH to be higher value than FL, and there are no restrictions on the values. For example, coding can be performed with sampling rates of FH=24 kHz and FL=16 kHz.

Embodiment 2

In this embodiment an example is described in which, of the parameters decoded by local decoder 103 of Embodiment 1, LPC coefficients indicating the input signal spectrum is used as a parameter utilized by enhancement layer coder 107.

A signal processing apparatus of this embodiment performs coding using CELP in base layer coder 102 in FIG. 1, and performs coding using LPC coefficients indicating the input signal spectrum in enhancement layer coder 107.

A detailed description of the operation of base layer coder 102 will first be given, followed by a description of the basic configuration of enhancement layer coder 107. The "basic configuration" mentioned here is intended to simplify the descriptions of subsequent embodiments, and denotes a configuration that does not use local decoder 103 coding parameters. Thereafter, a description is given of enhancement layer coder 107, which uses the LPC coefficients decoded by local decoder 103, this being a feature of this embodiment.

Figure 4:
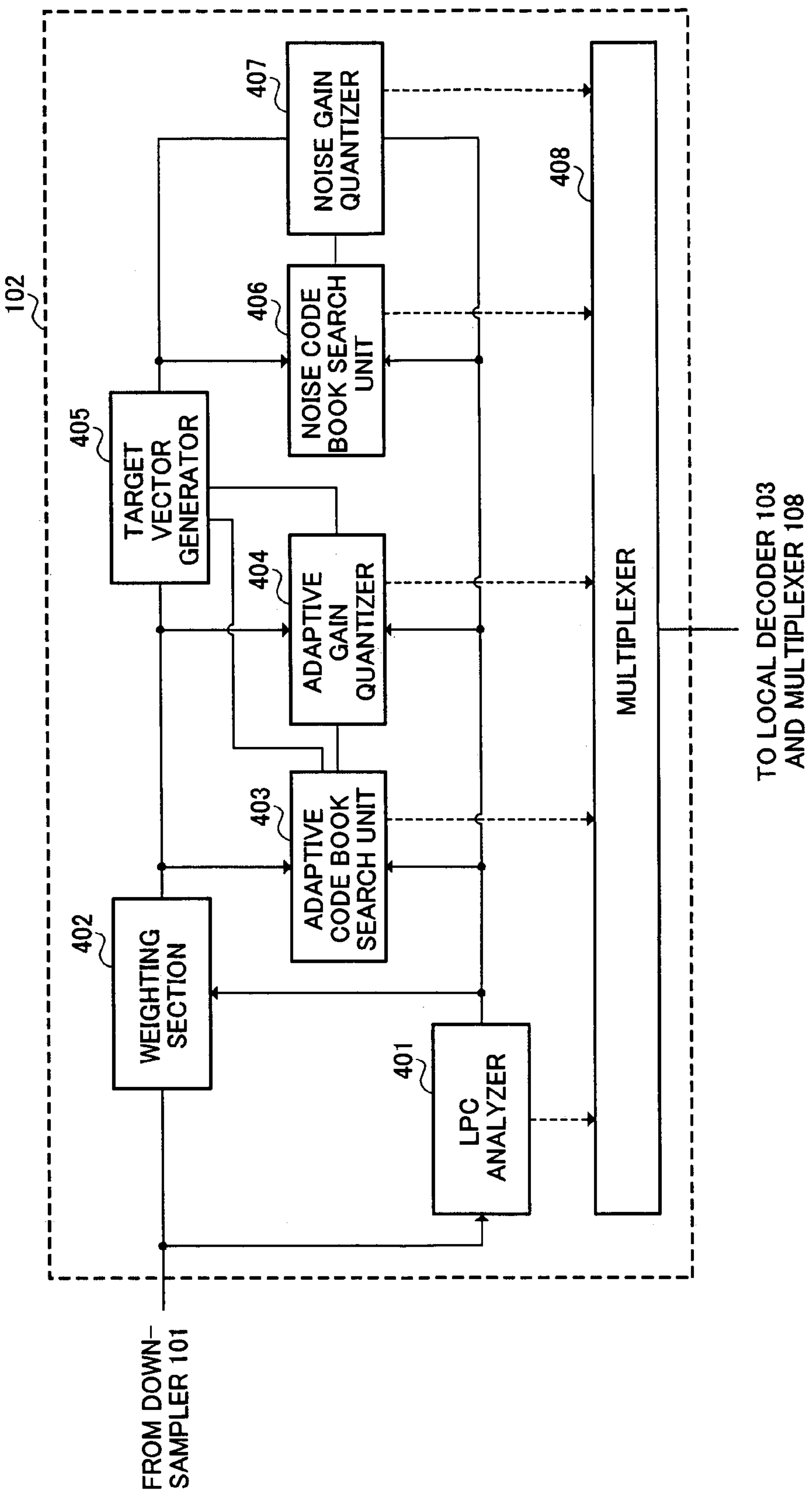
FIG. 4 is a drawing showing an example of the configuration of a base layer coder.

FIG. 4 is a drawing showing an example of the configuration of base layer coder 102. Base layer coder 102 mainly comprises an LPC analyzer 401, weighting section 402, adaptive code book search unit 403, adaptive gain quantizer 404, target vector generator 405, noise code book search unit 406, noise gain quantizer 407, and multiplexer 408.

LPC analyzer 401 obtains LPC coefficients from the input signal sampled at sampling rate FL by down-sampler 101, and outputs these LPC coefficients to weighting section 402.

Weighting section 402 performs weighting on the input signal based on the LPC coefficients obtained by LPC analyzer 401, and outputs the weighted input signal to adaptive code book search unit 403, adaptive gain quantizer 404, and target vector generator 405.

Adaptive code book search unit 403 carries out an adaptive code book search with the weighted input signal as the target signal, and outputs the retrieved adaptive vector to adaptive gain quantizer 404 and target vector generator 405. Adaptive code book search unit 403 then outputs the code of the adaptive vector determined to have the least quantization distortion to multiplexer 408.

Adaptive gain quantizer 404 quantizes the adaptive gain that is multiplied by the adaptive vector output from adaptive code book search unit 403, and outputs the result to target vector generator 405. This code is then output to multiplexer 408.

Target vector generator 405 performs vector subtraction of the input signal output from weighting section 402 from the result of multiplying the adaptive vector by the adaptive gain, and outputs the result of the subtraction to noise code book search unit 406 and noise gain quantizer 407 as the target vector.

Noise code book search unit 406 retrieves from a noise code book the noise vector for which distortion relative to the target vector output from target vector generator 405 is smallest. Noise code book search unit 406 then supplies the retrieved noise vector to noise gain quantizer 407 and also outputs that code to multiplexer 408.

Noise gain quantizer 407 quantizes noise gain that is multiplied by the noise vector retrieved by noise code book search unit 406, and outputs that code to multiplexer 408.

Multiplexer 408 multiplexes the LPC coefficients, adaptive vector, adaptive gain, noise vector, and noise gain coding information, and outputs the resulting signal to local decoder 103 and multiplexer 108.

Next, the operation of base layer coder 102 in FIG. 4 will be described. First, a sampling rate FL signal output from down-sampler 101 is input, and LPC coefficients are obtained by LPC analyzer 401. The LPC coefficients are converted to a parameter suitable for quantization such as LSP coefficients, and quantized. The coding information obtained by this quantization is supplied to multiplexer 408, and the quantized LSP coefficients are calculated from the coding information and converted to LPC coefficients.

By means of this quantization, the quantized LPC coefficients are obtained. Using the quantized LPC coefficients, adaptive code book, adaptive gain, noise code book, and noise gain coding is performed.

Weighting section 402 then performs weighting on the input signal based on the LPC coefficients obtained by LPC analyzer 401. The purpose of this weighting is to perform spectrum shaping so that the quantization distortion spectrum is masked by the spectral envelope of the input signal.

The adaptive code book is then searched by adaptive code book search unit 403 with the weighted input signal as the target signal. A signal in which a past excitation sequence is repeated on a pitch period basis is called an adaptive vector, and an adaptive code book is composed of adaptive vectors generated at pitch periods of a predetermined range.

If a weighted input signal is designated t(n), and a signal in which an impulse response of a weighted synthesis filter comprising the LPC coefficients is convoluted to the adaptive vector of pitch period i is designated pi(n), then pitch period i of the adaptive vector for which evaluation function D of Equation (1) below is minimized is sent to multiplexer 408 as a parameter.

$$D = \sum_{n=0}^{N-1} t^2(n) - \frac{\left(\sum_{n=0}^{N-1} t(n)pi(n)\right)^2}{\sum_{n=0}^{N-1} pi^2(n)} \tag{1}$$

Here, N indicates the vector length.

Next, quantization of the adaptive gain that is multiplied by the adaptive vector is performed by adaptive gain quantizer 404. Adaptive gain β is expressed by Equation (2). This β value undergoes scalar quantization, and the resulting code is sent to multiplexer 408.

$$\beta = \frac{\sum_{n=0}^{N-1} t(n)pi(n)}{\sum_{n=0}^{N-1} pi^2(n)} \tag{2}$$

The effect of the adaptive vector is then subtracted from the input signal by target vector generator 405, and the target vector used by noise code book search unit 406 and noise gain quantizer 407 is generated. If pi(n) here designates a signal in which the synthesis filter is convoluted to the adaptive vector when evaluation function D expressed by Equation (1) is minimized, and βq designates the quantization value when adaptive vector β expressed by Equation (2) undergoes scalar quantization, then target vector t2(*n*) is expressed by Equation (3) below.

$$t2(n)=t(n)-\beta q\cdot pi(n) \tag{3}$$

Aforementioned target vector t2(*n*) and the LPC coefficients are supplied to noise code book search unit 406, and a noise code book search is carried out.

Here, a typical composition of the noise code book with which noise code book search unit 406 is provided is algebraic. In an algebraic code book, an amplitude 1 pulse is represented by a vector that has only a predetermined extremely small number. Also, with an algebraic code book, positions that can be held for each phase are decided beforehand so as not to overlap. Thus, a feature of an algebraic code book is that an optimal combination of pulse position and pulse code (polarity) can be determined by a small amount of computation.

If the target vector is designated t2(*n*), and a signal in which an impulse response of a weighted synthesis filter is convoluted to the noise vector corresponding to code j is designated cj(n), then index j of the noise vector for which evaluation function D of Equation (4) below is minimized is sent to multiplexer 408 as a parameter.

$$D = \sum_{n=0}^{N-1} t2^2(n) - \frac{\left(\sum_{n=0}^{N-1} t2(n)cj(n)\right)^2}{\sum_{n=0}^{N-1} cj^2(n)} \tag{4}$$

Next, quantization of the noise gain that is multiplied by the noise vector is performed by noise gain quantizer 407. Adaptive gain γ is expressed by Equation (5). This γ value undergoes scalar quantization, and the resulting code is sent to multiplexer 408.

$$\gamma = \frac{\sum_{n=0}^{N-1} t2(n)cj(n)}{\sum_{n=0}^{N-1} cj^2(n)} \tag{5}$$

Multiplexer 408 multiplexes the sent LPC coefficients, adaptive code book, adaptive gain, noise code book, and noise gain coding information, and outputs the resulting signal to local decoder 103 and multiplexer 108.

The above processing is repeated while there is a new input signal. When there is no new input signal, processing is terminated.

Figure 5:
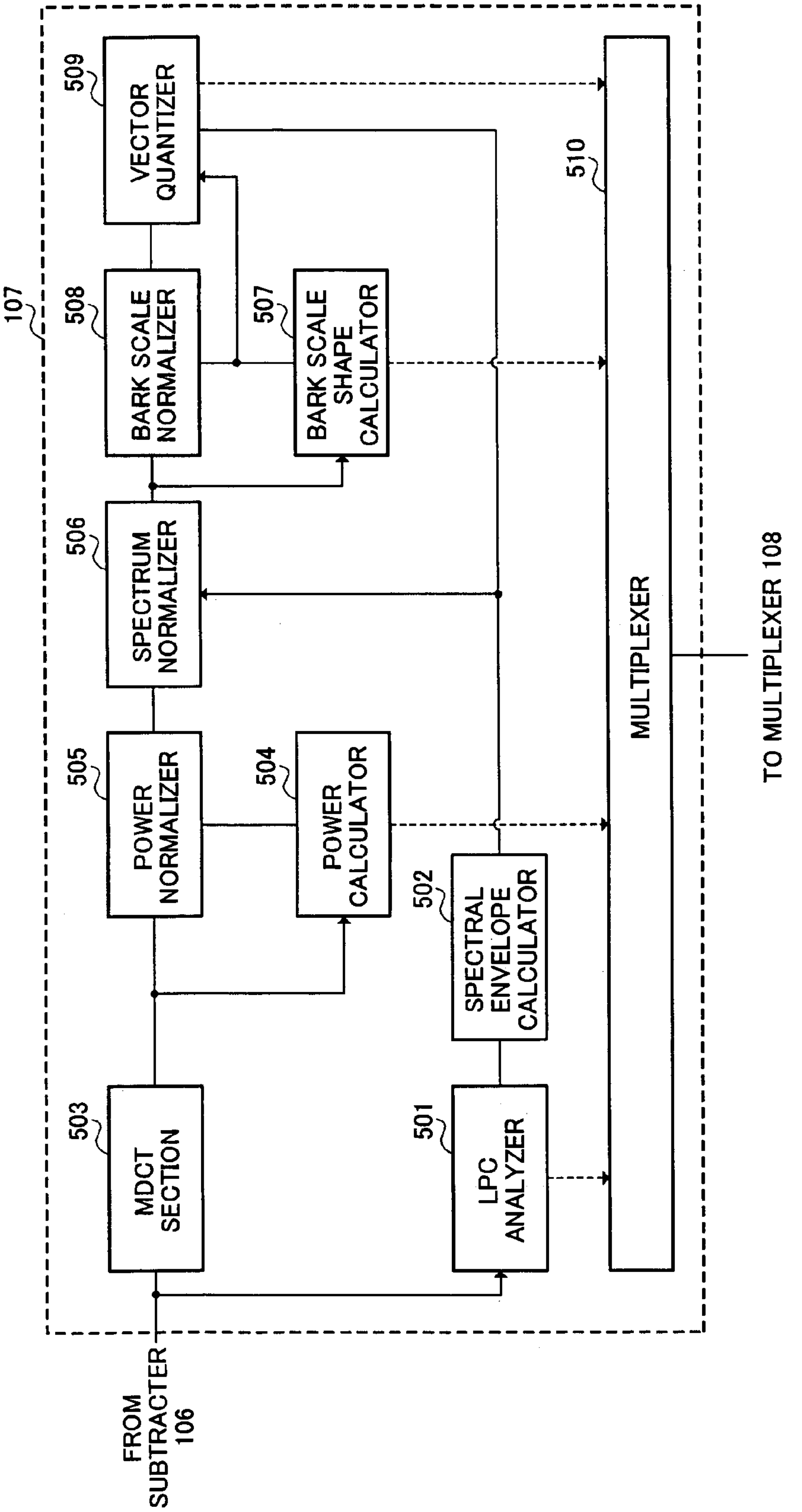
FIG. 5 is a drawing showing an example of the configuration of an enhancement layer coder.

Enhancement layer coder 107 will now be described. FIG. 5 is a drawing showing an example of the configuration of enhancement layer coder 107. Enhancement layer coder 107 in FIG. 5 mainly comprises an LPC analyzer 501, spectral envelope calculator 502, MDCT section 503, power calculator 504, power normalizer 505, spectrum normalizer 506, Bark scale normalizer 508, Bark scale shape calculator 507, vector quantizer 509, and multiplexer 510.

LPC analyzer 501 performs LPC analysis on an input signal. And the LPC analyzer 501 quantizes the LPC coefficients effectively in the domain of LSP or other adequate parameter for quantization, and the LPC analyzer outputs the coding information to multiplexer, and the LPC analyzer outputs the quantized LPC coefficients to spectral envelope calculator 502. Spectral envelope calculator 502 calculates a spectral envelope from the quantized LPC coefficients, and outputs this spectral envelope to vector quantizer 509.

MDCT section 503 performs MDCT (Modified Discrete Cosine Transform) processing on the input signal, and outputs the obtained MDCT coefficients to power calculator 504 and power normalizer 505. Power calculator 504 finds and quantizes the power of the MDCT coefficients, and outputs the quantized power to power normalizer 505 and the coding information to multiplexer 510.

Power normalizer 505 normalizes the MDCT coefficients with the quantized power, and outputs the power-normalized MDCT coefficients to spectrum normalizer 506. Spectrum normalizer 506 normalizes the MDCT coefficients normalized according to the power using the spectral envelope, and outputs the normalized MDCT coefficients to Bark scale shape calculator 507 and Bark scale normalizer 508.

Bark scale shape calculator 507 calculates the shape of a spectrum band-divided at equal intervals by means of a Bark scale, then quantizes this spectrum shape, and outputs the quantized spectrum shape to Bark scale normalizer 508, vector quantizer 509. And the bark scale shape calculator 507 outputs the coding information to multiplexer 510.

Bark scale normalizer normalizes the normalized MDCT coefficients using quantized bark scale shape, which it outputs to vector quantizer 509.

Vector quantizer 509 performs vector quantization of the normalized MDCT coefficients output from Bark scale normalizer 508, finds the code-vector at which distortion is smallest, and outputs the index of the code-vector to multiplexer 510 as coding information.

Multiplexer 510 multiplexes all of the coding information, and outputs the resulting signal to multiplexer 108.

The operation of enhancement layer coder 107 in FIG. 5 will now be described. The subtraction signal obtained by subtracter 106 in FIG. 1 undergoes LPC analysis by LPC analyzer 501. Then the LPC coefficients are calculated by LPC analysis. The LPC coefficients are converted to a parameter suitable for quantization such as LSP coefficients, after which quantization is performed. Coding information related to the LPC coefficients obtained here is supplied to multiplexer 510.

Spectral envelope calculator 502 calculates a spectral envelope in accordance with Equation (6) below, based on the decoded LPC coefficients.

$$env(m) = \left| \frac{1}{1 - \sum_{i=1}^{NP} \alpha_q(i) e^{-j\frac{2\pi mi}{M}}} \right| \quad (6)$$

Here, αq denotes the decoded LPC coefficients, NP indicates the order of the LPC coefficients, and M the spectral resolution. Spectral envelope env(m) obtained by means of Equation (6) is used by spectrum normalizer 506 and vector quantizer 509 described later herein.

The input signal then undergoes MDCT processing in MDCT section 503, and the MDCT coefficients are obtained. A feature of MDCT processing is that frame boundary distortion does not occur because of the use of an orthogonal base whereby the analysis frame of successive frames are completely superimposed one-half at a time, and the first half of the analysis frame is an odd function while the latter half of the analysis frame is an even function. When MDCT processing is performed, the input signal is multiplied by a window function such as a sin window. Designating the MDCT coefficients X(m), the MDCT coefficients are calculated in accordance with Equation (7) below.

$$X(m) = \sqrt{\frac{1}{N}} \sum_{n=0}^{2N-1} x(n) \cos\left\{\frac{(2n+1+N)\cdot(2m+1)\pi}{4N}\right\} \quad (7)$$

Here, x(n) indicates the signal when the input signal is multiplied by a window function.

Next, power calculator 504 finds and quantizes the power of MDCT coefficients X(m). Power normalizer 505 then normalizes the MDCT coefficients with the power after that quantization using Equation (8).

$$pow = \sum_{m=0}^{M-1} X(m)^2 \quad (8)$$

Here, M indicates the size of the MDCT coefficients. After MDCT coefficient power pow has been quantized, the coding information is sent to multiplexer 510. The power of the MDCT coefficients is decoded using the coding information, and the MDCT coefficients are normalized in accordance with Equation (9) below using the resulting value.

$$X1(m) = \frac{X(m)}{\sqrt{powq}} \quad (9)$$

Here, X1(*m*) represents the MDCT coefficients after power normalization, and powq indicates the power of the MDCT coefficients after quantization.

Spectrum normalizer 506 then normalizes the MDCT coefficients that has been normalized according to power using the spectral envelope. Spectrum normalizer 506 performs normalization in accordance with Equation (10) below.

$$X2(m) = \frac{X1(m)}{env(m)} \quad (10)$$

Next, Bark scale shape calculator 507 calculates the shape of a spectrum band-divided at equal intervals by means of a Bark scale, then quantizes this spectrum shape. Bark scale shape calculator 507 sends this coding information to multiplexer 510, and also performs normalization of MDCT coefficients X2(*m*), which is the output signal from spectrum normalizer 506, using the decoded value. The correspondence between the Bark scale and Herz scale is given by the conversion expression represented by Equation (11) below.

$$B = 13\tan^{-1}(0.76f) = 3.5\tan^{-1}\left(\frac{f}{7.5}\right) \quad (11)$$

Here, B indicates the Bark scale and f the Herz scale. Bark scale shape calculator 507 calculates a shape in accordance with Equation (12) below for the sub-bands band-divided at equal intervals on the Bark scale.

$$B(k) = \sum_{m=fl(k)}^{fh(k)} X2(m)^2 \quad 0 \le k < K \quad (12)$$

Here, fl(k) indicates the lowest frequency of the k'th sub-band and fh(k) the highest frequency of the k'th sub-band, and K indicates the number of sub-bands.

Bark scale shape calculator 507 then quantizes Bark scale shape B(k) of each band and sends the coding information to multiplexer 510, and also decodes the Bark scale shape and supplies the result to Bark scale normalizer 508 and vector quantizer 509. Using the Bark scale shape after normalization, Bark scale normalizer 508 generates normalized MDCT coefficients X3($m$) in accordance with Equation (13) below.

$$X3(m) = \frac{X2(m)}{\sqrt{B_q(k)}} \quad fl(k) \le m \le fh(k) \quad 0 \le k < K \quad (13)$$

Here, Bq(k) indicates the Bark scale shape after quantization of the k'th sub-band.

Next, vector quantizer 509 performs vector quantization of Bark scale normalizer 508 output X3($m$) Vector quantizer 509 divides X3($m$) into a plurality of vectors and finds the code-vector at which distortion is smallest using a code book corresponding to each vector, and sends this index to multiplexer 510 as coding information.

When performing vector quantization, vector quantizer 509 determines two important parameters using input signal spectrum information. One of these parameters is quantization bit allocation, and the other is code book search weighting. Quantization bit allocation is determined using spectral envelope env(m) obtained by spectral envelope calculator 502.

When quantization bit allocation is determined using spectral envelope env(m), a setting can also be made so that the number of bits allocated in the spectrum corresponding to frequencies 0 to FL is made small.

One example of implementation of this is a method whereby the maximum number of bits that can be allocated in frequencies 0 to FL, MAX_LOWBAND_BIT, is set, and a restriction is imposed so that the maximum number of bits allocated in this band does not exceed maximum number of bits MAX_LOWBAND_BIT.

In this implementation example, since coding has already been performed in the base layer at frequencies 0 to FL, it is not necessary to allocate a large number of bits, and overall quality can be improved by performing quantization with quantization in this band intentionally made coarse and bit allocation kept low, and the extra bits being allocated to frequencies FL to FH. A configuration may also be used where by this bit allocation is determined by combining spectral envelope env(m) and aforementioned Bark scale shape Bq(k).

Vector quantization is performed using a distortion measure employing spectral envelope env(m) obtained by spectral envelope calculator 502 and weighting calculated from quantized Bark scale shape Bq(k) obtained by Bark scale shape calculator 507. Vector quantization is implemented by finding index j of code vector C for which distortion D stipulated by Equation (14) below is minimal.

$$D = \sum_m w(m)^2 (C_j(m) - X3(m))^2 \quad (14)$$

Here, w(m) indicates the weighting function.

Weighting function w(m) can be expressed as shown in Equation (15) below using spectral envelope env(m) and Bark scale shape Bq(k).

$$w(m) = (env(m) \cdot Bq(\text{Herz\_to\_Bark}(m)))^p \quad (15)$$

Here, p indicates a constant between 0 and 1, and Herz_to_Bark( ) indicates a function that converts from the Herz scale to Bark scale.

When weighting function w(m) is determined, it is also possible to make a setting so that the weighting function for bit allocation to the spectrum corresponding to frequencies 0 to FL is made small. One example of implementation of this is a method whereby the maximum value possible for weighting function w(m) corresponding to frequencies 0 to FL is set below as MAX_LOWBAND_WGT, and a restriction is imposed so that the value of weighting function w(m) for this band does not exceed MAX_LOWBAND_WGT. In this implementation example, coding has already been performed in the base layer at frequencies 0 to FL, and overall quality can be improved by intentionally lowering the quantization precision in this band and relatively raising the quantization precision for frequencies FL to FH.

Lastly, multiplexer 510 multiplexes the coding information and outputs the resultant signal to multiplexer 108. The above processing is repeated while there is a new input signal. When there is no new input signal, processing is terminated.

Thus, according to a signal processing apparatus of this embodiment, by extracting components not exceeding a predetermined frequency from an input signal and performing coding using code excited linear prediction, and performing coding by MDCT processing using the results of decoding obtained coding information, it is possible to perform high-quality coding at a low bit rate.

An example has been described above in which the LPC coefficients are analyzed from a subtraction signal obtained by subtracter 106, but a signal processing apparatus of the present invention may also perform decoding using the LPC coefficients decoded by local decoder 103.

Figure 6:
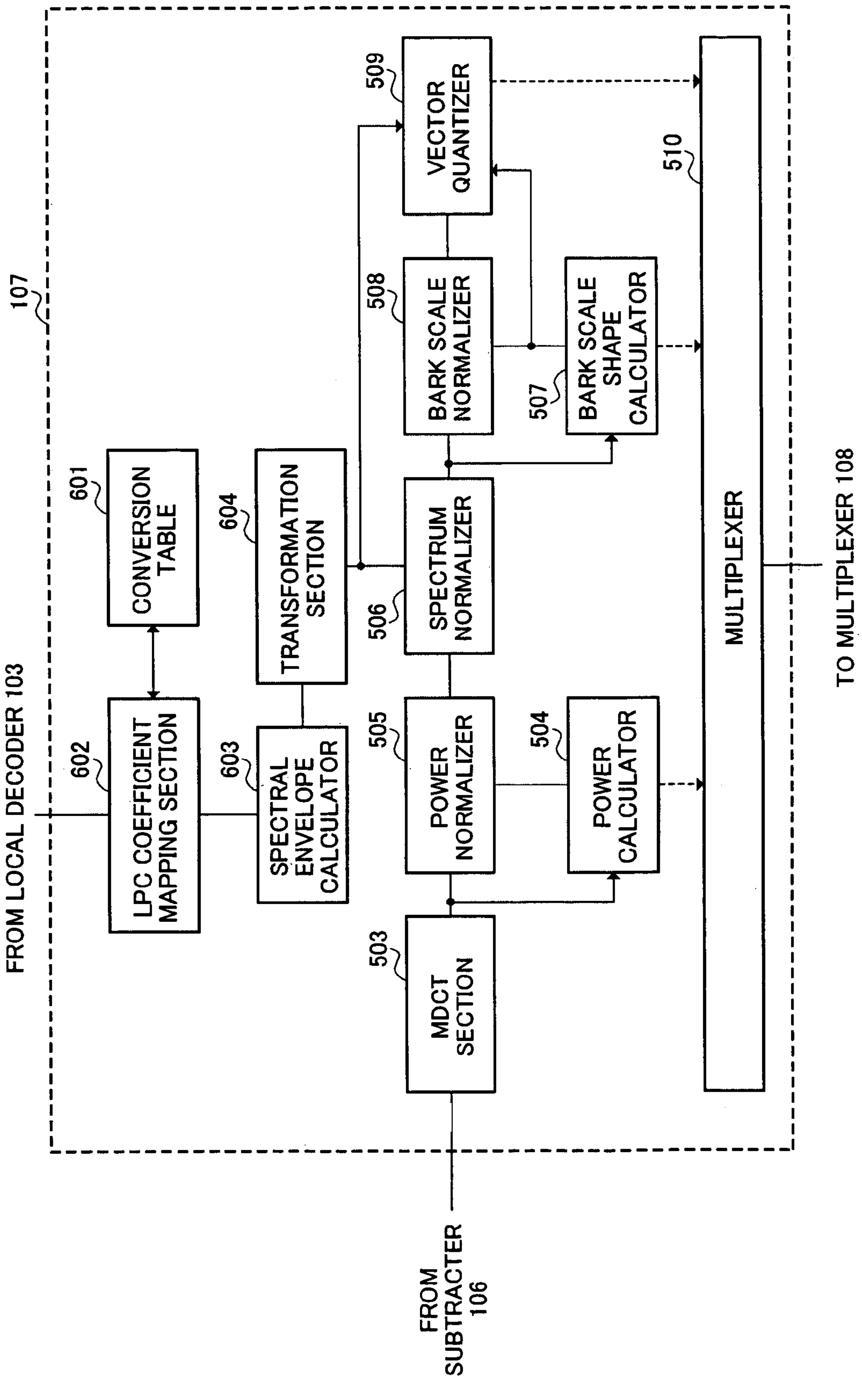
FIG. 6 is a drawing showing an example of the configuration of an enhancement layer coder.

FIG. 6 is a drawing showing an example of the configuration of enhancement layer coder 107. Parts in FIG. 6 identical to those in FIG. 5 are assigned the same reference numerals as in FIG. 5 and detailed descriptions thereof are omitted.

Enhancement layer coder 107 in FIG. 6 differs from enhancement layer coder 107 in FIG. 5 in being provided with a conversion table 601, LPC coefficient mapping section 602, spectral envelope calculator 603, and transformation section 604, and performing coding using the LPC coefficients decoded by local decoder 103.

Conversion table 601 stores base layer LPC coefficients and enhancement layer LPC coefficients with the correspondence therebetween indicated.

LPC coefficient mapping section 602 references conversion table 601, converts the base layer LPC coefficients input from local decoder 103 to the enhancement layer LPC coefficients, and outputs the enhancement layer LPC coefficients to spectral envelope calculator 603.

Spectral envelope calculator 603 obtains a spectral envelope based on the enhancement layer LPC coefficients, and outputs this spectral envelope to transformation section 604. Transformation section 604 transforms the spectral envelope and outputs the result to spectrum normalizer 506 and vector quantizer 509.

The operation of enhancement layer coder 107 in FIG. 6 will now be described. The base layer LPC coefficients are found for signals in signal band 0 to FL, and does not coincide with the LPC coefficients used by an enhancement layer signal (signal band 0 to FH). However, there is a strong correlation between the two. Therefore, in LPC coefficient mapping section 602, a conversion table 601 is separately designed in advance, showing the correspondence between LPC coefficients for signal band 0 to FL signals and signal band 0 to FH signals, using this correlation. This conversion table 601 is used to find the enhancement layer LPC coefficients from the base layer LPC coefficients.

Figure 7:
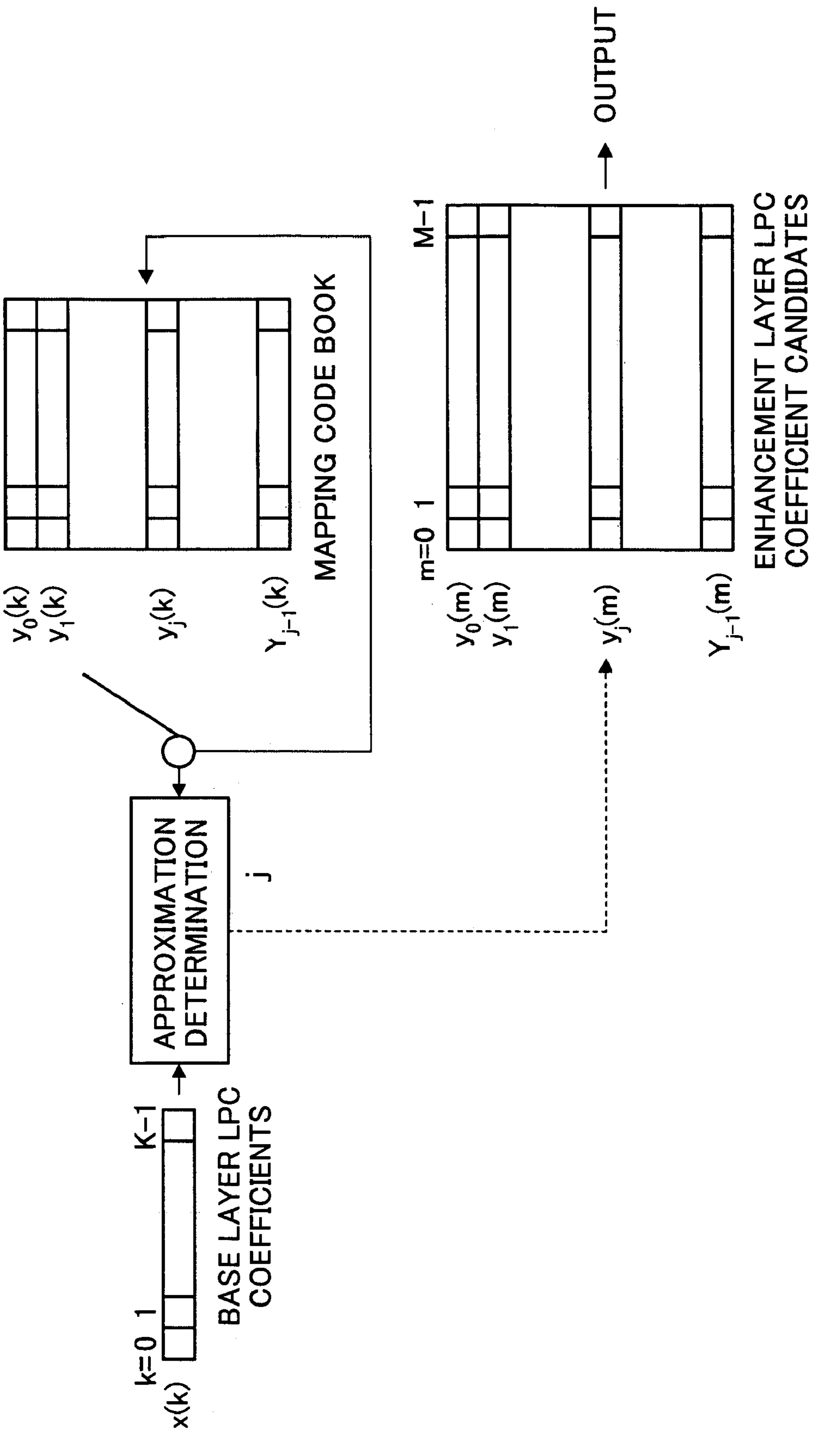
FIG. 7 is a drawing showing an example of LPC coefficient calculation in enhancement layer.

FIG. 7 is a drawing showing an example of enhancement layer LPC coefficient calculation. Conversion table 601 is composed of J candidates {Yj(m)} indicating the enhancement layer LPC coefficients (order M), and candidates {yj (k)} that have the same order (=K) as the base layer LPC coefficients assigned correspondence to {Yj(m)}. {Yj(m)} and {yj(k)} are designed and provided beforehand from large-scale audio and speech data, etc. When base layer LPC coefficients x(k) are input, the sequence of the LPC coefficients most similar to x(k) is found from among {yj(k)}. By outputting enhancement layer LPC coefficients Yj(m) corresponding to index j of the LPC coefficients determined to be most similar, it is possible to implement mapping of the enhancement layer LPC coefficients from base layer LPC coefficients.

Next, spectral envelope calculator 603 obtains a spectral envelope based on the enhancement layer LPC coefficients found in this way. Then this spectral envelope is transformed by transformation section 604. This transformed spectral envelope is then regarded as a spectral envelope of the implementation example described above, and is processed accordingly.

One example of implementation of transformation section 604 that transforms a spectral envelope is processing whereby the effect of a spectral envelope corresponding to signal band 0 to FL subject to base layer coding is made small. If the spectral envelope is designated env(m), transformed spectral envelope env'(m) is expressed by Equation (16) below.

$$env'(m) = \begin{cases} env(m)^p & \text{if } 0 \le m \le Fl \\ env(m) & \text{else} \end{cases} \tag{16}$$

Here, p indicates a constant between 0 and 1.

Coding has already been performed in the base layer at frequencies 0 to FL, and the spectrum of frequencies 0 to FL of a subtraction signal subject to enhancement layer coding is close to flat. Irrespective of this, such action is not considered in LPC coefficient mapping as described in this implementation example. Quality can therefore be improved by using a technique of correcting the spectral envelope using Equation (16).

Thus according to a signal processing apparatus of this embodiment, by finding the enhancement layer LPC coefficients using the LPC coefficients quantized by a base layer quantizer, and calculating a spectral envelope from enhancement layer LPC analysis, LPC analysis and quantization are made unnecessary, and the number of quantization bits can be reduced.

Embodiment 3

Figure 8:
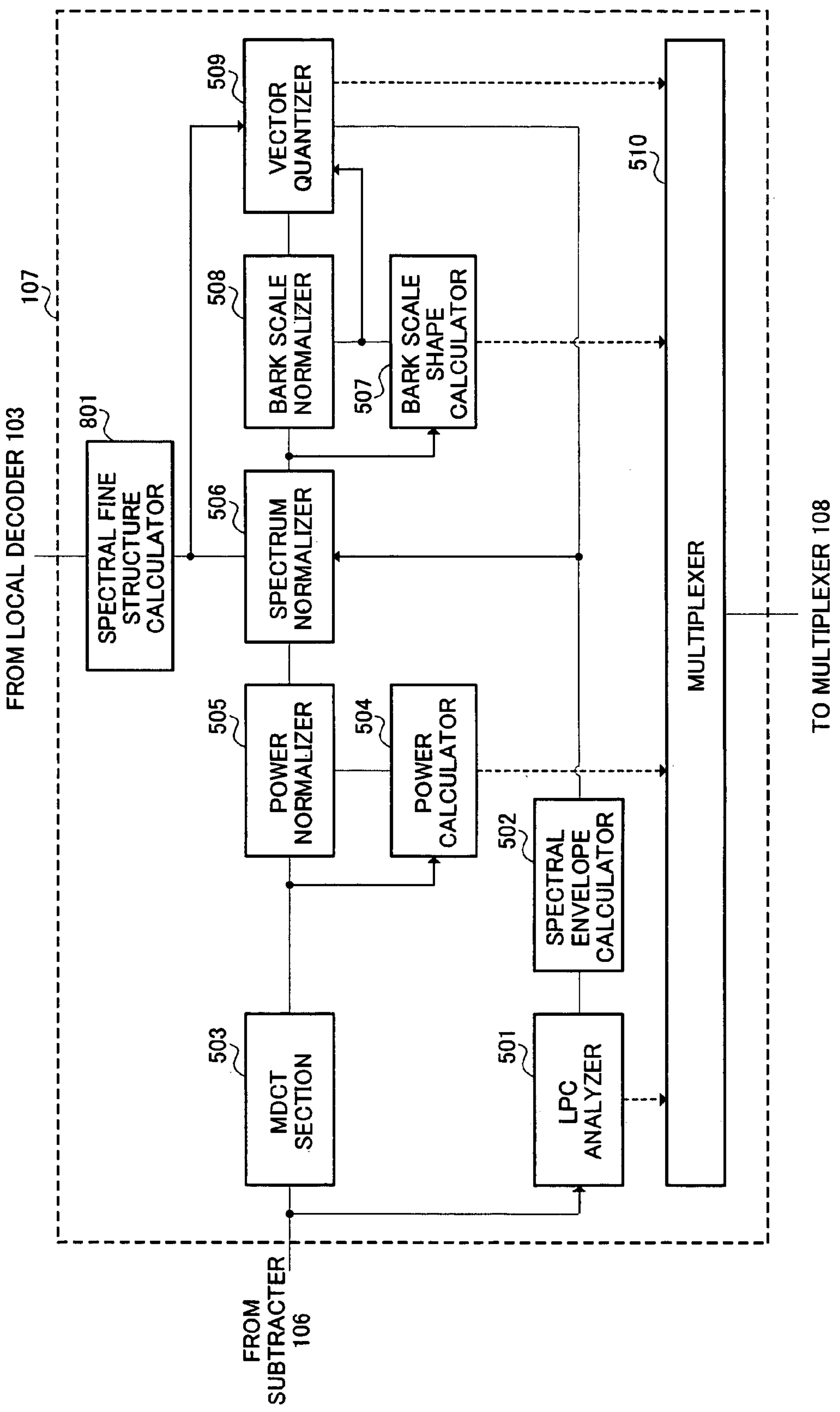
FIG. 8 is a block diagram showing the configuration of the enhancement layer coder of a signal processing apparatus according to Embodiment 3 of the present invention.

FIG. 8 is a block diagram showing the configuration of the enhancement layer coder of a signal processing apparatus according to Embodiment 3 of the present invention. Parts in FIG. 8 identical to those in FIG. 5 are assigned the same reference numerals as in FIG. 5 and detailed descriptions thereof are omitted.

Enhancement layer coder 107 in FIG. 8 differs from the enhancement layer coder in FIG. 5 in being provided with a spectral fine structure calculator 801, calculating spectral fine structure using a pitch period coded by base layer coder 102 and decoded by local decoder 103, and employing that spectral fine structure in spectrum normalization and vector quantization.

Spectral fine structure calculator 801 calculates the spectral fine structure from pitch period T and pitch gain β coded in the base layer, and outputs the spectral fine structure to spectrum normalizer 506.

The aforementioned pitch period T and pitch gain β are actually parts of the coding information, and the same information can be obtained by a local decoder (shown in FIG. 1). Thus the bit rate does not increase even if coding is performed using pitch period T and pitch gain β.

Using pitch period T and pitch gain β, spectral fine structure calculator 801 calculates spectral fine structure har(m) in accordance with Equation (17) below.

$$har(m) = \left| \frac{1}{1 - \beta \cdot e^{-j\frac{2\pi mT}{M}}} \right| \tag{17}$$

Here, M indicates the spectral resolution. As Equation (17) is an oscillation filter when the absolute value of β is greater than or equal to 1, there is also a method whereby a restriction is set so that the possible range of the absolute value of β is less than or equal to a predetermined set value less than 1 (for example, 0.8).

Spectrum normalizer 506 performs normalization in accordance with Equation (18) below, using both spectral envelope env(m) obtained by spectral envelope calculator 502 and spectral fine structure har(m) obtained by spectral fine structure calculator 801.

$$X2(m) = \frac{X1(m)}{env(m) \cdot har(m)} \tag{18}$$

The allocation of quantization bits by vector quantizer 509 is also determined using both spectral envelope env(m) obtained by spectral envelope calculator 502 and spectral fine structure har(m) obtained by spectral fine structure calculator 801. The spectral fine structure is also used in weighting function w(m) determination in vector quantization. To be specific, weighting function w(m) is defined in accordance with Equation (19) below.

$$w(m)=(env(m)\cdot har(m)\cdot Bq(\text{Herz\_to\_Bark}(m)))^{p} \tag{19}$$

Here, p indicates a constant between 0 and 1, and Herz_to_Bark( ) indicates a function that converts from the Herz scale to Bark scale.

Thus, according to a signal processing apparatus of this embodiment, by calculating a spectral fine structure using a pitch period coded by a base layer coder and decoded by a local decoder, and using that spectral fine structure in spectrum normalization and vector quantization, quantization performance can be improved.

Embodiment 4

Figure 9:
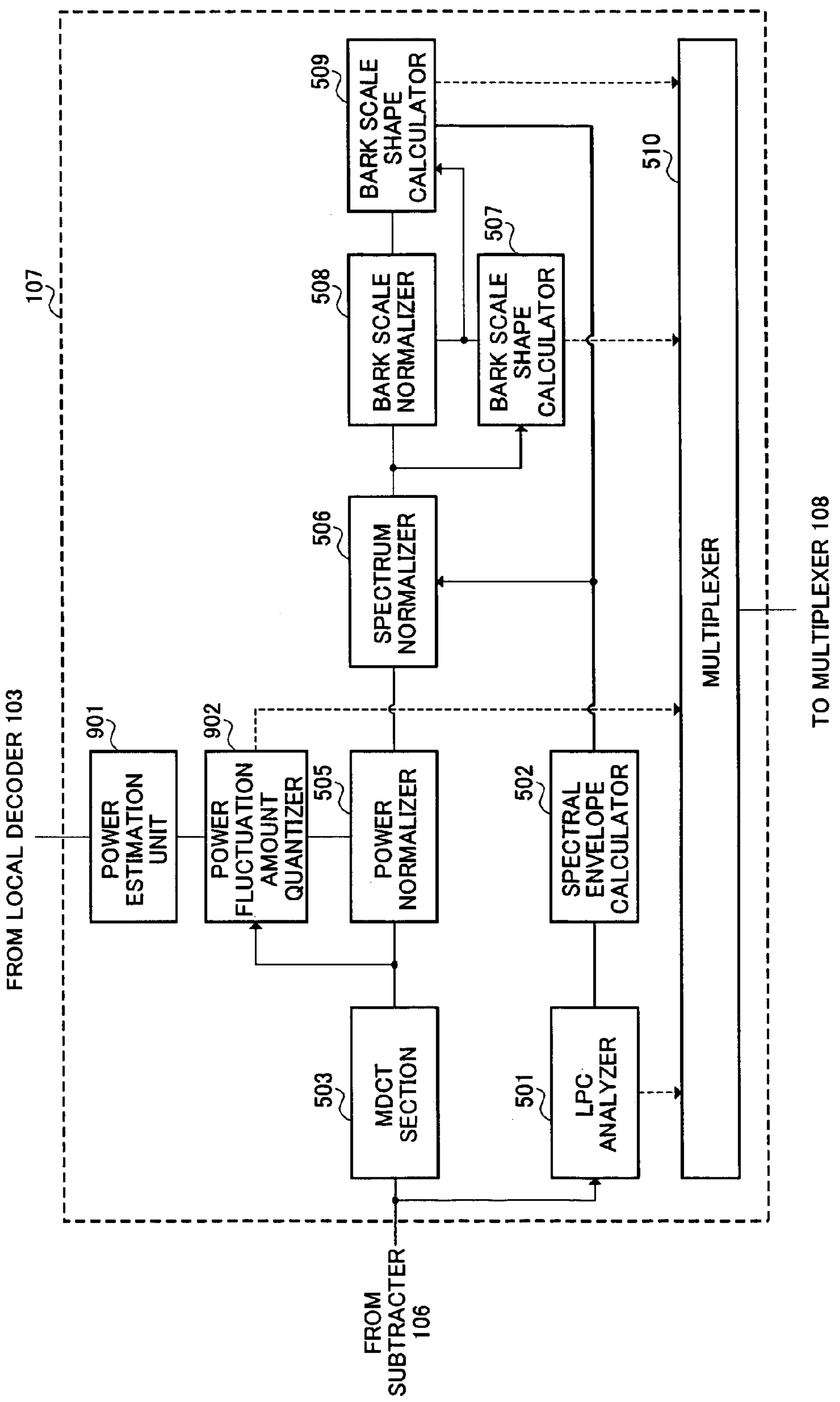
FIG. 9 is a block diagram showing the configuration of the enhancement layer coder of a signal processing apparatus according to Embodiment 4 of the present invention.

FIG. 9 is a block diagram showing the configuration of the enhancement layer coder of a signal processing apparatus according to Embodiment 4 of the present invention. Parts in FIG. 9 identical to those in FIG. 5 are assigned the same reference numerals as in FIG. 5 and detailed descriptions thereof are omitted.

Enhancement layer coder 107 in FIG. 9 differs from the enhancement layer coder in FIG. 5 in being provided with a power estimation unit 901 and power fluctuation amount quantizer 902, and in generating a decoded signal in local decoder 103 using coding information obtained by base layer coder 102, predicting MDCT coefficients power from that decoded signal, and coding the amount of fluctuation from that predicted value.

In FIG. 1 a decoded parameter is output from local decoder 103 to enhancement layer coder 107, but in this embodiment a decoded signal obtained by local decoder 103 is output to enhancement layer coder 107 instead of a decoded parameter.

Signal sl(n) decoded by local decoder 103 in FIG. 5 is input to power estimation unit 901. Power estimation unit 901 then estimates the MDCT coefficient power from this decoded signal s1(*n*). If the MDCT coefficient power estimate is designated powp, powp is expressed by Equation (20) below.

$$powp = \alpha \cdot \sum_{n=0}^{N-1} sl(n)^2 \tag{20}$$

Here, N indicates the length of decoded signal sl(n), and α indicates a predetermined constant for correction. In another method that uses spectrum tilt found from the base layer LPC coefficients, an MDCT coefficient power estimate is expressed by Equation (21) below.

$$powp = \alpha \cdot \beta \cdot \sum_{n=0}^{N-1} sl(n)^2 \tag{21}$$

Here, β denotes a variable that depends on the spectrum tilt found from the base layer LPC coefficients, having a property of approaching zero when the spectrum tilt is large (when an amount of spectral energy is big in low band), and approaching 1 when the spectrum tilt is small (when there is power in a relatively high region).

Next, power fluctuation amount quantizer 902 normalizes the power of the MDCT coefficients obtained by MDCT section 503 by means of power estimate powp obtained by power estimation unit 901, and quantizes the fluctuation amount. fluctuation amount r is expressed by Equation (22) below.

$$r = \frac{pow}{powp} \tag{22}$$

Here, pow indicates the MDCT coefficient power, and is calculated by means of Equation (23).

$$pow = \sum_{m=0}^{M-1} X(m)^2 \tag{23}$$

Here, X(m) indicates the MDCT coefficients, and M indicates the frame length. Power fluctuation amount quantizer 902 quantizes fluctuation amount r, sends the coding information to multiplexer 510, and also decodes quantized fluctuation amount rq. Using quantized fluctuation amount rq, power normalizer 505 normalizes the MDCT coefficients using Equation (24) below.

$$X1(m) = \frac{X(m)}{\sqrt{rq \cdot powp}} \tag{24}$$

Here, X1(*m*) indicates the MDCT coefficients after power normalization.

Thus, according to a signal processing apparatus of this embodiment, by using the correlation between base layer decoded signal power and enhancement layer MDCT coefficient power, predicting MDCT coefficient power using a base layer decoded signal, and coding the amount of fluctuation from that predicted value, it is possible to reduce the number of bits necessary for MDCT coefficient power quantization.

Embodiment 5

Figure 10:
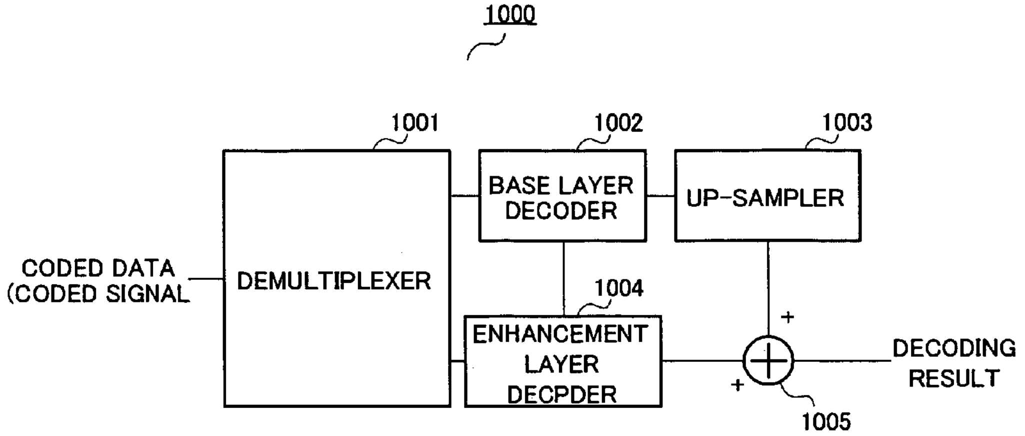
FIG. 10 is a block diagram showing the configuration of a signal processing apparatus according to Embodiment 5 of the present invention.

FIG. 10 is a block diagram showing the configuration of a signal processing apparatus according to Embodiment 5 of the present invention. Signal processing apparatus 1000 in FIG. 10 mainly comprises a demultiplexer 1001, base layer decoder 1002, up-sampler 1003, enhancement layer decoder 1004, and adder 1005.

Demultiplexer 1001 separates coding information, and generates base layer coding information and enhancement layer coding information. Then demultiplexer 1001 outputs base layer coding information to base layer decoder 1002, and outputs enhancement layer coding information to enhancement layer decoder 1004.

Base layer decoder 1002 decodes a sampling rate FL decoded signal using the base layer coding information obtained by demultiplexer 1001, and outputs the resulting signal to up-sampler 1003. At the same time, a parameter decoded by base layer decoder 1002 is output to enhancement layer decoder 1004. Up-sampler 1003 raises the decoded signal sampling frequency to FH, and outputs this to adder 1005.

Enhancement layer decoder 1004 decodes the sampling rate FH decoded signal using the enhancement layer coding information obtained by demultiplexer 1001 and the parameter decoded by base layer decoder 1002, and outputs the resulting signal to adder 1005.

Adder 1005 performs addition of the decoded signal output from up-sampler 1003 and the decoded signal output from enhancement layer decoder 1004.

The operation of a signal processing apparatus of this embodiment will be now described. First, code coded in a signal processing apparatus of any of Embodiments 1 through 4 is input, and that code is separated by demultiplexer 1001, generating base layer coding information and enhancement layer coding information.

Next, base layer decoder 1002 decodes a sampling rate FL decoded signal using the base layer coding information obtained by demultiplexer 1001. Then up-sampler 1003 raises the sampling frequency of that decoded signal to FH.

In enhancement layer decoder 1004, the sampling rate FH decoded signal is decoded using enhancement layer coding information obtained by demultiplexer 1001 and a parameter decoded by base layer decoder 1002.

The base layer decoded signal up-sampled by up-sampler 1003 and the enhancement layer decoded signal are added by adder 1005. The above processing is repeated while there is a new input signal. When there is no new input signal, processing is terminated.

Thus, according to a signal processing apparatus of this embodiment, by performing enhancement layer decoder 1004 decoding using parameters decoded by base layer decoder 1002, it is possible to generate a decoded signal from coding information of a sound coding unit that performs enhancement layer coding using decoding parameters in base layer coding.

Figure 11:
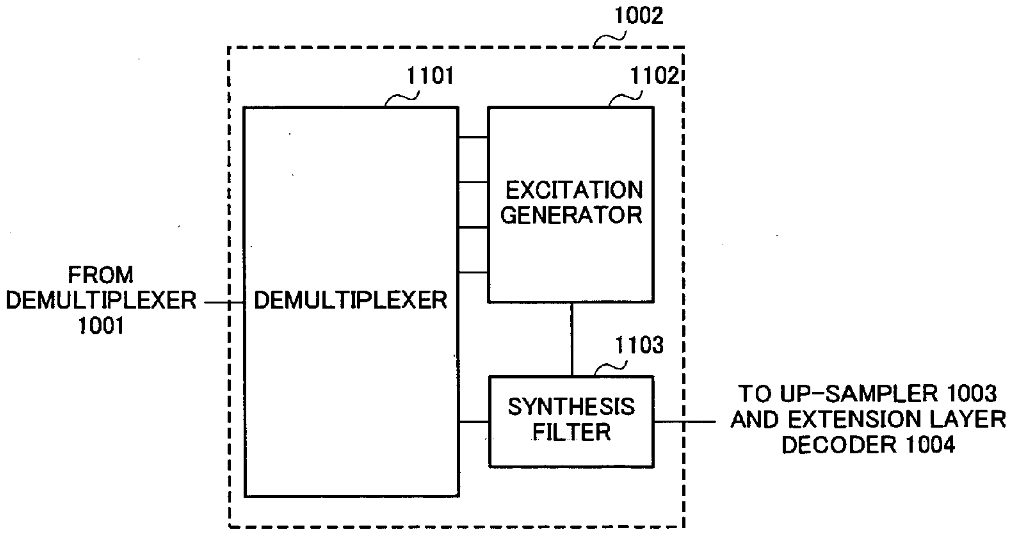
FIG. 11 is a block diagram showing an example of a base layer decoder.

Base layer decoder 1002 will now be described. FIG. 11 is a block diagram showing an example of base layer decoder 1002. Base layer decoder 1002 in FIG. 11 mainly comprises a demultiplexer 1101, excitation generator 1102, and synthesis filter 1103, and performs CELP decoding processing.

Demultiplexer 1101 separates various parameters from base layer coding information output from demultiplexer 1001, and outputs these parameters to excitation generator 1102 and synthesis filter 1103.

Excitation generator 1102 performs adaptive vector, adaptive vector gain, noise vector, and noise vector gain decoding, generates an excitation signal using these, and outputs this excitation signal to synthesis filter 1103. Synthesis filter 1103 generates a synthesized signal using the decoded LPC coefficients.

The operation of base layer decoder 1002 in FIG. 11 will now be described. First, demultiplexer 1101 separates various parameters from base layer coding information.

Next, excitation generator 1102 performs adaptive vector, adaptive vector gain, noise vector, and noise vector gain decoding. Then excitation generator 1102 generates excitation vector ex(n) in accordance with Equation (25) below.

$$ex(n)=\beta_q\cdot q(n)+\gamma_q\cdot c(n) \tag{25}$$

Here, q(n) indicates an adaptive vector, βq adaptive vector gain, c(n) a noise vector, and γq noise vector gain.

Synthesis filter 1103 then generates synthesized signal syn (n) in accordance with Equation (26) below, using the decoded LPC coefficients.

$$syn(n)=ex(n)+\sum_{i=1}^{NP}\alpha_q(i)\cdot syn(n-i) \tag{26}$$

Here, αq indicates the decoded LPC coefficients, and NP the order of the LPC coefficients.

Decoded signal syn(n) decoded in this way is output to up-sampler 1003, and a parameter obtained as a result of decoding is output to enhancement layer decoder 1004. The above processing is repeated while there is a new input signal. When there is no new input signal, processing is terminated. Depending on the CELP configuration, a mode is also possible in which a synthesized signal is output after passing through a post-filter. The post-filter mentioned here has a function of post-processing to make coding distortion less perceptible.

Figure 12:
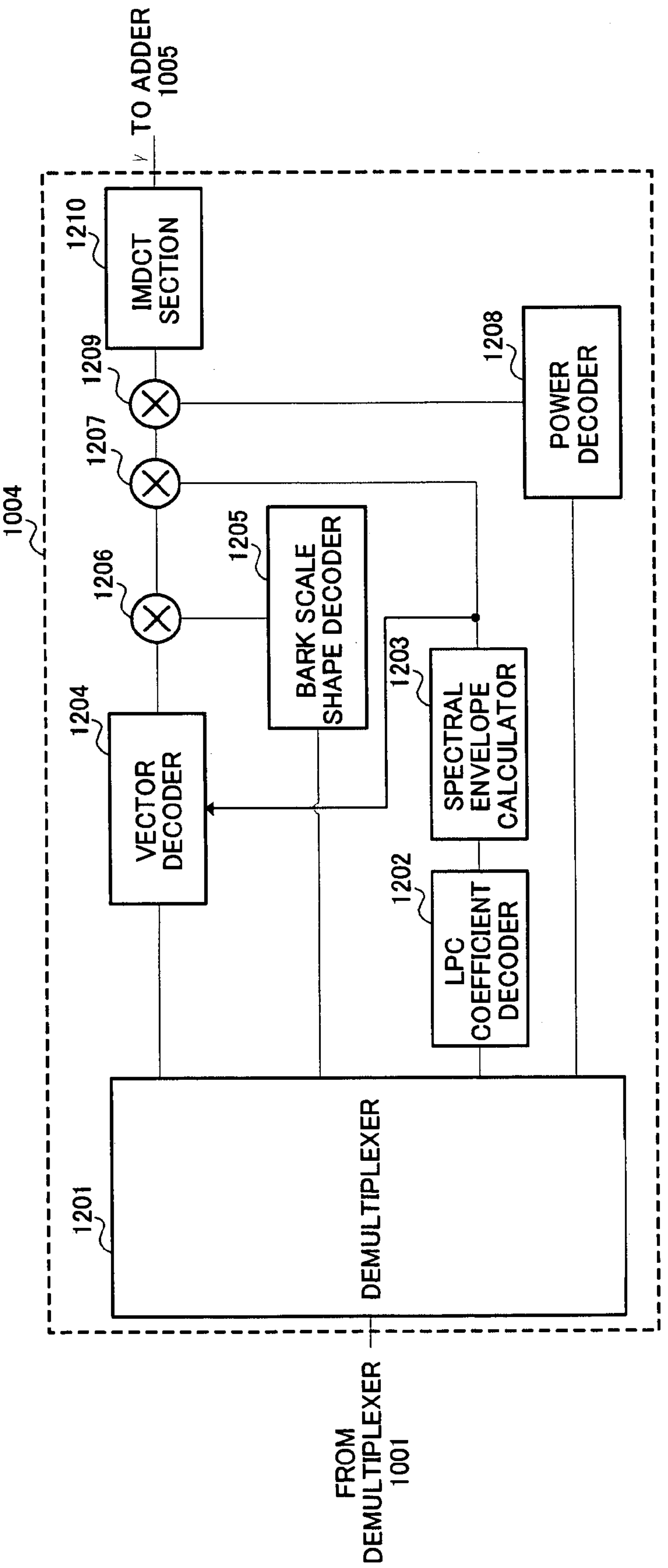
FIG. 12 is a block diagram showing an example of an enhancement layer decoder.

Enhancement layer decoder 1004 will now be described. FIG. 12 is a block diagram showing an example of enhancement layer decoder 1004. Enhancement layer decoder 1004 in FIG. 12 mainly comprises a demultiplexer 1201, LPC coefficient decoder 1202, spectral envelope calculator 1203, vector decoder 1204, Bark scale shape decoder 1205, multiplier 1206, multiplier 1207, power decoder 1208, multiplier 1209, and IMDCT section 1210.

Demultiplexer 1201 separates various parameters from enhancement layer coding information output from demultiplexer 1001. LPC coefficient decoder 1202 decodes the LPC coefficients using the LPC coefficients related coding information, and outputs the result to spectral envelope calculator 1203.

Spectral envelope calculator 1203 calculates spectral envelope env(m) in accordance with Equation (6) using the decoded LPC coefficients, and outputs spectral envelope env (m) to vector decoder 1204 and multiplier 1207.

Vector decoder 1204 determines quantization bit allocation based on spectral envelope env(m) obtained by spectral envelope calculator 1203, and decodes normalized MDCT coefficients X3*q*(*m*) from coding information obtained from demultiplexer 1201 and the aforementioned quantization bit allocation. The quantization bit allocation method is the same as that used in enhancement layer coding in the coding method of any of Embodiments 1 through 4.

Bark scale shape decoder 1205 decodes Bark scale shape Bq(k) based on coding information obtained from demultiplexer 1201, and outputs the result to multiplier 1206.

Multiplier 1206 multiplies normalized MDCT coefficients X3*q*(*m*) by Bark scale shape Bq(k) in accordance with Equation (27) below, and outputs the result of the multiplication to multiplier 1207.

$$X2_q(m)=X3_q(m)\sqrt{B_q(k)}\ fl(k)\leqq m\leqq fh(k)\ 0\leqq k<K \tag{27}$$

Here, fl(k) indicates the lowest frequency of the k'th sub-band and fh(k) the highest frequency of the k'th sub-band, and K indicates the number of sub-bands.

Multiplier 1207 multiplies normalized MDCT coefficients X2*q*(*m*) obtained from multiplier 1206 by spectral envelope env(m) obtained by spectral envelope calculator 1203 in accordance with Equation (28) below, and outputs the result of the multiplication to multiplier 1209.

$$X1_q(m)=X2_q(m)env(m) \tag{28}$$

Power decoder 1208 decodes power powq based on coding information obtained from demultiplexer 1201, and outputs the result of the decoding to multiplier 1209.

Multiplier 1209 multiplies normalized MDCT coefficients X1*q*(*m*) by decoded power powq in accordance with Equation (29) below, and outputs the result of the multiplication to IMDCT section 1210.

$$X_q(m)=X1_q(m)\sqrt{powp} \tag{29}$$

IMDCT section 1210 executes IMDCT (Inverse Modified Discrete Cosine Transform) processing on the decoded MDCT coefficients obtained in this way, overlaps and adds the signal obtained in half the previous frame and half the current frame, and the resultant signal is an output signal. The above processing is repeated while there is a new input signal. When there is no new input signal, processing is terminated.

Thus, according to a signal processing apparatus of this embodiment, by performing enhancement layer decoder decoding using parameters decoded by a base layer decoder, it is possible to generate a decoded signal from coding information of a coding unit that performs enhancement layer coding using decoding parameters in base layer coding.

Embodiment 6

Figure 13:
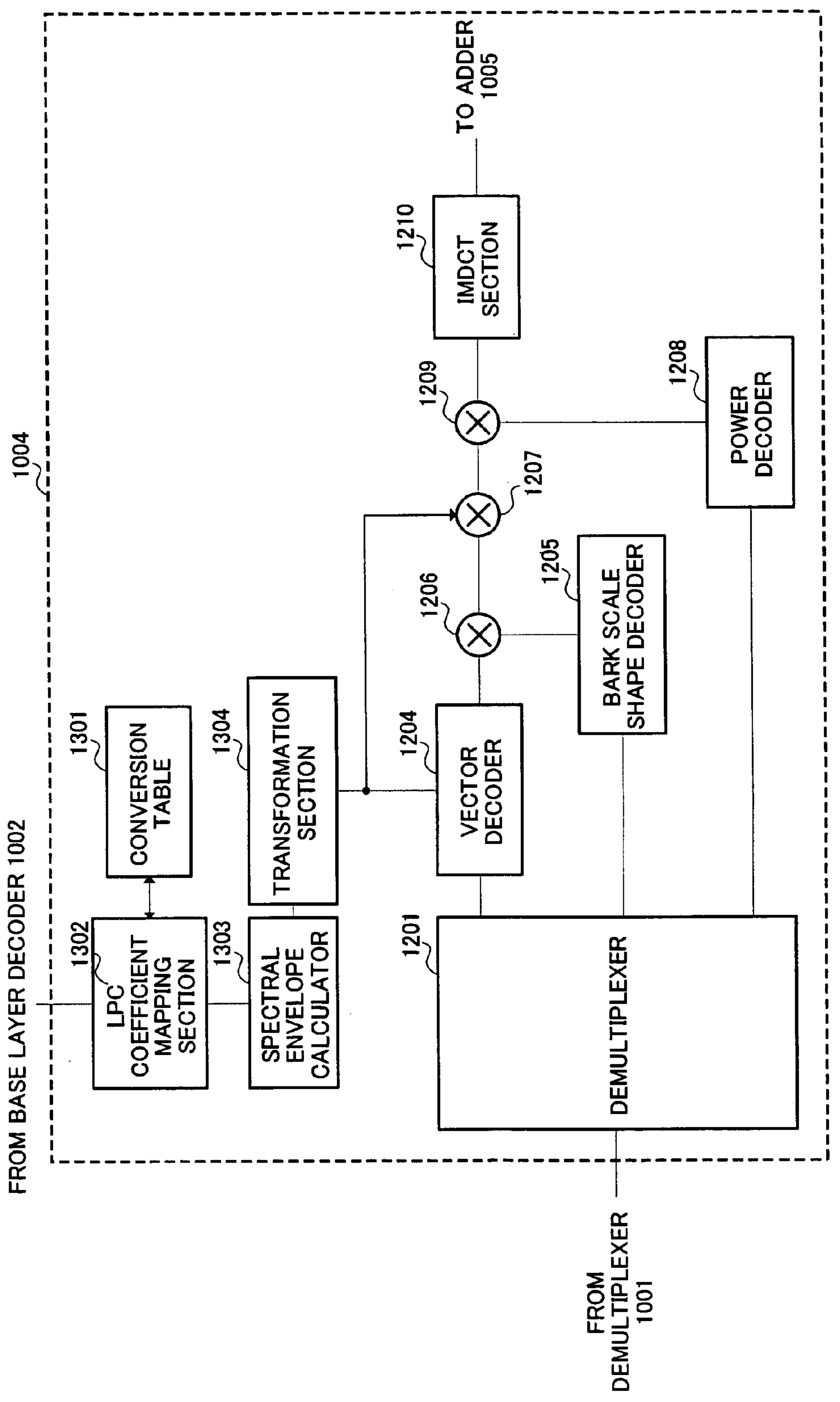
FIG. 13 is a drawing showing an example of the configuration of an enhancement layer decoder.

FIG. 13 is a drawing showing an example of the configuration of enhancement layer decoder 1004. Parts in FIG. 13 identical to those in FIG. 12 are assigned the same reference numerals as in FIG. 12 and detailed descriptions thereof are omitted.

Enhancement layer decoder 1004 in FIG. 13 differs from enhancement layer decoder 1004 in FIG. 12 in being provided with a conversion table 1301, LPC coefficient mapping section 1302, spectral envelope calculator 1303, and transformation section 1304, and performing decoding using the LPC coefficients decoded by base layer decoder 1002.

Conversion table 1301 stores base layer LPC coefficients and enhancement layer LPC coefficients with the correspondence therebetween indicated.

LPC coefficient mapping section 1302 references conversion table 1301, converts the base layer LPC coefficients input from base layer decoder 1002 to the enhancement layer LPC coefficients, and outputs the enhancement layer LPC coefficients to spectral envelope calculator 1303.

Spectral envelope calculator 1303 obtains a spectral envelope based on the enhancement layer LPC coefficients, and outputs this spectral envelope to transformation section 1304. Transformation section 1304 transforms the spectral envelope and outputs the result to multiplier 1207 and vector decoder 1204. An example of the transformation method is the method shown in Equation (16) of Embodiment 2.

The operation of enhancement layer decoder 1004 in FIG. 13 will now be described. The base layer LPC coefficients are found for signals in signal band 0 to FL, and does not coincide with the LPC coefficients used by an enhancement layer signal (signal band 0 to FH). However, there is a strong correlation between the two. Therefore, in LPC coefficient mapping section 1302, a conversion table 1301 is separately designed in advance, showing the correspondence between LPC coefficients for signal band 0 to FL signals and signal band 0 to FH signals, using this correlation. This conversion table 1301 is used to find the enhancement layer LPC coefficients from the base layer LPC coefficients.

Details of conversion table 1301 are the same as for conversion table 601 in Embodiment 2.

Thus according to a signal processing apparatus of this embodiment, by finding the enhancement layer LPC coefficients using the LPC coefficients quantized by a base layer decoder, and calculating a spectral envelope from the enhancement layer LPC coefficients, LPC analysis and quantization are made unnecessary, and the number of quantization bits can be reduced.

Embodiment 7

Figure 14:
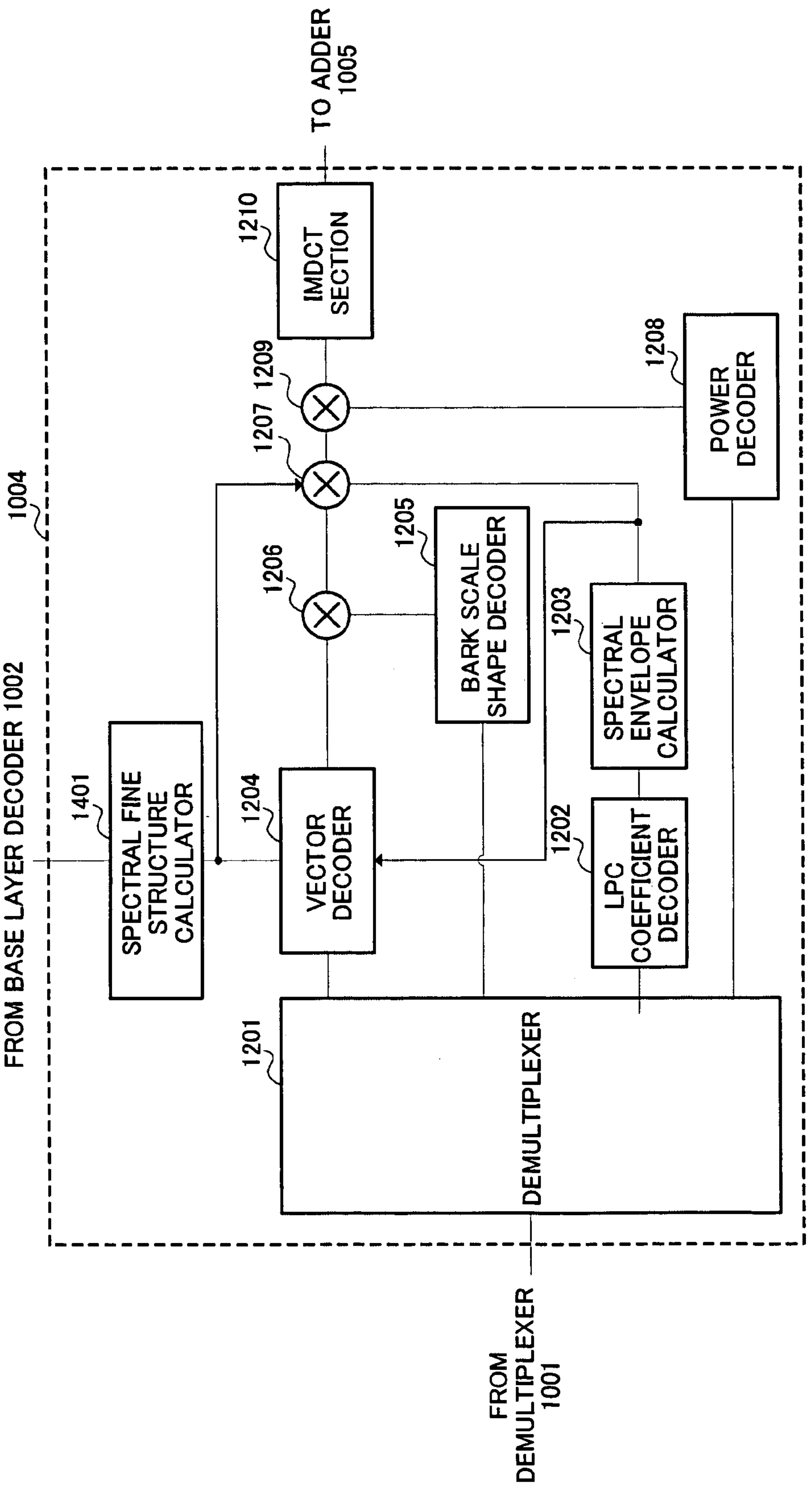
FIG. 14 is a block diagram showing the configuration of the enhancement layer decoder of a signal processing apparatus according to Embodiment 7 of the present invention.

FIG. 14 is a block diagram showing the configuration of the enhancement layer decoder of a signal processing apparatus according to Embodiment 7 of the present invention. Parts in FIG. 14 identical to those in FIG. 12 are assigned the same reference numerals as in FIG. 12 and detailed descriptions thereof are omitted.

Enhancement layer decoder 1004 in FIG. 14 differs from the enhancement layer decoder in FIG. 12 in being provided with a spectral fine structure calculator 1401, calculating spectral fine structure using a pitch period decoded by base layer decoder 1002, employing that spectral fine structure in decoding, and performing sound decoding corresponding to sound coding whereby quantization performance is improved.

Spectral fine structure calculator 1401 calculates the spectral fine structure from pitch period T and pitch gain β decoded by base layer decoder 1002, and outputs the spectral fine structure to vector decoder 1204 and multiplier 1207.

Using pitch period Tq and pitch gain βq, spectral fine structure calculator 1401 calculates spectral fine structure har(m) in accordance with Equation (30) below.

$$har(m) = \left| \frac{1}{1 - \beta_q \cdot e^{-j\frac{2\pi m T_q}{M}}} \right| \tag{30}$$

Here, M indicates the spectral resolution. As Equation (30) is an oscillation filter when the absolute value of βq is greater than or equal to 1, a restriction may also be set so that the possible range of the absolute value of βq is less than or equal to a predetermined set value less than 1 (for example, 0.8).

The allocation of quantization bits by vector decoder 1204 is also determined using spectral envelope env(m) obtained by spectral envelope calculator 1203 and spectral fine structure har(m) obtained by spectral fine structure calculator 1401. Then normalized MDCT coefficients X3*q*(*m*) is decoded from that quantization bit allocation and coding information obtained from demultiplexer 1201. Also, normalized MDCT coefficients X1*q*(*m*) is found by multiplying normalized MDCT coefficients X2*q*(*m*) by spectral envelope env(m) and spectral fine structure har(m) in accordance with Equation (31) below.

$$X1_q(m)=X2_q(m)env(m)har(m) \tag{31}$$

Thus, according to a signal processing apparatus of this embodiment, by calculating a spectral fine structure using a pitch period coded by a base layer coder and decoded by a local decoder, and using that spectral fine structure in spectrum normalization and vector quantization, it is possible to perform sound decoding corresponding to sound coding whereby quantization performance is improved.

Embodiment 8

Figure 15:
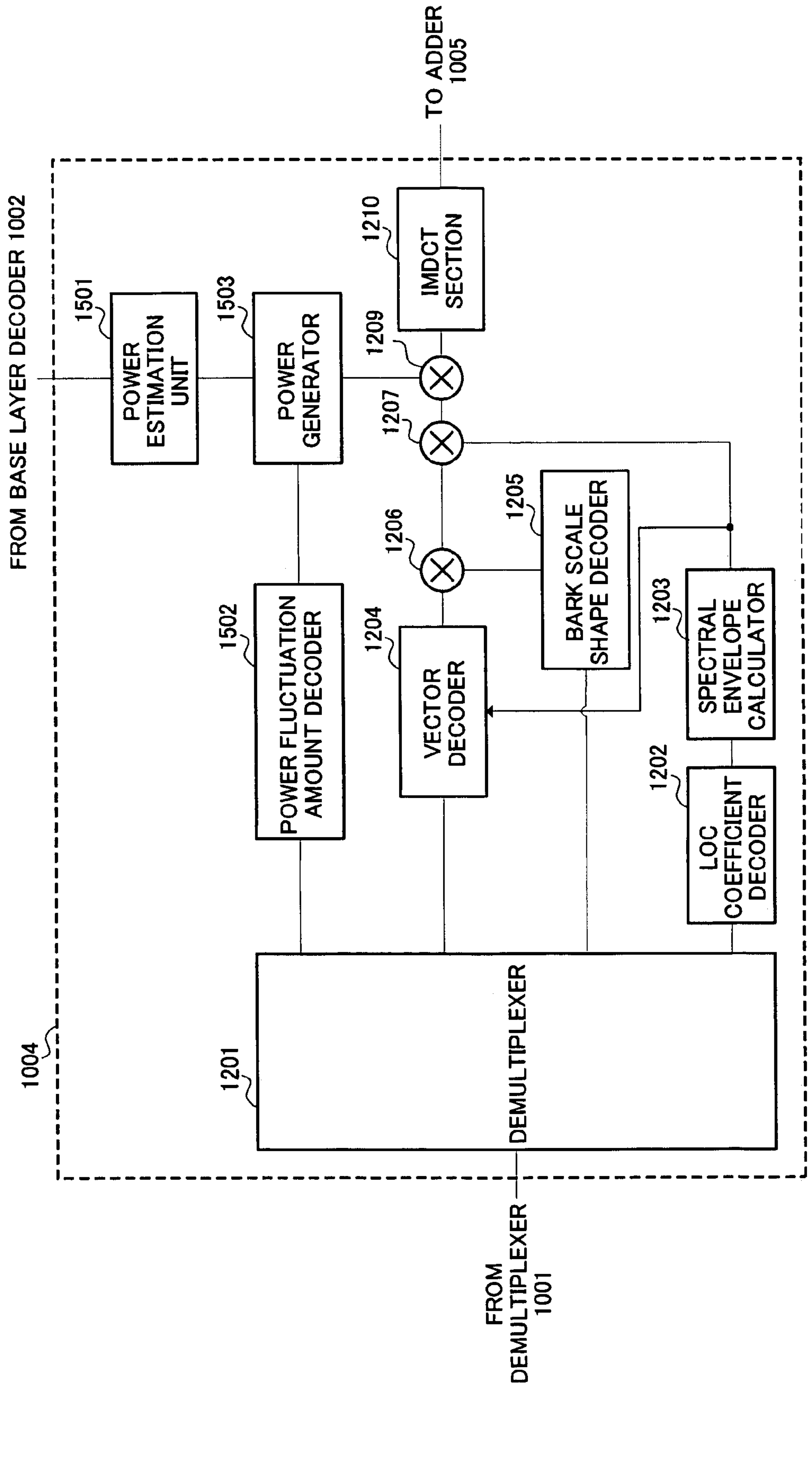
FIG. 15 is a block diagram showing the configuration of the enhancement layer decoder of a signal processing apparatus according to Embodiment 8 of the present invention.

FIG. 15 is a block diagram showing the configuration of the enhancement layer decoder of a signal processing apparatus according to Embodiment 8 of the present invention. Parts in FIG. 15 identical to those in FIG. 12 are assigned the same reference numerals as in FIG. 12 and detailed descriptions thereof are omitted.

Enhancement layer decoder 1004 in FIG. 15 differs from the enhancement layer decoder in FIG. 12 in being provided with a power estimation unit 1501, power fluctuation amount decoder 1502, and power generator 1503, and in forming a decoder corresponding to a coder that predicts MDCT coefficient power using a base layer decoded signal, and encodes the amount of fluctuation from that predicted value.

In FIG. 10 a decoded parameter is output from base layer decoder 1002 to enhancement layer decoder 1004, but in this embodiment a decoded signal obtained by base layer decoder 1002 is output to enhancement layer decoder 1004 instead of a decoded parameter.

Power estimation unit 1501 estimates the power of the MDCT coefficients from decoded signal sl(n) decoded by base layer decoder 1002, using Equation (20) or Equation (21).

Power fluctuation amount decoder 1502 decodes the power fluctuation amount from coding information obtained from demultiplexer 1201, and outputs this to power generator 1503. Power generator 1503 calculates power from the power fluctuation amount.

Multiplier 1209 finds the MDCT coefficients in accordance with Equation (32) below.

$$X_q(m)=X1_q(m)\sqrt{rq\cdot powp} \quad (32)$$

Here, rq indicates the power fluctuation amount, and powp the power estimate. $X1q(m)$ indicates the output signal from multiplier 1207.

Thus, according to a signal processing apparatus of this embodiment, by configuring a decoder corresponding to a coder that predicts MDCT coefficient power using a base layer decoded signal and encodes the amount of fluctuation from that predicted value, it is possible to reduce the number of bits necessary for MDCT coefficient power quantization.

Embodiment 9

Figure 16:
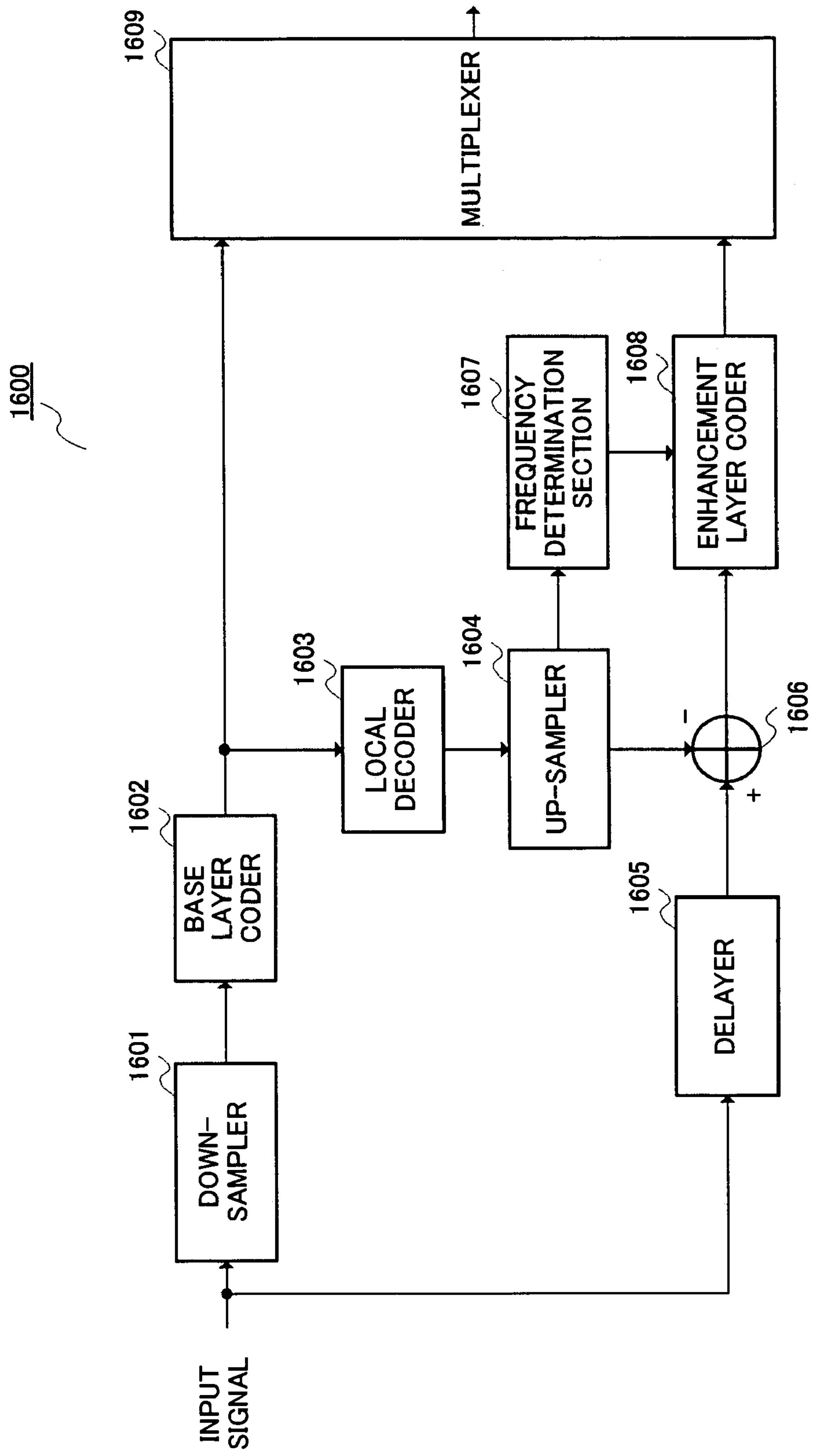
FIG. 16 is a block diagram showing the configuration of a sound coding apparatus according to Embodiment 9 of the present invention.

FIG. 16 is a block diagram showing the configuration of a sound coding apparatus according to Embodiment 9 of the present invention. Sound coding apparatus 1600 in FIG. 16 mainly comprises a down-sampler 1601, base layer coder 1602, local decoder 1603, up-sampler 1604, delayer 1605, subtracter 1606, frequency determination section 1607, enhancement layer coder 1608, and multiplexer 1609.

In FIG. 16, down-sampler 1601 receives sampling rate FH input data (acoustic data), converts this input data to sampling rate FL lower than sampling rate FH, and outputs the result to base layer coder 1602.

Base layer coder 1602 encodes the sampling rate FL input data in predetermined basic frame units, and outputs the first coding information to local decoder 1603 and multiplexer 1609. Base layer coder 1602 may code input data using the CELP method, for example.

Local decoder 1603 decodes the first coding information, and outputs the decoded signal obtained by decoding to up-sampler 1604. Up-sampler 1604 raises the decoded signal sampling rate to FH, and outputs the result to subtracter 1606 and frequency determination section 1607.

Delayer 1605 delays the input signal by a predetermined time, then outputs the signal to subtracter 1606. By making this delay time equal to the time delay arising in down-sampler 1601, base layer coder 1602, local decoder 1603, and up-sampler 1604, phase shift is prevented in the following subtraction processing. Subtracter 1606 performs subtraction between the input signal and decoded signal, and outputs the result of the subtraction to enhancement layer coder 1608 as an error signal.

Frequency determination section 1607 determines an area for which error signal coding is performed and an area for which error signal coding is not performed from the decoded signal for which the sampling rate has been raised to FH, and notifies enhancement layer coder 1608. For example, frequency determination section 1607 determines the frequency for auditory masking from the decoded signal for which the sampling rate has been raised to FH, and outputs this to enhancement layer coder 1608.

Enhancement layer coder 1608 converts the error signal to a frequency domain and generates an error spectrum, and performs error spectrum coding based on frequency information obtained from frequency determination section 1607. Multiplexer 1609 multiplexes coding information obtained by coding by base layer coder 1602 and coding information obtained by coding by enhancement layer coder 1608.

Figure 17:
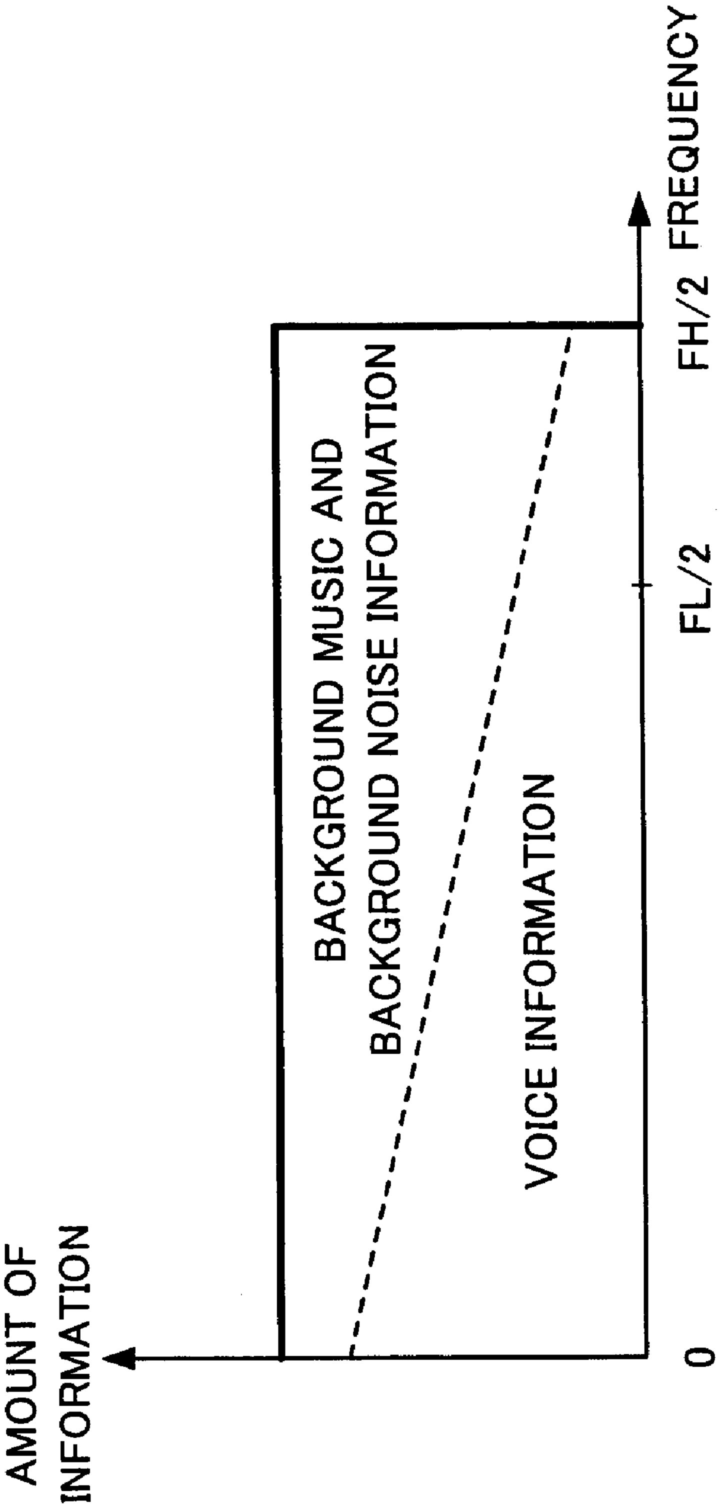
FIG. 17 is a drawing showing an example of acoustic signal information distribution.

The signals coded by base layer coder 1602 and enhancement layer coder 1608 respectively will now be described. FIG. 17 is a drawing showing an example of acoustic signal information distribution. In FIG. 17, the vertical axis indicates the amount of information, and the horizontal axis indicates frequency. FIG. 17 shows how much speech information and background music and background noise information contained in the input signal are present in which frequency bands.

As shown in FIG. 17, in the case of speech information, there is a large amount of information in the low frequency region, and the amount of information decreases the higher the frequency region. Conversely, in the case of background music and background noise information, there is comparatively little information in the lower region compared with speech information, and a large amount of information in the higher region.

Thus, in the base layer, speech signals are coded with high quality using CELP, and in the enhancement layer, background music or environmental sound that cannot be represented in the base layer, and signals with higher frequency components than the frequency region covered by the base layer, are coded efficiently.

Figure 18:
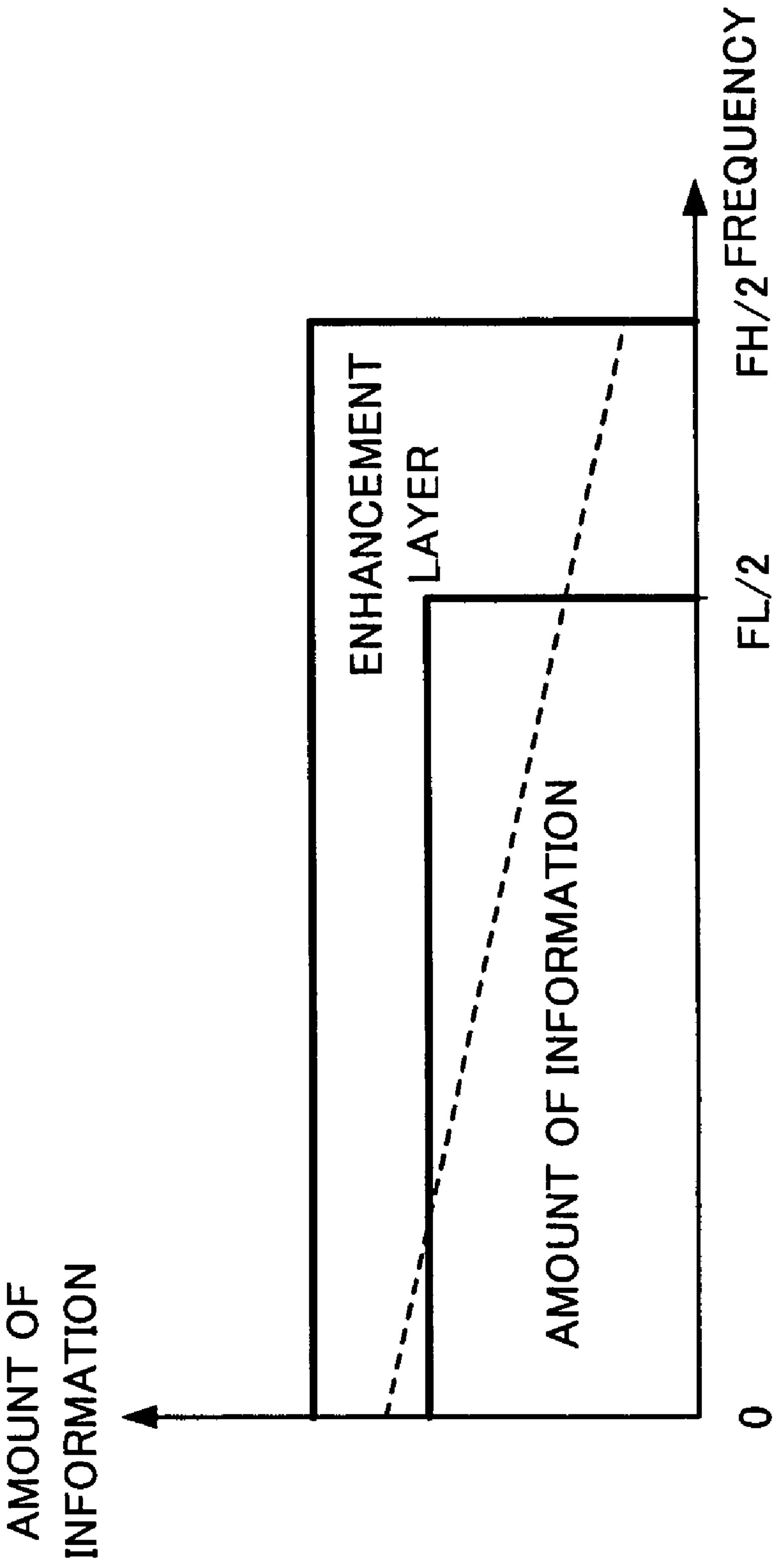
FIG. 18 is a drawing showing an example of regions subject to coding in the base layer and enhancement layer.

FIG. 18 is a drawing showing an example of coding regions in the base layer and enhancement layer. In FIG. 18, the vertical axis indicates the amount of information, and the horizontal axis indicates frequency. FIG. 18 shows the regions that are the object of information coded by base layer coder 1602 and enhancement layer coder 1608 respectively.

Base layer coder 1602 is designed to represent efficiently speech information in the frequency band from 0 to FL, and can perform good-quality coding of speech information in this region. However, with base layer coder 1602, the coding quality of background music and background noise information in the frequency band from 0 to FL is not high.

Enhancement layer coder 1608 is designed to cover portions for which the capability of base layer coder 1602 is insufficient, as described above, and signals in the frequency band from FL to FH. Thus, by combining base layer coder 1602 and enhancement layer coder 1608, it is possible to implement high-quality coding in a wide band.

As shown in FIG. 18, the first coding information obtained by coding in base layer coder 1602 contains speech information in the frequency band between 0 and FL, and therefore a scalable function can be implemented whereby a decoded signal can be obtained even with only at least the first coding information.

Also, raising coding efficiency by using auditory masking in the enhancement layer can be considered. Auditory masking employs the human auditory characteristic whereby, when a certain signal is supplied, a signal in the vicinity of the frequency of that signal cannot be heard (is masked).

Figure 19:
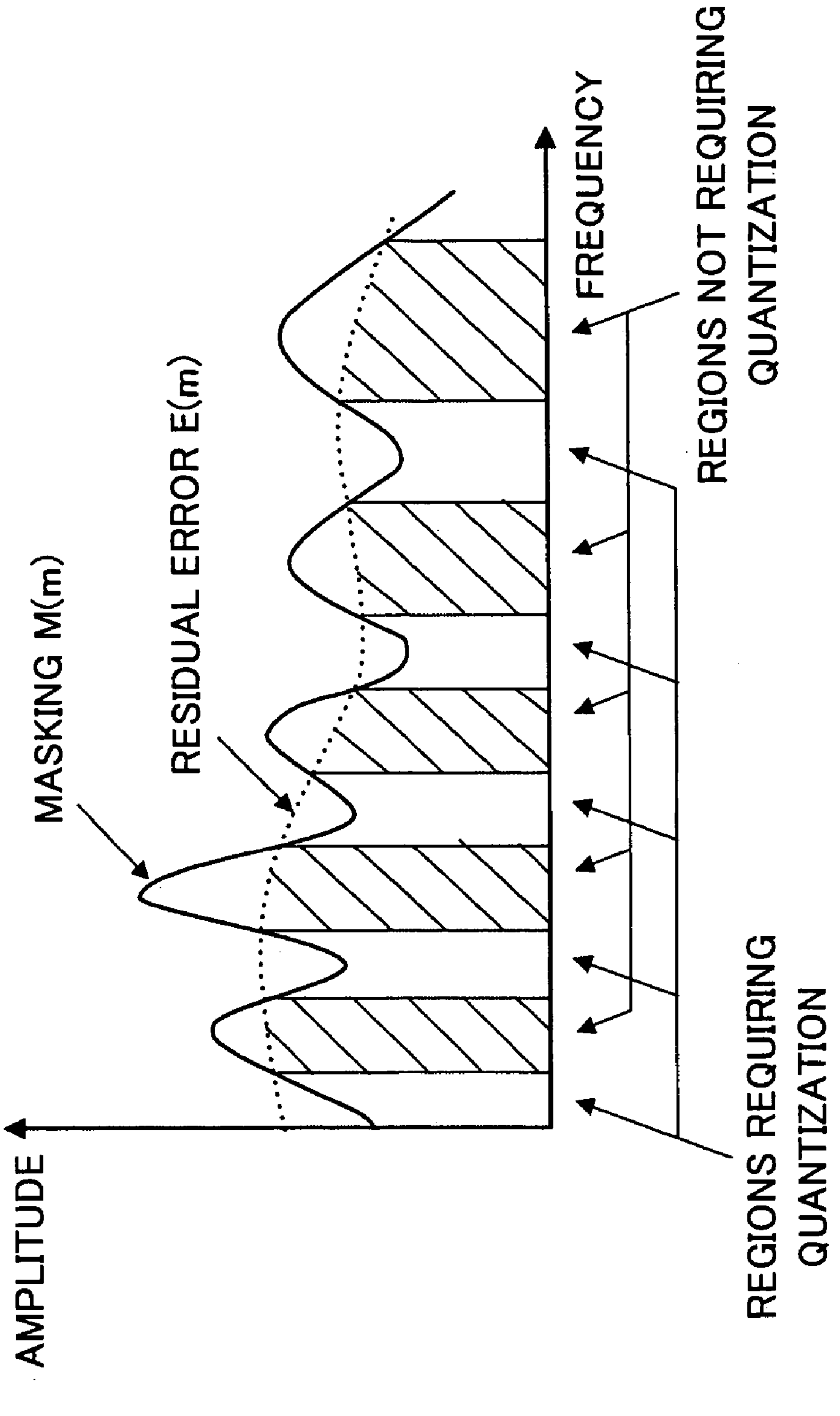
FIG. 19 is a drawing showing an example of an acoustic (music) signal spectrum.

FIG. 19 is a drawing showing an example of an acoustic (music) signal spectrum. In FIG. 19, the solid line indicates auditory masking, and the dotted line indicates the error spectrum. "Error spectrum" here means the spectrum of an error signal (enhancement layer input signal) for an input signal and base layer decoded signal.

In the error spectrum indicated by shaded areas in FIG. 19, amplitude values are lower than the auditory masking, and therefore sound cannot be heard by the human ear, while in other regions error spectrum amplitude values exceed the auditory masking, and therefore quantization distortion is perceived.

In the enhancement layer, it is only necessary to code the error spectrum included in the white areas in FIG. 19 so that quantization distortion of those regions is smaller than the auditory masking. Coefficients belonging to the shaded areas are already smaller than the auditory masking, and so need not be quantized.

In sound coding apparatus 1600 of this embodiment, a frequency at which a residual error signal is coded according to auditory masking, etc., is not transmitted from the coding side to the decoding side, and the error spectrum frequency at which enhancement layer coding is performed is determined separately by the coding side and the decoding side using an up-sampled base layer decoded signal.

In the case of a decoded signal resulting from decoding of base layer coding information, the same signal is obtained by the coding side and the decoding side, and therefore by having the coding side code the signal by determining the auditory masking frequency from this decoded signal, and having the decoding side decode the signal by obtaining auditory masking frequency information from this decoded signal, it becomes unnecessary to code and transmit error spectrum frequency information as additional information, enabling a reduction in the bit rate to be achieved.

Figure 20:
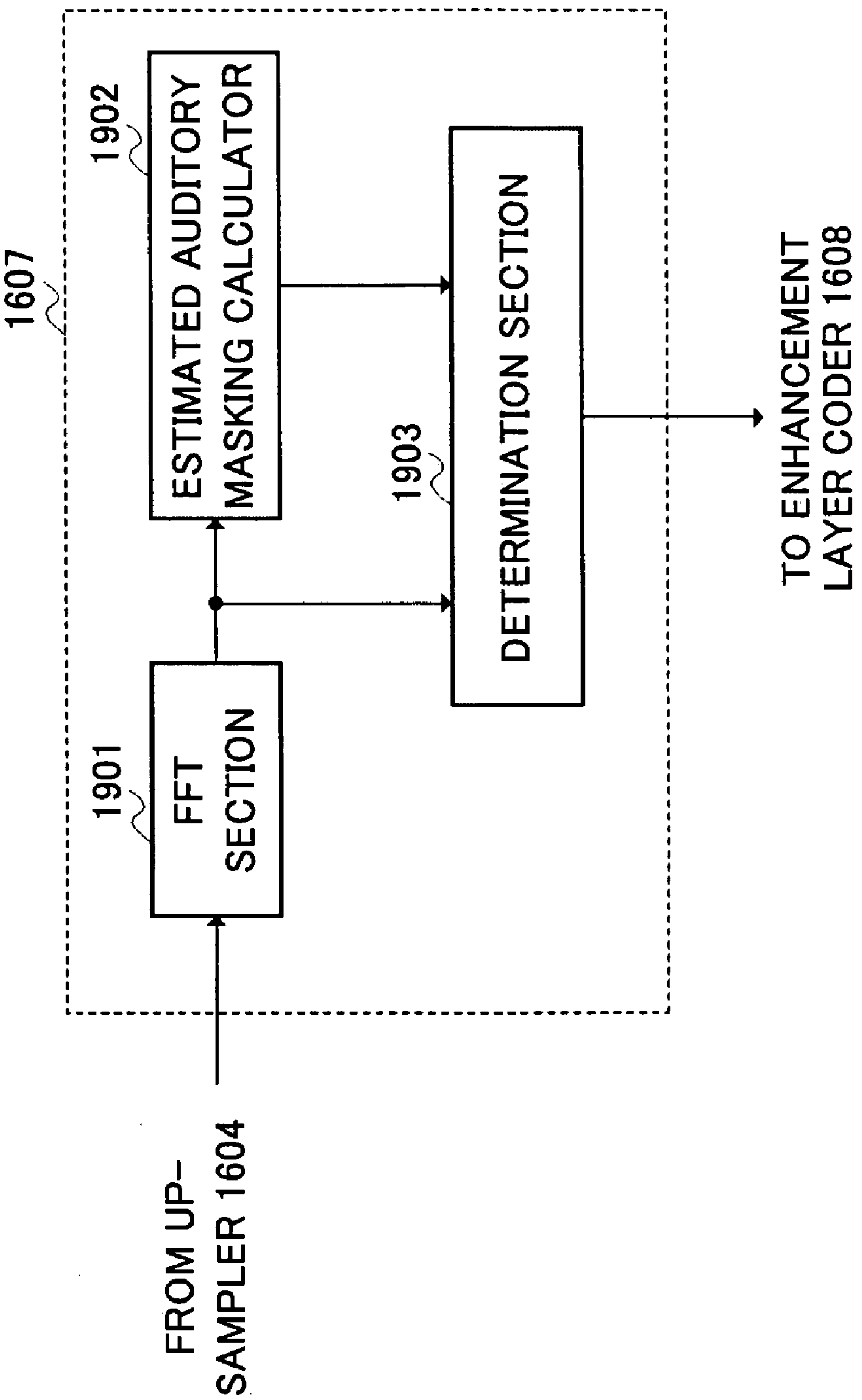
FIG. 20 is a block diagram showing an example of the internal configuration of the frequency determination section of a sound coding apparatus of the above embodiment.

Next, the operation of each block of a sound coding apparatus according to this embodiment will be described in detail. First, the operation of frequency determination section 1607, which determines an error spectrum frequency coded in the enhancement layer from an up-sampled base layer decoded signal (hereinafter referred to as "base layer decoded signal"), will be described. FIG. 20 is a block diagram showing an example of the internal configuration of the frequency determination section of a sound coding apparatus of this embodiment.

In FIG. 20, frequency determination section 1607 mainly comprises an FFT section 1901, estimated auditory masking calculator 1902, and determination section 1903.

FFT section 1901 performs orthogonal conversion of base layer decoded signal x(n) output from up-sampler 1604, calculates amplitude spectrum P(m), and outputs amplitude spectrum P(m) to estimated auditory masking calculator 1902 and determination section 1903. To be specific, FFT section 1901 calculates amplitude spectrum P(m) using Equation (33) below.

$$P(m)=\sqrt{Re^2(m)+Im^2(m)} \quad (33)$$

Here, Re(m) and Im(m) indicate the real part and imaginary part of Fourier coefficients of base layer decoded signal x(n), and m indicates frequency.

Next, estimated auditory masking calculator 1902 calculates estimated auditory masking M'(m) using base layer decoded signal amplitude spectrum P(m), and outputs estimated auditory masking M'(m) to determination section 1903. Auditory masking is generally calculated based on the spectrum of an input signal, but in this implementation example, auditory masking is estimated using base layer decoded signal x(n) instead of the input signal. This is based on the idea that, since base layer decoded signal x(n) is determined so that there is little distortion with respect to the input signal, adequate approximation will be achieved and there will be no major problem if base layer decoded signal x(n) is used instead of the input signal.

Determination section 1903 then determines a frequency for which error spectrum coding by enhancement layer coder 1608 is applicable, using base layer decoded signal amplitude spectrum P(m) and estimated auditory masking M'(m) obtained by estimated auditory masking calculator 1902. Determination section 1903 regards base layer decoded signal amplitude spectrum P(m) as an approximation of the error spectrum, and outputs frequency m for which Equation (34) below holds true to enhancement layer coder 1608.

$$P(m)-M'(m)>0 \quad (34)$$

In Equation (34), term P(m) estimates the size of the error spectrum, and term M'(m) estimates auditory masking. Determination section 1903 then compares the value of the estimated error spectrum and estimated auditory masking, and if Equation (34) is satisfied—that is to say, if the value of the estimated error spectrum exceeds the value of the estimated auditory masking—the error spectrum of that frequency is assumed to be perceived as noise, and is made subject to coding by enhancement layer coder 1608.

Conversely, if the value of the estimated error spectrum is smaller than the size of the estimated auditory masking, determination section 1903 considers that the error spectrum of that frequency will not be perceived as noise due to the effects of masking, and determines the error spectrum of this frequency not to be subject to quantization.

Figure 21:
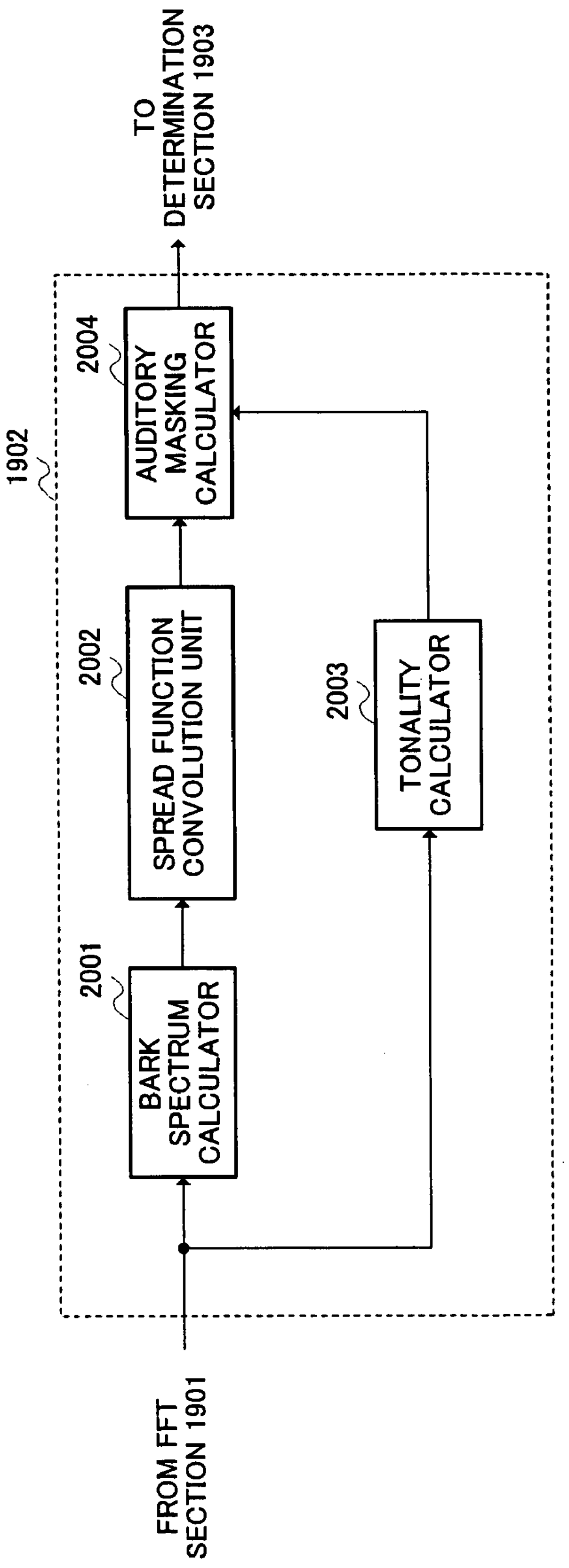
FIG. 21 is a drawing showing an example of the internal configuration of the auditory masking calculator of a sound coding apparatus of the above embodiment.

The operation of estimated auditory masking calculator 1902 will now be described. FIG. 21 is a drawing showing an example of the internal configuration of the auditory masking calculator of a sound coding apparatus of this embodiment. In FIG. 21, estimated auditory masking calculator 1902 mainly comprises a Bark spectrum calculator 2001, spread function convolution unit 2002, tonality calculator 2003, and auditory masking calculator 2004.

In FIG. 21, Bark spectrum calculator 2001 calculates Bark spectrum B(k) using Equation (35) below.

$$B(k)=\sum_{m=fl(k)}^{fh(k)} P^2(m) \quad (35)$$

Here, P(m) indicates an amplitude spectrum, and is found from Equation (33) above, k corresponds to the Bark spectrum number, and fl(k) and fh(k) indicates the lowest frequency and highest frequency respectively of the k'th Bark spectrum. Bark spectrum B(k) indicates the spectral intensity in the case of band distribution at equal intervals on the Bark scale. If the Herz scale is represented by h and the Bark scale by B, the relationship between the Herz scale and Bark scale is expressed by Equation (36) below.

$$B=13\tan^{-1}(0.76f)+3.5\tan^{-1}\left(\frac{f}{7.5}\right) \quad (36)$$

Spread function convolution unit 2002 convolutes spread function SF(k) to Bark spectrum B(k) using Equation (37) below.

$$C(k)=B(k)*SF(k) \quad (37)$$

Tonality calculator 2003 finds spectrum flatness SFM(k) of each Bark spectrum using Equation (38) below.

$$SFM(k)=\frac{\mu g(k)}{\mu a(k)} \quad (3.8)$$

Here, μg(k) indicates the geometric mean of power spectra in the k'th Bark spectrum, and μa(k) indicates the arithmetic mean of power spectra in the k'th Bark spectrum. Tonality calculator 2003 then calculates tonality coefficient α(k) from decibel value SFMdB(k) of spectrum flatness SFM(k), using Equation (39) below.

$$\alpha(k) = \min\left(\frac{SFMdB(k)}{-60}, 1.0\right) \quad (39)$$

Using Equation (40) below, auditory masking calculator 2004 finds offset O(k) of each Bark scale from tonality coefficient α(k) calculated by tonality calculator 2003.

$$O(k)=\alpha(k)\cdot(14.5-k)+(1.0-\alpha(k))\cdot 5.5 \quad (40)$$

Auditory masking calculator 2004 then uses Equation (41) below to calculate auditory masking T(k) by subtracting off set O(k) from C(k) found by spread function convolution unit 2002.

$$T(k)=\max(10^{\log 10(C(k))-(O(k)/10)}, T_q(k)) \quad (41)$$

Here, Tq(k) indicates an absolute threshold value. The absolute threshold value represents the minimum value of auditory masking observed as a human auditory characteristic. Then auditory masking calculator 2004 converts auditory masking T(k) expressed on the Bark scale to the Herz scale and finds estimated auditory masking M'(m), which it outputs to determination section 1903.

Figure 22:
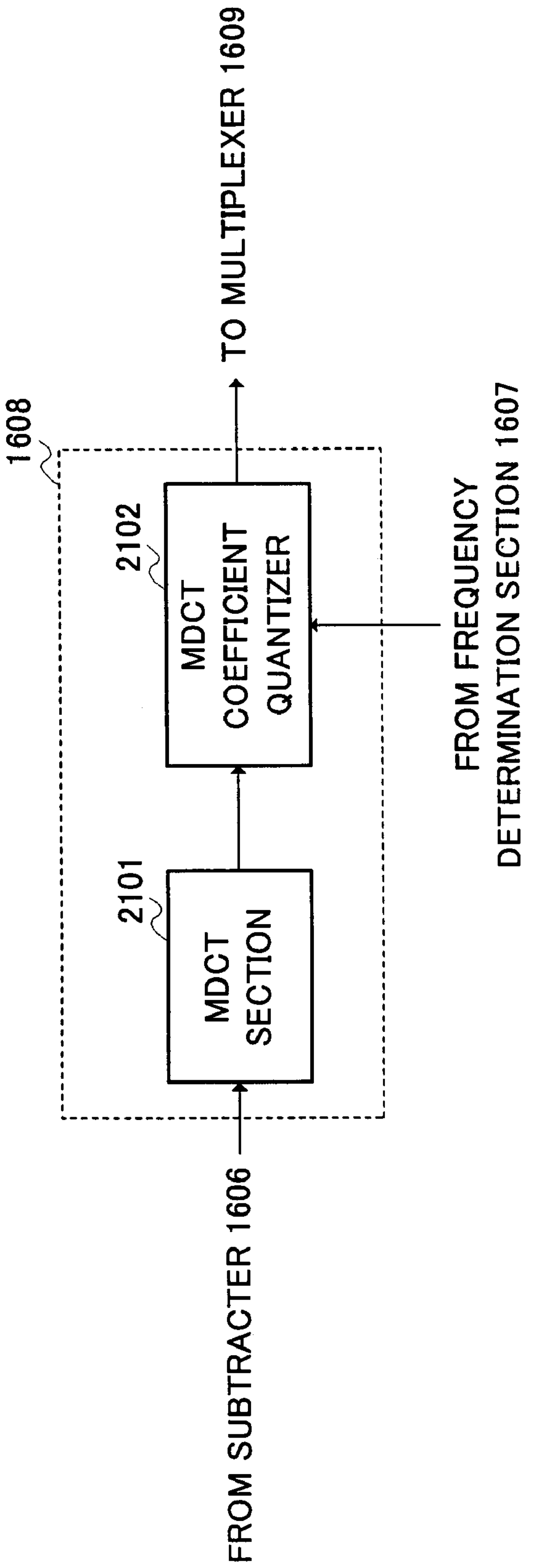
FIG. 22 is a block diagram showing an example of the internal configuration of an enhancement layer coder of the above embodiment.

Enhancement layer coder 1608 performs MDCT coefficient coding using frequency m subject to quantization found in this way. FIG. 22 is a block diagram showing an example of the internal configuration of an enhancement layer coder of this embodiment. Enhancement layer coder 1608 in FIG. 22 mainly comprises an MDCT section 2101 and MDCT coefficient quantizer 2102.

MDCT section 2101 multiplies the input signal output from subtracter 1606 by an analysis window, then performs MDCT (Modified Discrete Cosine Transform) processing to obtain the MDCT coefficients. In MDCT processing, an orthogonal base for analysis is used for successive two frames. And the analysis frame is overlapped one-half, and the first half of the analysis frame is an odd function while the latter half of the analysis frame is an even function. A feature of MDCT processing is that frame boundary distortion does not occur because of addition by overlapping of waveforms after an inverse transform. When MDCT is performed, the input signal is multiplied by a window function such as a sin window. If a sequence of MDCT coefficients is designated X(n), the MDCT coefficients are calculated in accordance with Equation (42) below.

$$X(m) = \sqrt{\frac{1}{N}} \sum_{n=0}^{2N-1} x(n)\cos\left\{\frac{(2n+1+N)\cdot(2m+1)\pi}{4N}\right\} \quad (42)$$

MDCT coefficient quantizer 2102 quantizes the coefficients corresponding to frequencies from frequency determination section 1607. Then MDCT coefficient quantizer 2102 outputs the quantized MDCT coefficients coding information to multiplexer 1609.

Thus, according to a sound coding apparatus of this embodiment, because of determining frequencies for quantization in enhancement layer by using a base layer decoded signal, it is unnecessary to transmit frequency information for quantization from the coding side to the decoding side, and enabling high-quality coding to be performed at a low bit rate.

Figure 23:
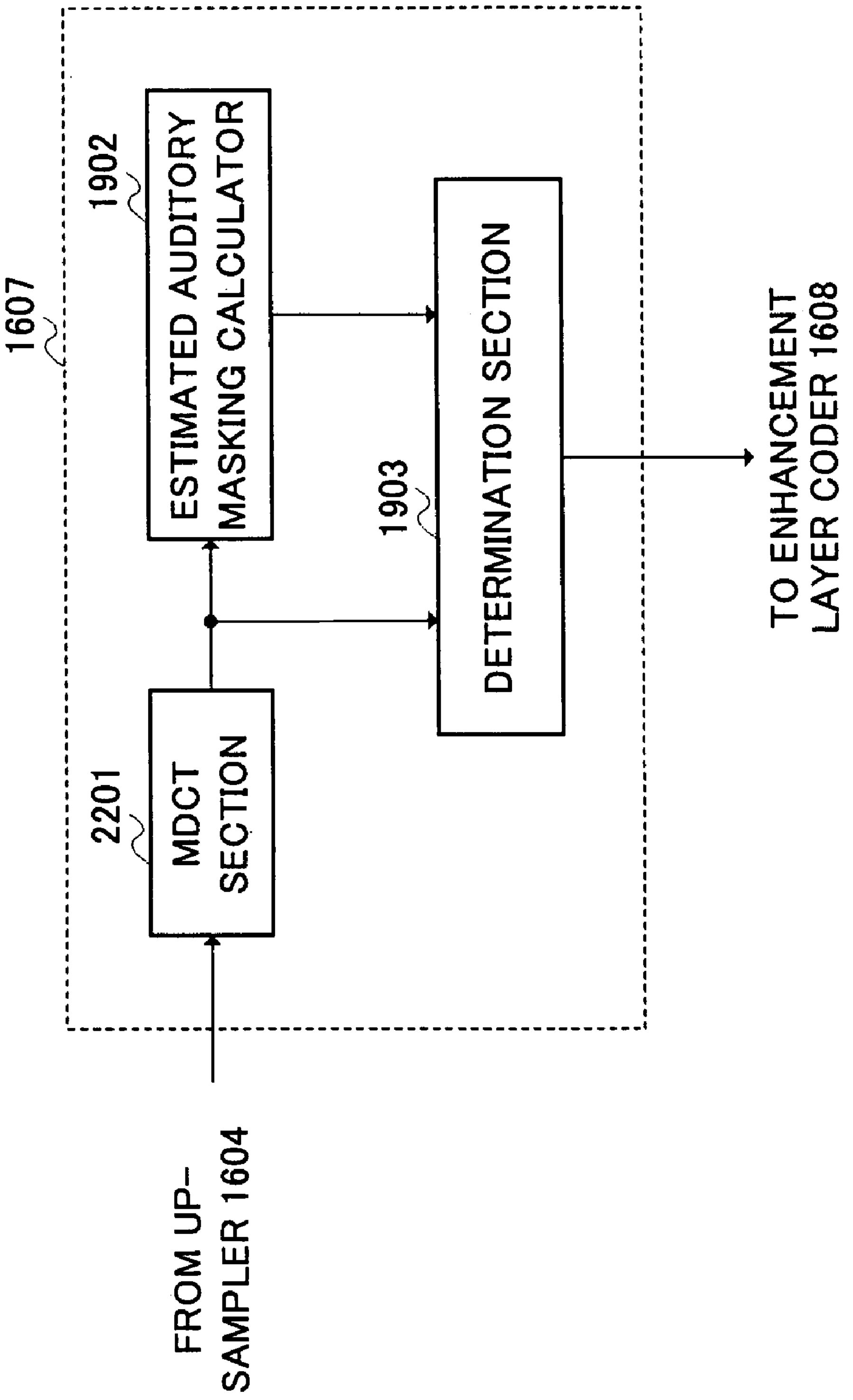
FIG. 23 is a block diagram showing an example of the internal configuration of an auditory masking calculator of the above embodiment.

In the above embodiment, an auditory masking calculation method that uses FFT has been described, but it is also possible to calculate auditory masking using MDCT instead of FFT. FIG. 23 is a block diagram showing an example of the internal configuration of an auditory masking calculator of this embodiment. Parts in FIG. 23 identical to those in FIG. 20 are assigned the same reference numerals as in FIG. 20 and detailed descriptions thereof are omitted.

MDCT section 2201 approximates amplitude spectrum P(m) using the MDCT coefficients. To be specific, MDCT section 2201 approximates P(m) using Equation (43) below.

$$P(m)=\sqrt{R^2(m)} \quad (43)$$

Here, R(m) is the MDCT coefficients found by performing MDCT processing on a signal supplied from up-sampler 1604.

Estimated auditory masking calculator 1902 calculates Bark spectrum B(k) from P(m) approximately. Thereafter, frequency information for quantization is calculated in accordance with the above-described method.

Thus, a sound coding apparatus of this embodiment can calculate auditory masking using MDCT.

Figure 24:
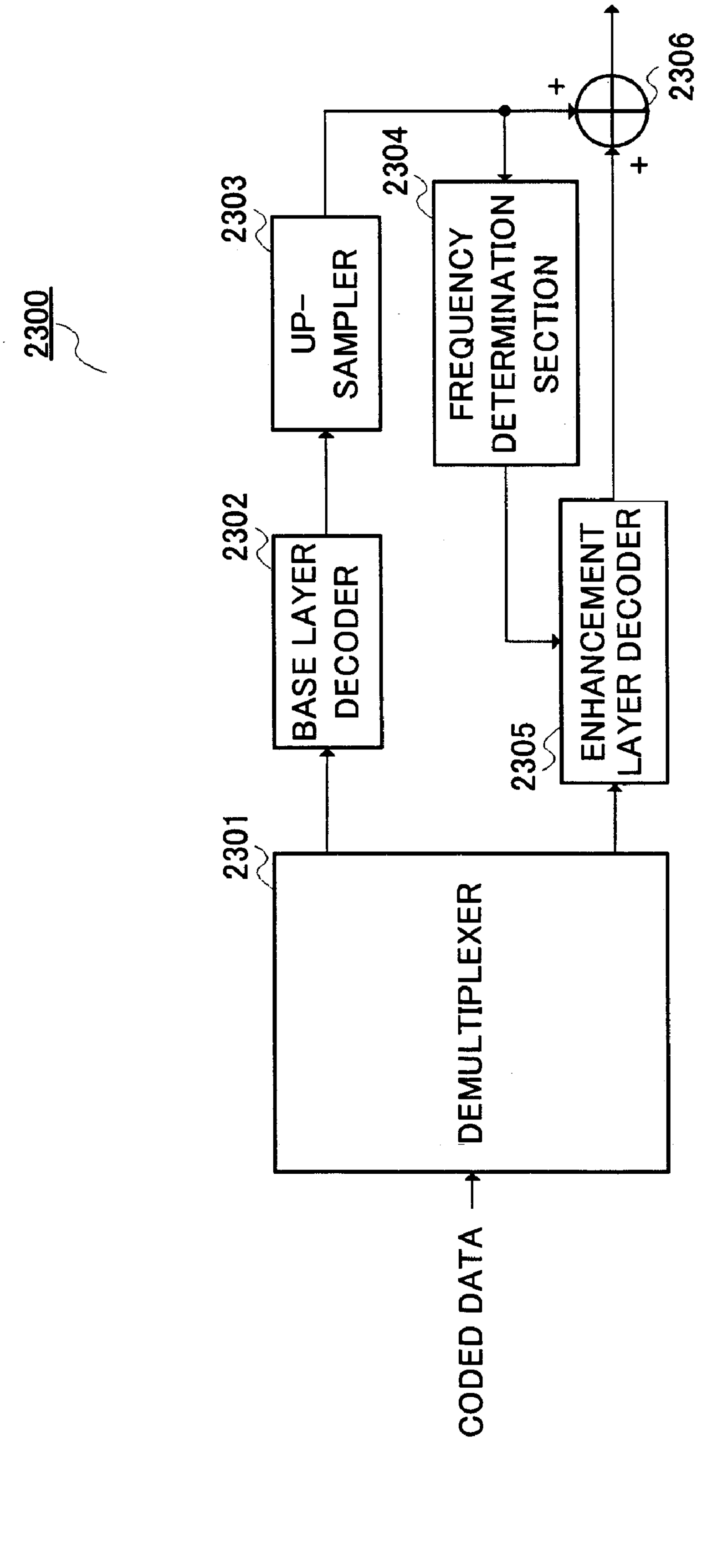
FIG. 24 is a block diagram showing the configuration of a sound decoding apparatus according to Embodiment 9 of the present invention.

The decoding side will now be described. FIG. 24 is a block diagram showing the configuration of a sound decoding apparatus according to Embodiment 9 of the present invention. Sound decoding apparatus 2300 in FIG. 24 mainly comprises a demultiplexer 2301, base layer decoder 2302, up-sampler 2303, frequency determination section 2304, enhancement layer decoder 2305, and adder 2306.

Demultiplexer 2301 separates code coded by sound coding apparatus 1600 into base layer first coding information and enhancement layer second coding information, outputs the first coding information to base layer decoder 2302, and outputs the second coding information to enhancement layer decoder 2305.

Base layer decoder 2302 decodes the first coding information and obtains a sampling rate FL decoded signal. Then base layer decoder 2302 outputs the decoded signal to up-sampler 2303. Up-sampler 2303 converts the sampling rate FL decoded signal to a sampling rate FH decoded signal, and outputs this signal to frequency determination section 2304 and adder 2306.

Using the up-sampled base layer decoded signal, frequency determination section 2304 determines error spectrum frequencies to be decoded in enhancement layer decoder 2305. This frequency determination section 2304 has the same kind of configuration as frequency determination section 1607 in FIG. 16.

Enhancement layer decoder 2305 decodes the second coding information and outputs the sampling rate of FH decoded signal to adder 2306.

Adder 2306 adds the base layer decoded signal up-sampled by up-sampler 2303 and the enhancement layer decoded signal decoded by enhancement layer decoder 2305, and outputs the resulting signal.

Figure 25:
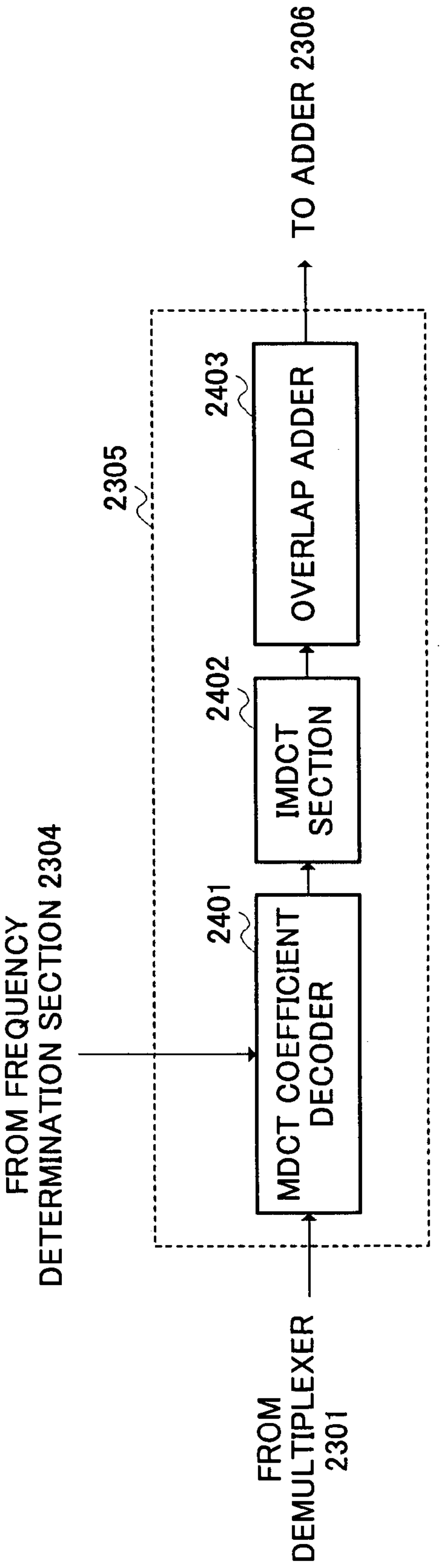
FIG. 25 is a block diagram showing an example of the internal configuration of the enhancement layer decoder of a sound decoding apparatus of the above embodiment.

Next, the operation of each block of a sound decoding apparatus according to this embodiment will be described in detail. FIG. 25 is a block diagram showing an example of the internal configuration of the enhancement layer decoder of a sound decoding apparatus of this embodiment. FIG. 25 shows an example of the internal configuration of enhancement layer decoder 2305 in FIG. 24. Enhancement layer decoder 2305 in FIG. 25 mainly comprises an MDCT coefficient decoder 2401, IMDCT section 2402, and overlap adder 2403.

MDCT coefficient decoder 2401 decodes the MDCT coefficients quantized from second coding information output from demultiplexer 2301 based on frequencies outputted from frequency determination section 2304. To be specific, the decoded MDCT coefficients corresponding to the frequencies indicated by frequency determination section 2304 are positioned, and zero is supplied for other frequencies.

IMDCT section 2402 executes inverse MDCT processing on the MDCT coefficients output from MDCT coefficient decoder 2401, generates a time domain signal, and outputs this signal to overlap adder 2403.

Overlap adder 2403 performs overlap and add operation after windowing with a time domain signal from IMDCT section 2042, and it outputs the decoded signal to adder 2306. To be specific, overlap adder 2403 multiplies the decoded signal by a window and overlaps the time domain signal decoded in the previous frame and the current frame, performing addition, and generates an output signal.

Thus, according to a sound decoding apparatus of this embodiment, by determining the frequencies for enhancement layer's decoding by using base layer decoded signal, it is possible to determine the frequencies for enhancement layer's decoding without any additional information, and enabling high-quality coding to be performed at a low bit rate.

Embodiment 10

Figure 26:
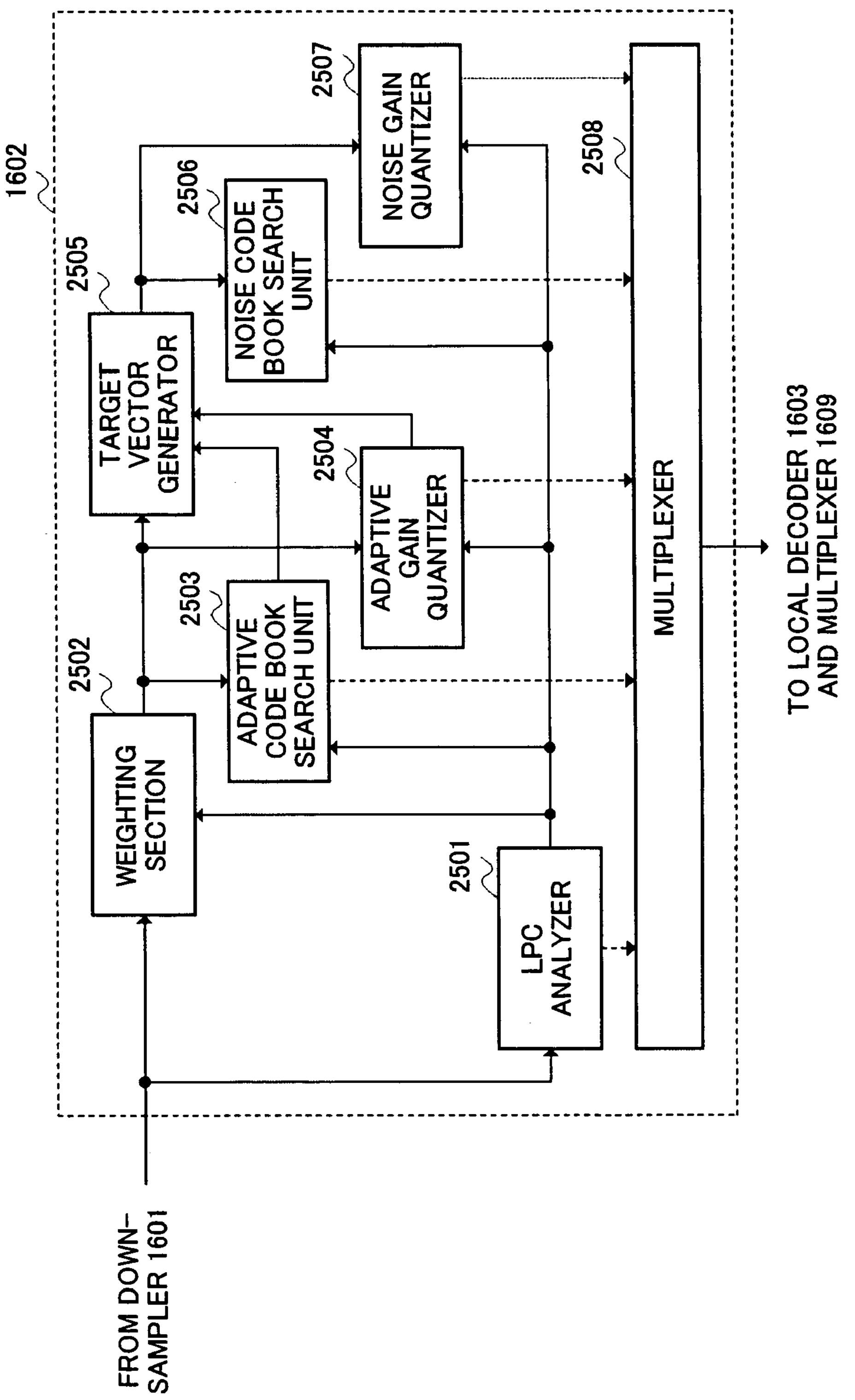
FIG. 26 is a block diagram showing an example of the internal configuration of a base layer coder of Embodiment 10 of the present invention.

In this embodiment an example is described in which CELP is used in base layer coding. FIG. 26 is a block diagram showing an example of the internal configuration of a base layer coder of Embodiment 10 of the present invention. FIG. 26 shows an example of the internal configuration of base layer coder 1602 in FIG. 16. Base layer coder 1602 in FIG. 16 mainly comprises an LPC analyzer 2501, weighting section 2502, adaptive code book search unit 2503, adaptive gain quantizer 2504, target vector generator 2505, noise code book search unit 2506, noise gain quantizer 2507, and multiplexer 2508.

LPC analyzer 2501 calculates the LPC coefficients of a sampling rate FL input signal, converts the LPC coefficients to a parameter suitable for quantization such as the LSP coefficients, and performs quantization. LPC analyzer 2501 then outputs the coding information obtained by this quantization to multiplexer 2508.

Also, LPC analyzer 2501 calculates the quantized LSP coefficients from coding information and converts this to the LPC coefficients, and outputs the quantized LPC coefficients to adaptive code book search unit 2503, adaptive gain quantizer 2504, noise code book search unit 2506, and noise gain quantizer 2507. LPC analyzer 2501 also outputs the original LPC coefficients to weighting section 2502, adaptive code book search unit 2503, adaptive gain quantizer 2504, noise code book search unit 2506, and noise gain quantizer 2507.

Weighting section 2502 performs weighting on the input signal output from down-sampler 1601 based on the LPC coefficients obtained by LPC analyzer 1501. The purpose of this is to perform spectrum shaping so that the quantization distortion spectrum is masked by the input signal spectral envelope.

The adaptive code book is then searched by adaptive code book search unit 2503 with the weighted input signal as the target signal. A signal in which a previously determined excitation signal is repeated on a pitch period basis is called an adaptive vector, and an adaptive code book is composed of adaptive vectors generated at pitch periods of a predetermined range.

If a weighted input signal is designated t(n), and a signal in which an impulse response of a weighted synthesis filter comprising the original LPC coefficients and the quantized LPC coefficients is convoluted to the adaptive vector of pitch period i is designated pi(n), then adaptive code book search unit 2503 outputs pitch period i of the adaptive vector for which evaluation function D of Equation (44) below is minimized to multiplexer 2508 as coding information.

$$D = \sum_{n=0}^{N-1} t^2(n) - \frac{\left(\sum_{n=0}^{N-1} t(n)p_i(n)\right)^2}{\sum_{n=0}^{N-1} p_i^2(n)} \quad (44)$$

Here, N indicates the vector length. As the first term of Equation (44) is independent of pitch period i, adaptive code book search unit 2503 actually calculates only the second term.

Adaptive gain quantizer 2504 performs quantization of the adaptive gain that is multiplied by the adaptive vector. Adaptive gain β is expressed by Equation (45) below. Adaptive gain quantizer 2504 performs scalar quantization of this adaptive gain β, and outputs the coding information obtained in quantization to multiplexer 2508.

$$\beta = \frac{\sum_{n=0}^{N-1} t(n)p_i(n)}{\sum_{n=0}^{N-1} p_i^2(n)} \quad (45)$$

Target vector generator 2505 subtracts the effect of the adaptive vector from the input signal, and generates and outputs the target vector used by noise code book search unit 2506 and noise gain quantizer 2507. In target vector generator 2505, if pi(n) designates a signal in which a weighted synthesis filter impulse response is convoluted to the adaptive vector when evaluation function D expressed by Equation (44) is minimized, and βq designates the quantized adaptive gain when adaptive gain β expressed by Equation (45) undergoes scalar quantization, then target vector t2($n$) is expressed by Equation (46) below.

$$t_2(n) = t(n) - \beta q \cdot p_i(n) \quad (46)$$

Noise code book search unit 2506 carries out a noise code book search using the aforementioned target vector t2($n$), the original LPC coefficients, and the quantized LPC coefficients. Noise code book search unit 2506 can use random noise or a signal learned using a large-amount speech signal, for example. Also, an algebraic code book can be used. The algebraic codebook consists of some of pulses. A feature of such an algebraic code book is that an optimal combination of pulse position and pulse code (polarity) can be determined by a small amount of computation.

If the target vector is designated t2($n$), and a signal in which an impulse response of a weighted synthesis filter is convoluted to the noise vector corresponding to code j is designated cj(n), then noise code book search unit 2506 outputs to multiplexer 2508 index j of the noise vector for which evaluation function D of Equation (47) below is minimized.

$$D = \sum_{n=0}^{N-1} t_2^2(n) - \frac{\left(\sum_{n=0}^{N-1} t_2(n)c_j(n)\right)^2}{\sum_{n=0}^{N-1} c_j^2(n)} \quad (47)$$

Noise gain quantizer 2507 quantizes the noise gain that is multiplied by the noise vector. Noise gain quantizer 2507 calculates adaptive gain γ using Equation (48) below, performs scalar quantization of this noise gain $\gamma$, and outputs the coding information to multiplexer 2508.

$$\gamma = \sum_{n=0}^{N-1} \frac{t_2(n)c_j(n)}{\sum_{n=0}^{N-1} c_j^2(n)} \tag{48}$$

Multiplexer 2508 multiplexes the coding information of the LPC coefficients, adaptive vector, adaptive gain, noise vector, and noise gain coding information, and outputs the resultant information to local decoder 1603 and multiplexer 1609.

Figure 27:
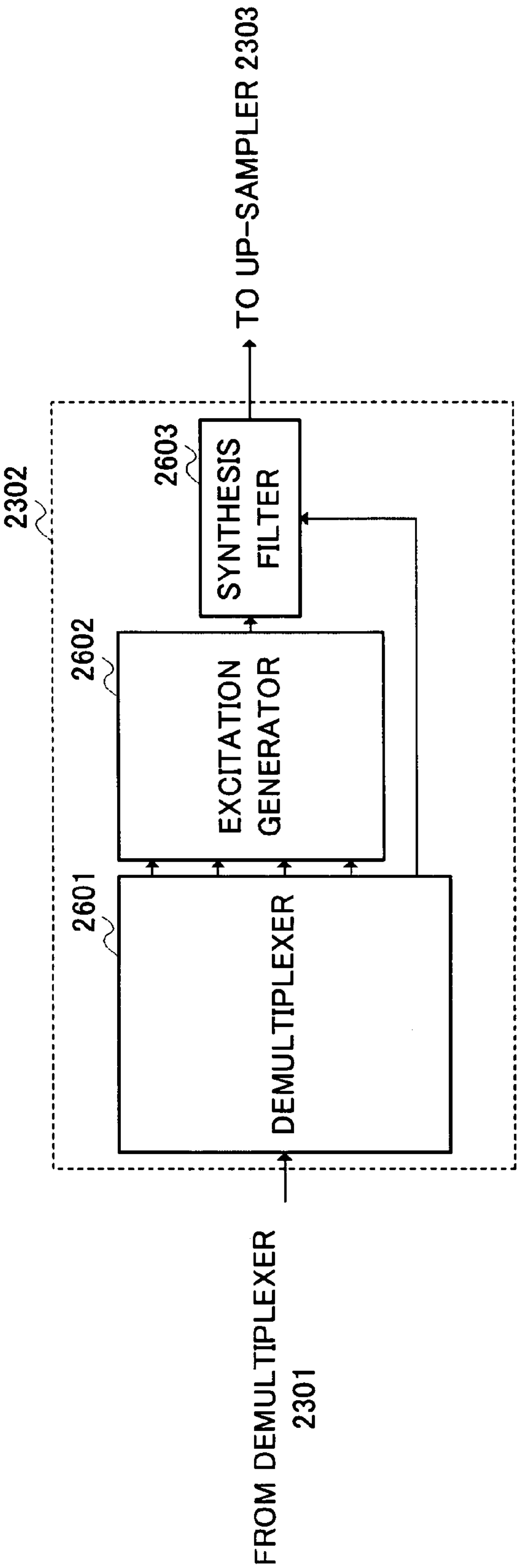
FIG. 27 is a block diagram showing an example of the internal configuration of a base layer decoder of the above embodiment.

The decoding side will now be described. FIG. 27 is a block diagram showing an example of the internal configuration of a base layer decoder of this embodiment. FIG. 27 shows an example of base layer decoder 2302. Base layer decoder 2302 in FIG. 27 mainly comprises a demultiplexer 2601, excitation generator 2602, and synthesis filter 2603.

Demultiplexer 2601 separates first coding information from demultiplexer 2301 into LPC coefficients, adaptive vector, adaptive gain, noise vector, and noise gain coding information, and outputs the adaptive vector, adaptive gain, noise vector, and noise gain coding information to excitation generator 2602. Similarly, demultiplexer 2601 outputs linear predictive coefficients coding information to synthesis filter 2603.

Excitation generator 2602 decodes adaptive vector, adaptive vector gain, noise vector, and noise vector gain coding information, and generates excitation vector ex(n) using Equation (49) below.

$$ex(n)=\beta_q \cdot q(n)-\gamma_q c(n) \tag{49}$$

Here, q(n) indicates an adaptive vector, βq adaptive vector gain, c(n) a noise vector, and γq noise vector gain.

Synthesis filter 2603 performs LPC coefficient decoding from LPC coefficient coding information, and generates synthesized signal syn(n) from the decoded LPC coefficients using Equation (50) below.

$$syn(n) = ex(n) + \sum_{i=1}^{NP} \alpha_q(i) \cdot syn(n-i) \tag{50}$$

Here, αq indicates the decoded LPC coefficients, and NP the order of the LPC coefficients. Synthesis filter 2603 then outputs decoded signal syn(n) decoded in this way to up-sampler 2303.

Thus, according to a sound coding apparatus of this embodiment, by coding an input signal using CELP in the base layer on the transmitting side, and decoding this coded input signal using CELP on the receiving side, it is possible to implement a high-quality base layer at a low bit rate.

Figure 28:
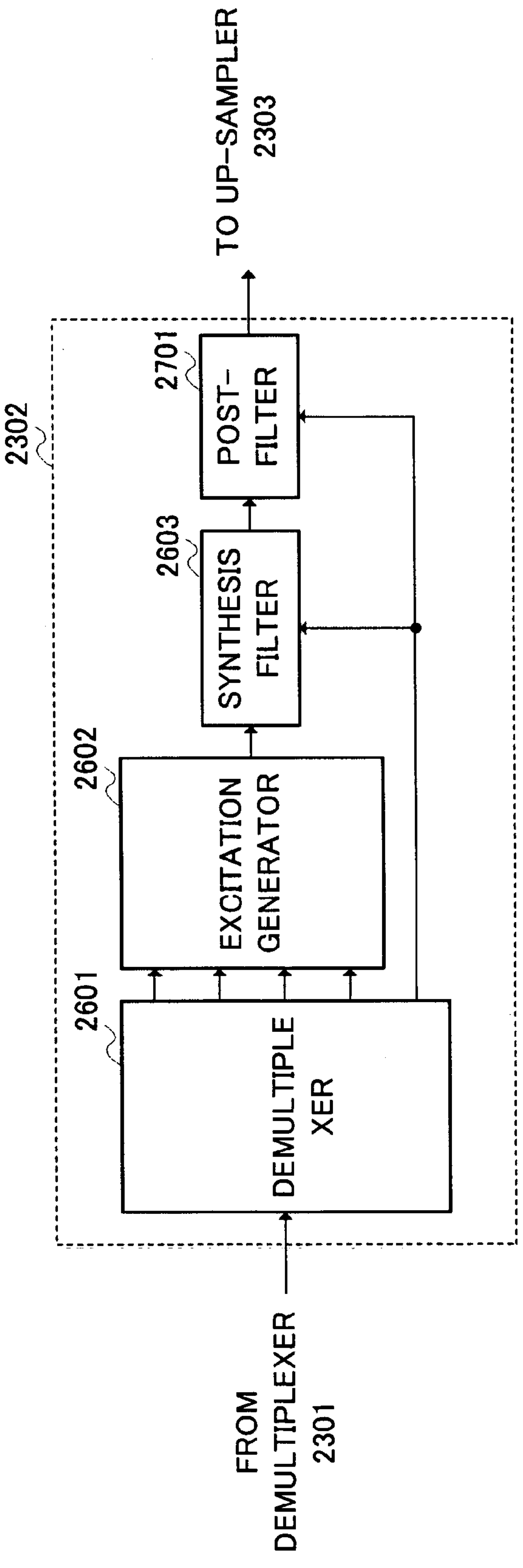
FIG. 28 is a block diagram showing an example of the internal configuration of a base layer decoder of the above embodiment.

In order to suppress perception of quantization distortion, a coding apparatus of this embodiment can also employ a configuration with subordinate connection of a post-filter after synthesis filter 2603. FIG. 28 is a block diagram showing an example of the internal configuration of a base layer decoder of this embodiment. Parts in FIG. 28 identical to those in FIG. 27 are assigned the same reference numerals as in FIG. 27 and detailed descriptions thereof are omitted.

Various kinds of configuration may be employed for post-filter 2701 to achieve suppression of perception of quantization distortion, one typical method being that of using a formant emphasis filter comprising the LPC coefficients obtained by decoding by demultiplexer 2601. Formant emphasis filter Hf(z) is expressed by Equation (51) below.

$$H_f(z) = \frac{A(z/\gamma_n)}{A(z/\gamma_d)}(1-\mu z^{-1}) \tag{51}$$

Here, A(z) indicates an analysis filter comprising the decoded LPC coefficients, and γn, γd, and μ indicate constants that determine filter characteristics.

Embodiment 11

Figure 29:
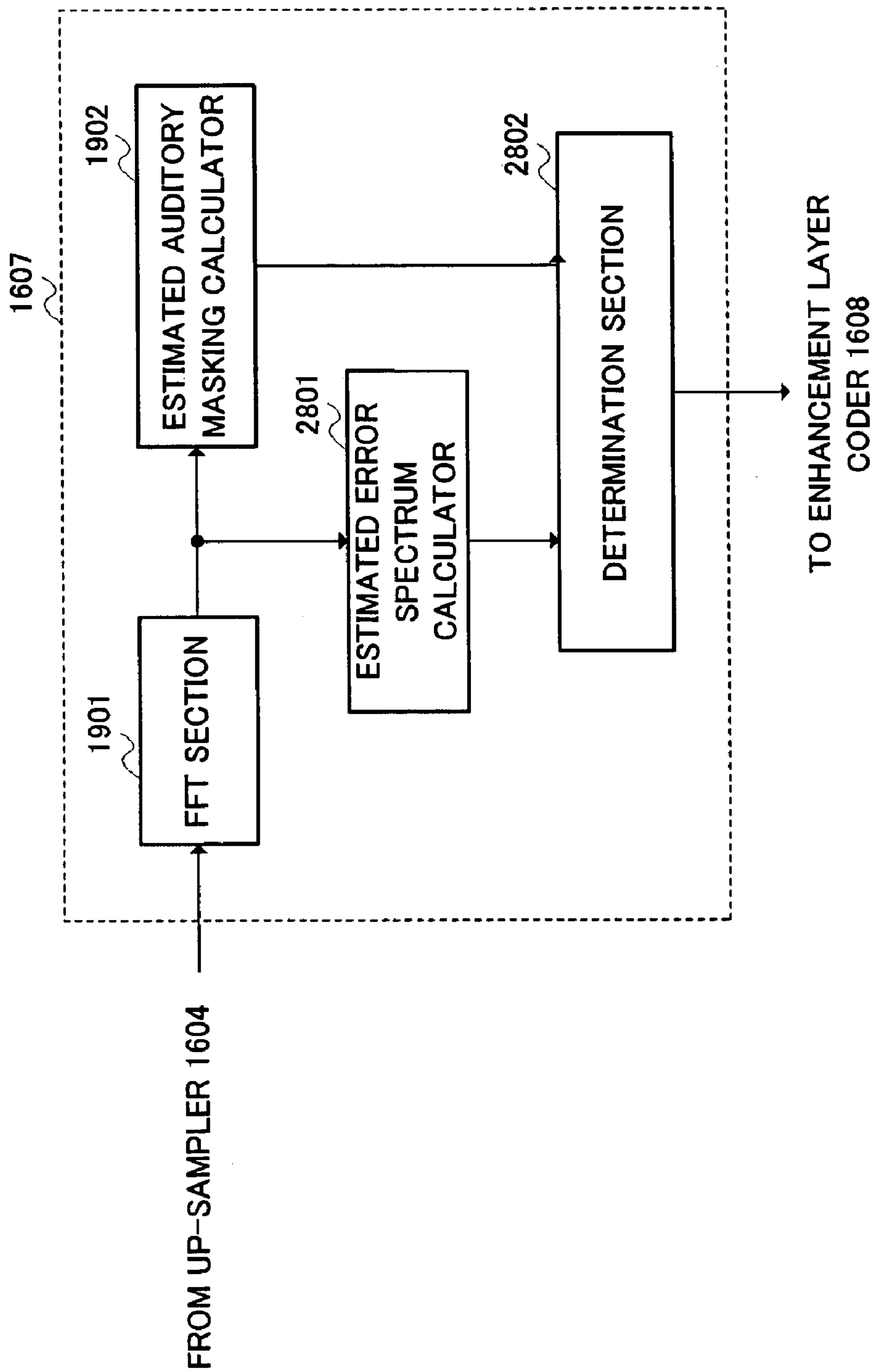
FIG. 29 is a block diagram showing an example of the internal configuration of the frequency determination section of a sound coding apparatus according to Embodiment 11 of the present invention.

FIG. 29 is a block diagram showing an example of the internal configuration of the frequency determination section of a sound coding apparatus according to Embodiment 11 of the present invention. Parts in FIG. 29 identical to those in FIG. 20 are assigned the same reference numerals as in FIG. 20 and detailed descriptions thereof are omitted. Frequency determination section 1607 in FIG. 29 differs from that in FIG. 20 in being provided with an estimated error spectrum calculator 2801 and determination section 2802, and in estimating estimated error spectrum E'(m) from base layer decoded signal amplitude spectrum P(m), and determining a frequency of an error spectrum coded by enhancement layer coder 1608 using estimated error spectrum E'(m) and estimated auditory masking M'(m).

FFT section 1901 performs Fourier transform of base layer decoded signal x(n) output from up-sampler 1604, calculates amplitude spectrum P(m), and outputs amplitude spectrum P(m) to estimated auditory masking calculator 1902 and estimated error spectrum calculator 2801.

Estimated error spectrum calculator 2801 calculates estimated error spectrum E'(m) from base layer decoded signal amplitude spectrum P(m) calculated by FFT section 1901, and outputs estimated error spectrum E'(m) to determination section 2802. Estimated error spectrum E'(m) is calculated by executing processing that approximates base layer decoded signal amplitude spectrum P(m) to flatness. To be specific, estimated error spectrum calculator 2801 calculates estimated error spectrum E'(m) using Equation (52) below.

$$E'(m)=a \cdot P(m)^{\gamma} \tag{52}$$

Here, a and γ are constants of 0 or above and less than 1.

Using estimated error spectrum E'(m) obtained by estimated error spectrum calculator 2801 and estimated auditory masking M'(m) obtained by estimated auditory masking calculator 1902, determination section 2802 determines frequencies for error spectrum coding by enhancement layer coder 1608.

Figure 30:
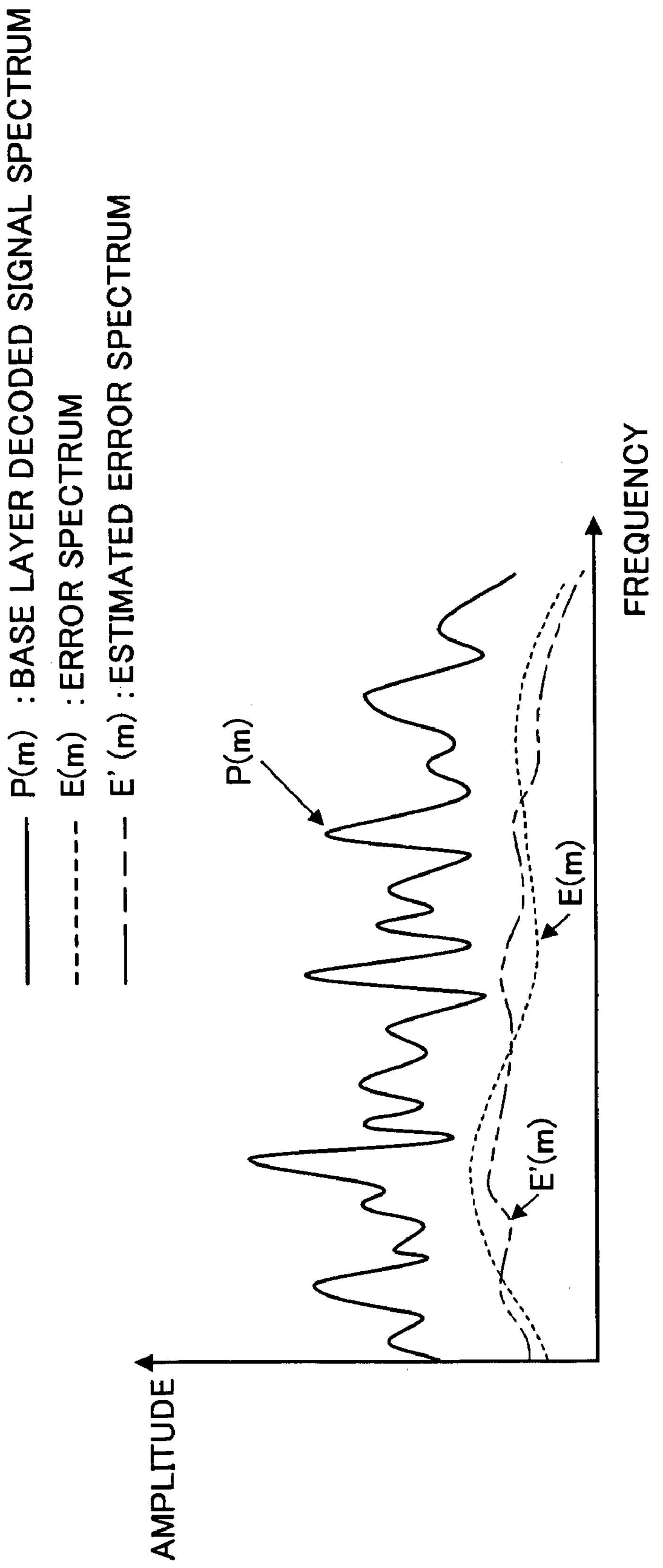
FIG. 30 is a drawing showing an example of a residual error spectrum calculated by an estimated error spectrum calculator of the above embodiment.

Next, an estimated error spectrum calculated by estimated error spectrum calculator 2801 of this embodiment will be described. FIG. 30 is a drawing showing an example of a residual error spectrum calculated by an estimated error spectrum calculator of this embodiment.

As shown in FIG. 30, the spectrum shape of error spectrum E(m) is smoother than that of base layer decoded signal amplitude spectrum P(m), and its total band power is smaller. Therefore, the precision of error spectrum estimation can be improved by flattening the amplitude spectrum P(m) to the power of $\gamma(0<\gamma<1)$, and reducing total band power by multiplying by a $(0<a<1)$.

On the decoding side also, the internal configuration of frequency determination section 2304 of sound decoding apparatus 2300 is the same as that of coding-side frequency determination section 1607 in FIG. 29.

Thus, according to a sound coding apparatus of this embodiment, by smoothing a residual error spectrum estimated from a base layer decoded signal spectrum, the estimated error spectrum can be approximated to the residual error spectrum, and an error spectrum can be coded efficiently in the enhancement layer.

In this embodiment a case has been described in which FFT is used, but a configuration is also possible in which MDCT or other transformation is used instead of FFT, as in above-described Embodiment 9.

Embodiment 12

Figure 31:
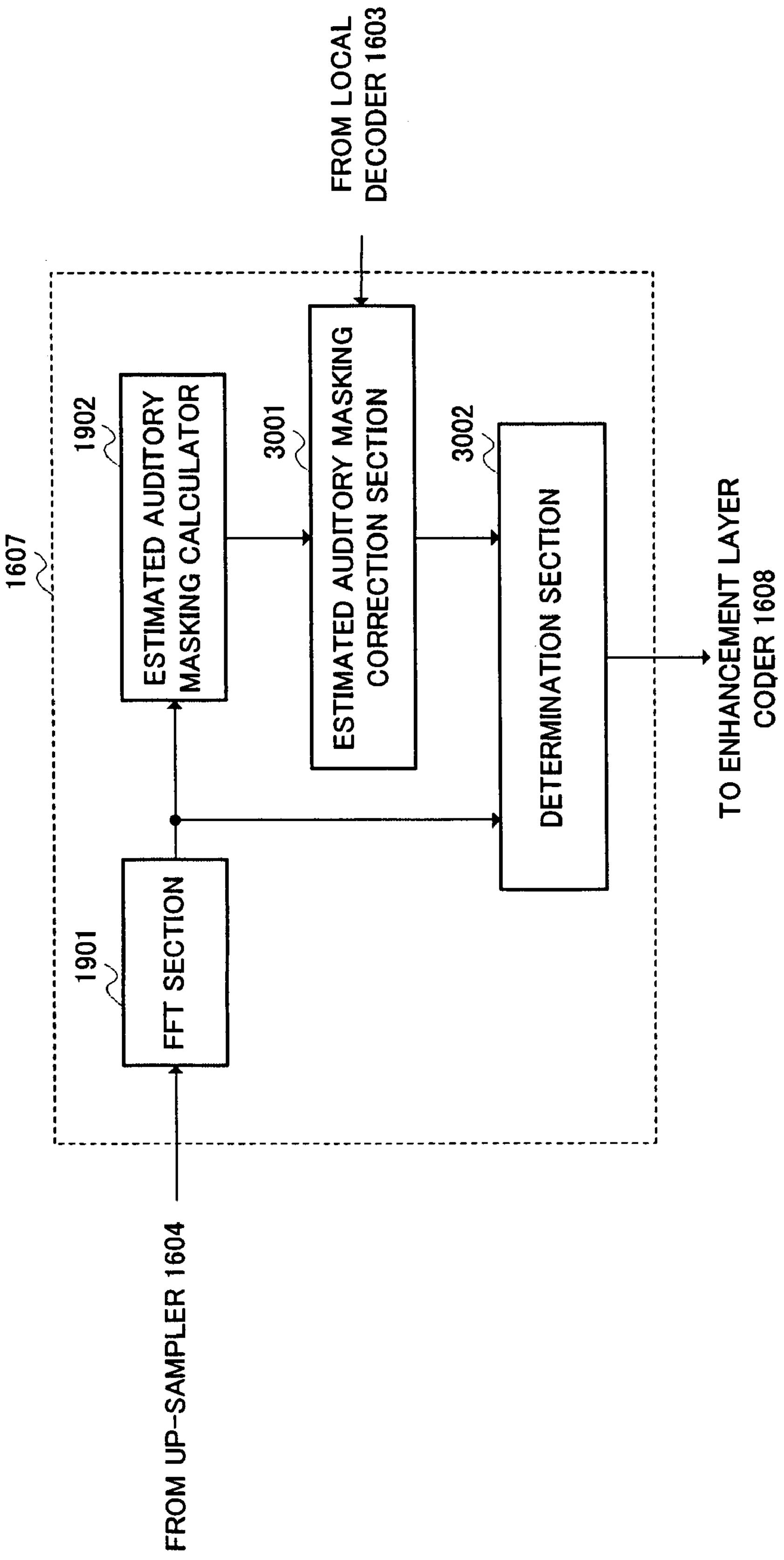
FIG. 31 is a block diagram showing an example of the internal configuration of the frequency determination section of a sound coding apparatus according to Embodiment 12 of the present invention.

FIG. 31 is a block diagram showing an example of the internal configuration of the frequency determination section of a sound coding apparatus according to Embodiment 12 of the present invention. Parts in FIG. 31 identical to those in FIG. 20 are assigned the same reference numerals as in FIG. 20 and detailed descriptions thereof are omitted. Frequency determination section 1607 in FIG. 31 differs from that in FIG. 20 in being provided with an estimated auditory masking correction section 3001 and determination section 3002, and in that frequency determination section 1607, after calculating estimated auditory masking M'(m) by means of estimated auditory masking calculator 1902 from base layer decoded signal amplitude spectrum P(m), applies correction to this estimated auditory masking M'(m) based on local decoder 1603 decoded parameter information.

FFT section 1901 performs Fourier transform of base layer decoded signal x(n) output from up-sampler 1604, calculates amplitude spectrum P(m), and outputs amplitude spectrum P(m) to estimated auditory masking calculator 1902 and determination section 3002. Estimated auditory masking calculator 1902 calculates estimated auditory masking M'(m) using base layer decoded signal amplitude spectrum P(m), and outputs estimated auditory masking M'(m) to estimated auditory masking correction section 3001.

Using base layer decoded parameter information input from local decoder 1603, estimated auditory masking correction section 3001 applies correction to estimated auditory masking M'(m) obtained by estimated auditory masking calculator 1902.

It is here assumed that a first order PARCOR coefficient calculated from the decoded LPC coefficients is supplied as base layer coding information. Generally, the LPC coefficients and PARCOR coefficients represent an input signal spectral envelope. Due to the properties of the PARCOR coefficients, as the order of the PARCOR coefficients is lowered, the shape of a spectral envelope is simplified, and when the order of the PARCOR coefficients is 1, the degree of tilt of a spectrum is indicated.

On the other hand, in the spectral characteristics of a audio or speech input signal, there are cases where power is biased toward the lower region as opposed to the higher region (as with vowels, for example), and cases where the converse is true (as with consonants, for example). A base layer decoded signal is susceptible to the influence of such input signal spectral characteristics, and there is a tendency for spectrum power bias to be emphasized more than necessary.

Thus, in a sound coding apparatus of this embodiment, the precision of estimated masking M'(m) can be improved by correcting excessively emphasized spectral bias in estimated auditory masking correction section 3001 using an aforementioned first order PARCOR coefficient.

Estimated auditory masking correction section 3001 calculates correction filter $H_k(z)$ from first order PARCOR coefficient k(1) output from base layer coder 1602, using Equation (53) below.

$$H_k(z)=1-\beta\cdot k(1)\cdot z^{-1} \tag{53}$$

Here, β indicates a positive constant less than 1. Next, estimated auditory masking correction section 3001 calculates amplitude characteristic K(m) of correction filter $H_k(z)$ using Equation (54) below.

$$K(m)=\left|1-\beta\cdot k(1)\cdot e^{-j\frac{2\pi m}{M}}\right| \tag{54}$$

Then estimated auditory masking correction section 3001 calculates corrected estimated auditory masking M"(m) from correction filter amplitude characteristic K(m), using Equation (55) below.

$$M''(m)=K(m)\cdot M'(m) \tag{55}$$

Estimated auditory masking correction section 3001 then outputs corrected estimated auditory masking M"(m) to determination section 3002 instead of estimated auditory masking M'(m).

Using base layer decoded signal amplitude spectrum P(m), and corrected auditory masking M"(m) output from estimated auditory masking correction section 3001, determination section 3002 determines frequencies for error spectrum coding by enhancement layer coder 1608.

Thus, according to a sound coding apparatus of this embodiment, by calculating auditory masking from an input signal spectrum using masking effect characteristics, and performing quantization so that quantization distortion does not exceed the masking value in enhancement layer coding, it is possible to reduce the number of MDCT coefficients subject to quantization without a degradation of quality, and to perform high-quality coding at a low bit rate.

Thus, according to a sound coding apparatus of this embodiment, by applying correction based on base layer coder decoded parameter information to estimated auditory masking, it is possible to improve the precision of estimated auditory masking, and to perform efficient error spectrum coding in the enhancement layer.

On the decoding side also, the internal configuration of frequency determination section 2304 of sound decoding apparatus 2300 is the same as that of coding-side frequency determination section 1607 in FIG. 31.

Figure 32:
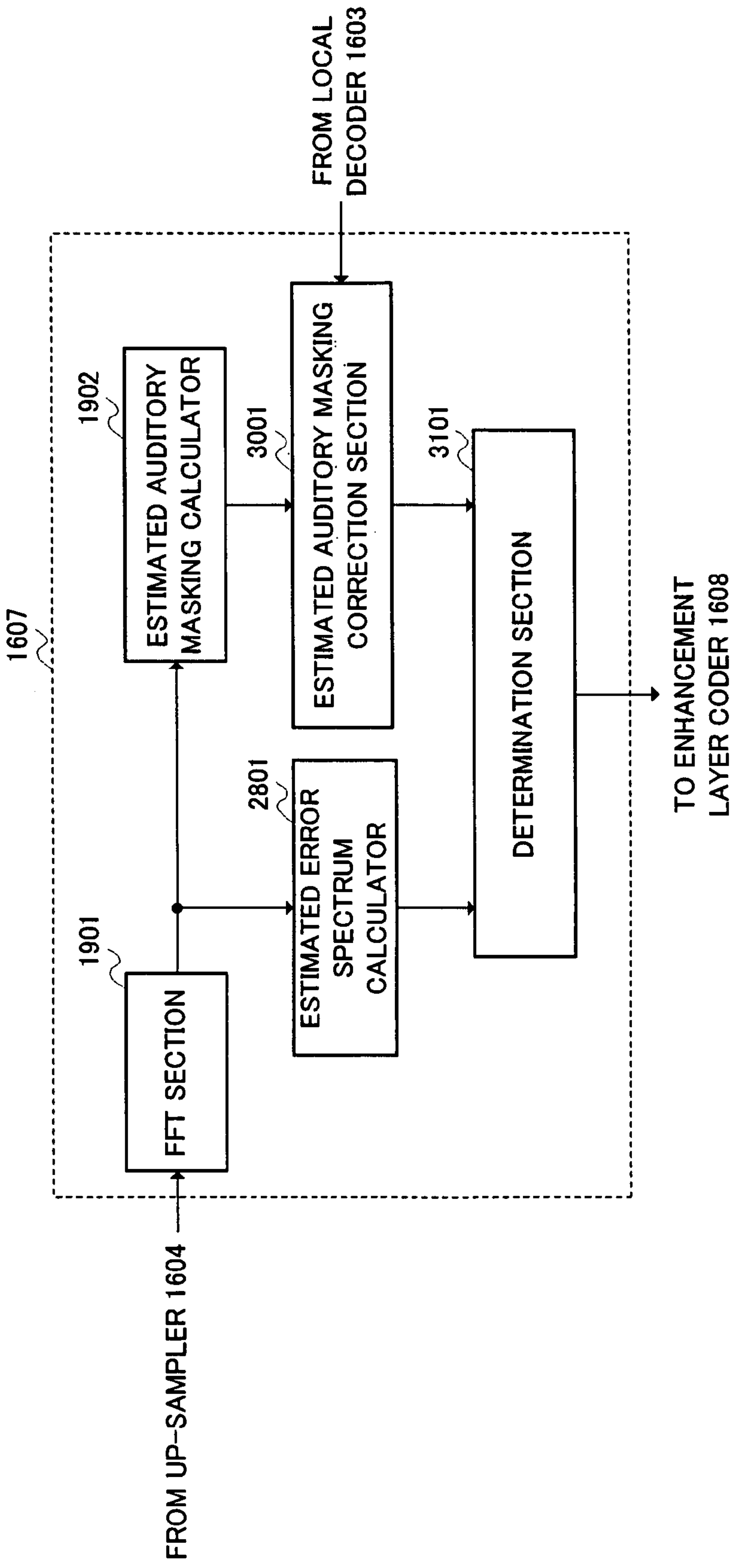
FIG. 32 is a block diagram showing an example of the internal configuration of the frequency determination section of a sound coding apparatus of the above embodiment.

It is also possible for frequency determination section 1607 of this embodiment to employ a configuration combining this embodiment and Embodiment 11. FIG. 32 is a block diagram showing an example of the internal configuration of the frequency determination section of a sound coding apparatus of this embodiment. Parts in FIG. 32 identical to those in FIG. 20 are assigned the same reference numerals as in FIG. 20 and detailed descriptions thereof are omitted.

FFT section 1901 performs Fourier transform of base layer decoded signal x(n) output from up-sampler 1604, calculates amplitude spectrum P(m), and outputs amplitude spectrum P(m) to estimated auditory masking calculator 1902 and estimated error spectrum calculator 2801.

Estimated auditory masking calculator 1902 calculates estimated auditory masking M'(m) using base layer decoded signal amplitude spectrum P(m), and outputs estimated auditory masking M'(m) to estimated auditory masking correction section 3001.

In estimated auditory masking correction section 3001, base layer coded parameter information input from local decoder 1603 applies correction to estimated auditory masking M'(m) obtained by estimated auditory masking calculator 1902.

Estimated error spectrum calculator 2801 calculates estimated error spectrum E'(m) from base layer decoded signal amplitude spectrum P(m) calculated by FFT section 1901, and outputs estimated error spectrum E'(m) to determination section 3101.

Using estimated error spectrum E'(m) estimated by estimated error spectrum calculator 2801 and corrected auditory masking M"(m) output from estimated auditory masking correction section 3001, determination section 3101 determines a frequency subject to error spectrum coding by enhancement layer coder 1608.

In this embodiment a case has been described in which FFT is used, but a configuration is also possible in which MDCT or other transform technique is used instead of FFT, as in above-described Embodiment 9.

Embodiment 13

Figure 33:
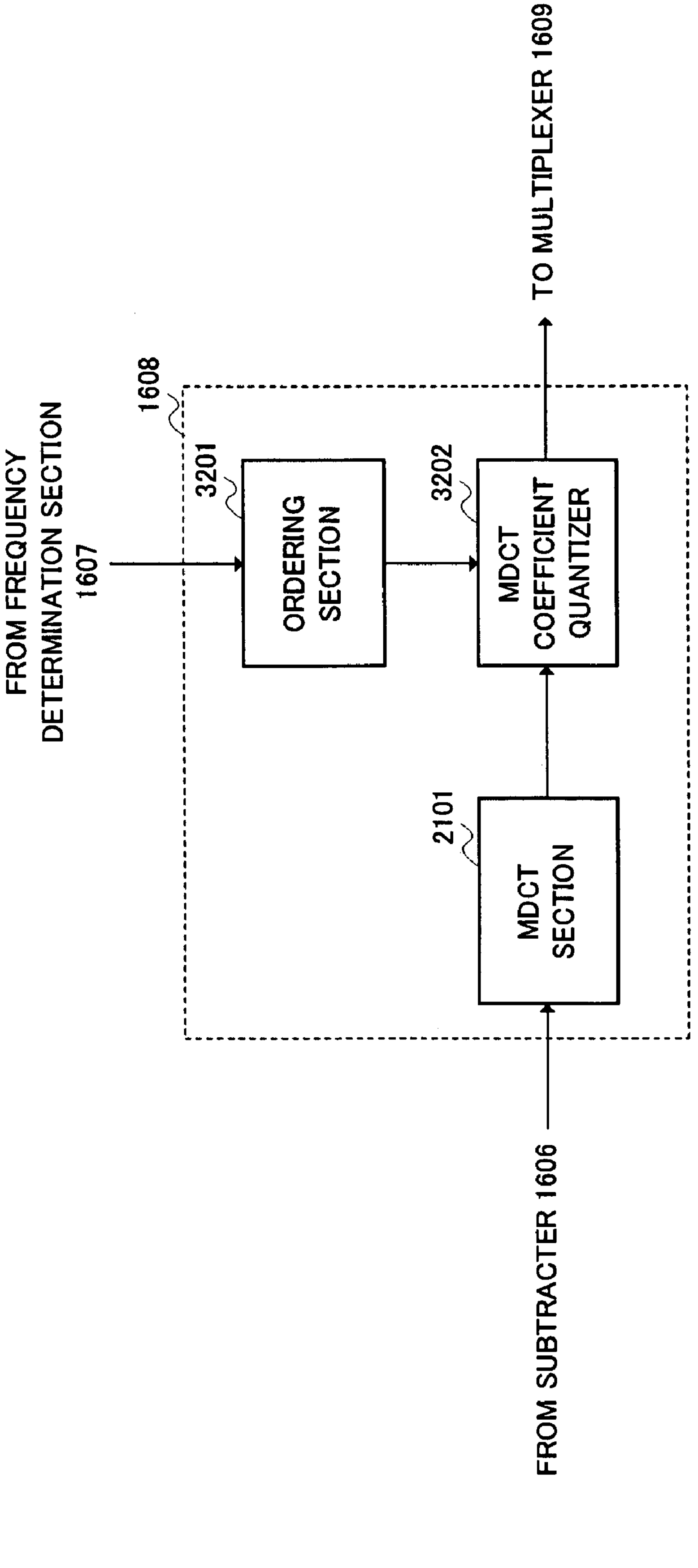
FIG. 33 is a block diagram showing an example of the internal configuration of the enhancement layer coder of a sound coding apparatus according to Embodiment 13 of the present invention.

FIG. 33 is a block diagram showing an example of the internal configuration of the enhancement layer coder of a sound coding apparatus according to Embodiment 13 of the present invention. Parts in FIG. 33 identical to those in FIG. 22 are assigned the same reference numerals as in FIG. 22 and detailed descriptions thereof are omitted. The enhancement layer coder in FIG. 33 differs from the enhancement layer coder in FIG. 22 in being provided with a ordering section 3201 and MDCT coefficient quantizer 3202, and the weighting is performed by frequency on a frequency supplied from frequency determination section 1607 in accordance with the amount of estimated distortion value D(m).

In FIG. 33, MDCT section 2101 multiplies the input signal output from subtracter 1606 by an analysis window, then performs MDCT (Modified Discrete Cosine Transform) processing to obtain MDCT coefficients, and outputs the MDCT coefficients to MDCT coefficient quantizer 3202.

Ordering section 3201 receives frequency information obtained by frequency determination section 1607, and calculates the amount by which estimated error spectrum E'(m) of each frequency exceeds estimated auditory masking M'(m) (hereinafter referred to as the estimated distortion value), D(m). This estimated distortion value D(m) is defined by Equation (56) below.

$$D(m)=E'(m)-M'(m) \quad (56)$$

Here, ordering section 3201 calculates only estimated distortion values D(m) that satisfy Equation (57) below.

$$E'(m)-M'(m)>0 \quad (57)$$

Then ordering section 3201 performs ordering in high-to-low estimated distortion value D(m) order, and outputs the corresponding frequency information to MDCT coefficient quantizer 3202. MDCT coefficient quantizer 3202 performs quantization, allocating bits proportionally to error spectra E(m) positioned at frequencies in high-to-low distortion value D(m) order based on the estimated distortion value D(m).

As an example, a case will here be described in which frequencies sent from the frequency determination section and estimated distortion values are as shown in FIG. 34. FIG. 34 is a drawing showing an example of ranking of estimated distortion values by an ordering section of this embodiment.

Ordering section 3201 rearranges frequencies in high-to-low estimated distortion value D(m) order based on the information in FIG. 34. In this example, the frequency m order obtained as a result of processing by ordering section 3201 is: 7, 8, 4, 9, 1, 11, 3, 12. Ordering section 3201 outputs this ordering information to MDCT coefficient quantizer 3202.

Within error spectrum E(m) given by MDCT section 2101, MDCT coefficient quantizer 3202 quantizes E(7), E(8), E(4), E(9), E(1), E(11), E(3), E(12), based on the ordering information given by ordering section 3201.

At this time, there is allocation of many bits used for error spectrum quantization at the start of the order, and allocation of progressively fewer bits toward the end of the order. That is to say, the larger the estimated distortion value D(m) of a frequency, the greater is the allocation of bits used for error spectrum quantization, and the smaller the estimated distortion value D(m) of a frequency, the smaller is the allocation of bits used for error spectrum quantization.

For example, bit allocation may be executed as follows: 8 bits for E(7), 7 bits for E(8) and E(4), 6 bits for E(9) and E(1), and 8 bits for E(11), E(3), and E(12). Performing adaptive bit allocation according to estimated distortion value D(m) in this way improves quantization efficiency.

When vector quantization is applied, enhancement layer coder 1608 configures vectors in order from the error spectrum located at the start of the order, and performs vector quantization for the respective vectors. At this time, vector configuration and quantization bit allocation are performed so that bit allocation is greater for an error spectrum located at the start of the order, and smaller for an error spectrum located at the end of the order. In the example in FIG. 34, three vectors—two-dimensional, two-dimensional, and four-dimensional—are configured, with V1=(E(7), E(8)), V2=(E(4), E(9)), and V3=E(1), E(11), E(3), E(12)), and the bit allocations are 10 bits for V1, 8 bits for V2, and 8 bits for V3.

Thus, according to a sound coding apparatus of this embodiment, an improvement in quantization efficiency can be achieved by, in enhancement layer coding, performing coding with a large amount of information allocated to frequencies for which the amount by which the estimated error spectrum exceeds estimated auditory masking is large.

Figure 35:
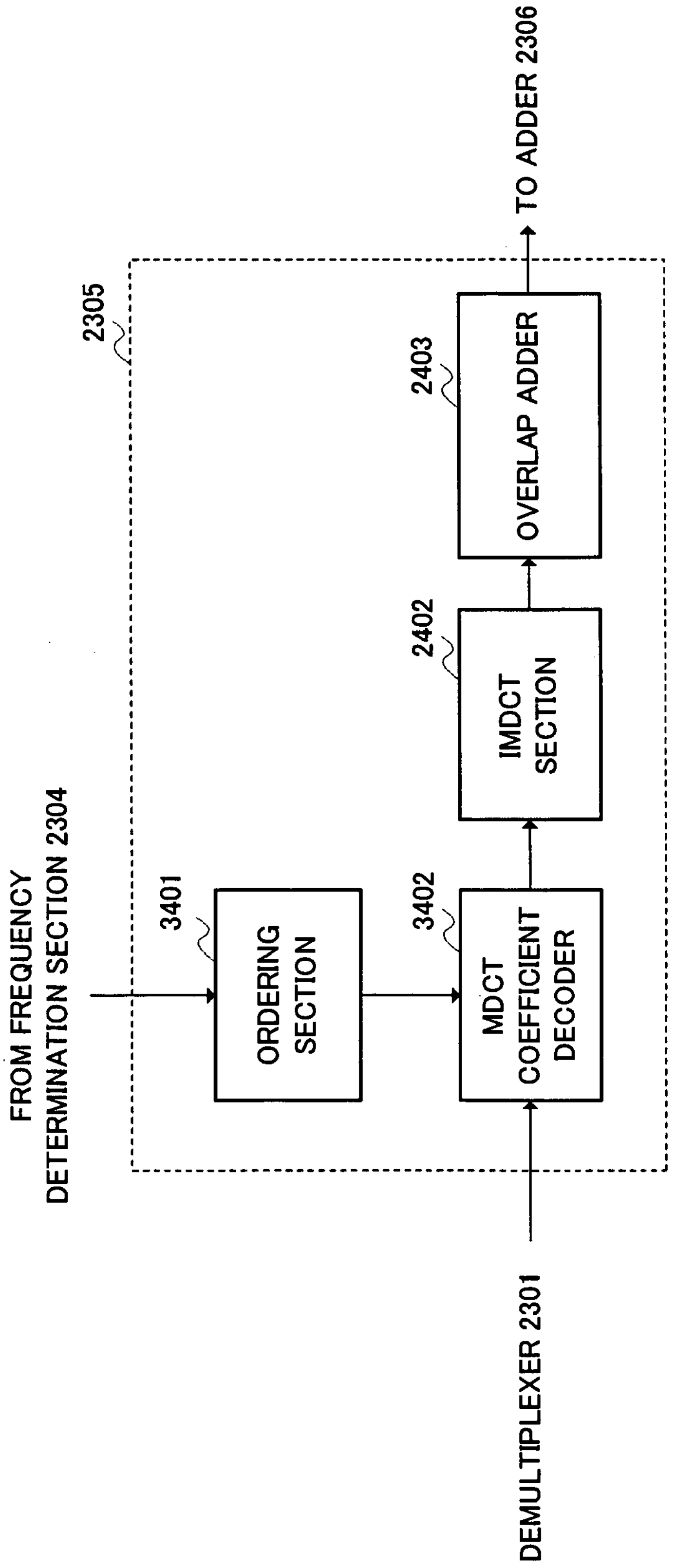
FIG. 35 is a block diagram showing an example of the internal configuration of the enhancement layer decoder of a sound decoding apparatus according to Embodiment 13 of the present invention.

The decoding side will now be described. FIG. 35 is a block diagram showing an example of the internal configuration of the enhancement layer decoder of a sound decoding apparatus according to Embodiment 13 of the present invention. Parts in FIG. 35 identical to those in FIG. 25 are assigned the same reference numerals as in FIG. 25 and detailed descriptions thereof are omitted. Enhancement layer decoder 2305 in FIG. 35 differs from that in FIG. 25 in being provided with an ordering section 3401 and MDCT coefficient decoder 3402, and in that frequencies supplied from frequency determination section 2304 are ordered in accordance with the amount of estimated distortion value D(m).

Ordering section 3401 calculates estimated distortion value D(m) using Equation (56) above. Ordering section 3401 has the same configuration as above-described ordering section 3201. By means of this configuration, it is possible to decode coding information of the above-described sound coding method that enables adaptive bit allocation to be performed and an improvement inquantization efficiency to be achieved.

MDCT coefficient decoder 3402 decodes second coding information output from demultiplexer 2301 using frequency information ordered in accordance with the amount of estimated distortion value D(m). To be specific, MDCT coefficient decoder 3402 positions the decoded MDCT coefficients corresponding to a frequency supplied from frequency determination section 2304, and supplies zero for other frequencies. IMDCT section 2402 then executes inverse MDCT processing on the MDCT coefficients obtained from MDCT coefficient decoder 2401, and generates a time domain signal.

Overlap adder 2403 multiplies the aforementioned signal by a window function for combining, and overlaps the time domain signal decoded in the previous frame and the current frame, performing addition, and generates an output signal. Overlap adder 2403 outputs this output signal to adder 2306.

Thus, according to a sound decoding apparatus of this embodiment, an improvement in quantization efficiency can be achieved by, in enhancement layer coding, performing vector quantization with adaptive bit allocation performed according to the amount by which an estimated error spectrum exceeds estimated auditory masking.

Embodiment 14

Figure 36:
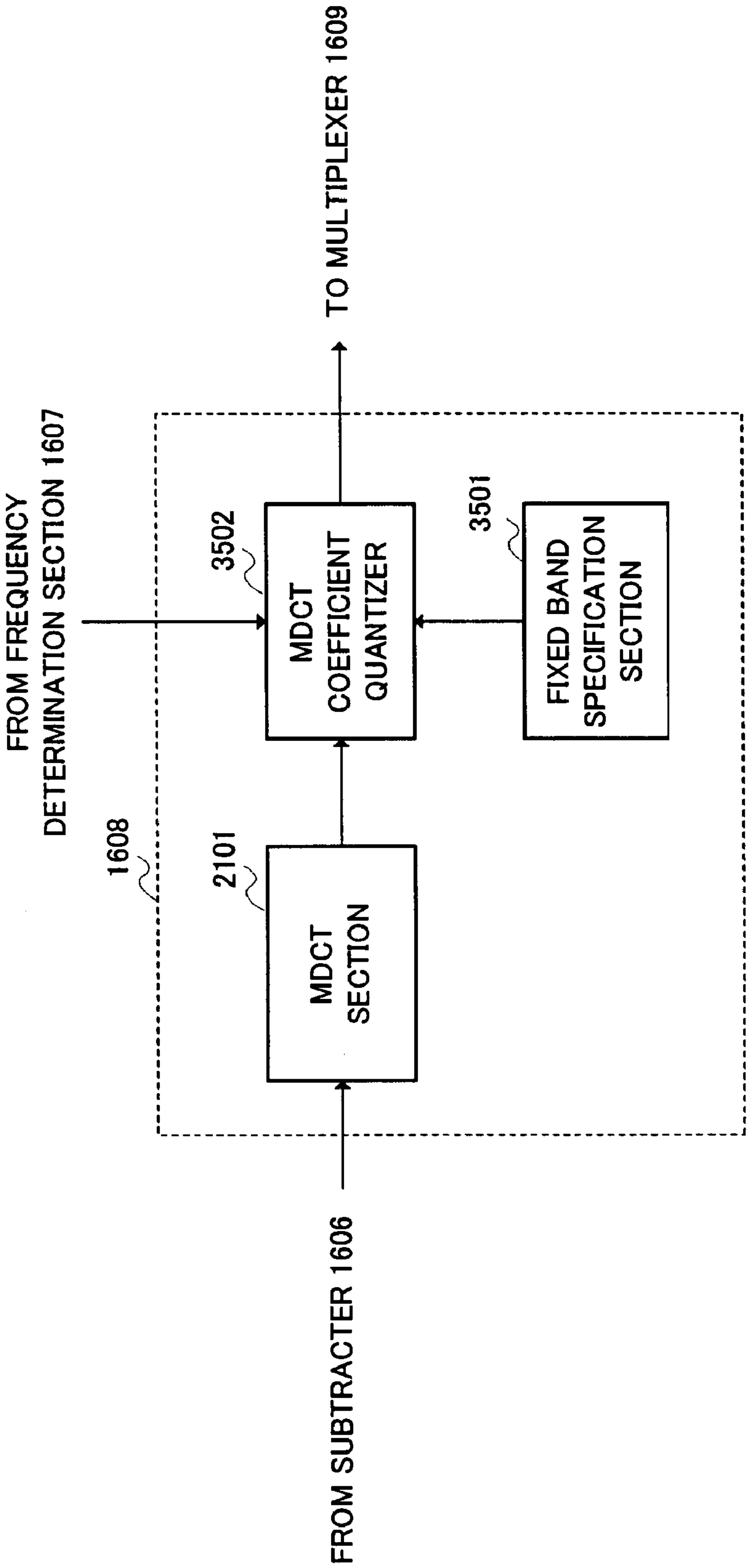
FIG. 36 is a block diagram showing an example of the internal configuration of the enhancement layer coder of a sound coding apparatus according to Embodiment 14 of the present invention.

FIG. 36 is a block diagram showing an example of the internal configuration of the enhancement layer coder of a sound coding apparatus according to Embodiment 14 of the present invention. Parts in FIG. 36 identical to those in FIG. 22 are assigned the same reference numerals as in FIG. 22 and detailed descriptions thereof are omitted. The enhancement layer coder in FIG. 36 differs from the enhancement layer coder in FIG. 22 in being provided with a fixed band specification section 3501 and MDCT coefficient quantizer 3502, and in that the MDCT coefficients included in a band specified beforehand is quantized together with the frequencies obtained from frequency determination section 1607.

In FIG. 36, a band important in terms of auditory perception is set beforehand in fixed band specification section 3501. It is here assumed that "m=15, 16" is set for frequencies included in the set band.

MDCT coefficient quantizer 3502 categorizes an input signal into coefficients to be quantized and coefficients not to be quantized using auditory masking output from frequency determination section 1607 in an input signal from MDCT section 2101, and encodes the coefficients to be quantized and also the coefficients in a band set by fixed band specification section 3501.

Assuming the relevant frequencies to be as shown in FIG. 34, error spectra E(1), E(3), E(4), E(7), E(8), E(9), E(11), E(12), and error spectra E(15), E(16) of frequencies specified by fixed band specification section 3501 are quantized by MDCT coefficient quantizer 3502.

Thus, according to a sound coding apparatus of this embodiment, by forcibly quantizing a band that is unlikely to be selected as an object of quantization but that is important from an auditory standpoint, even if a frequency that should really be selected as an object of coding is not selected, an error spectrum located at a frequency included in a band that is important from an auditory standpoint is quantized without fail, enabling quality to be improved.

Figure 37:
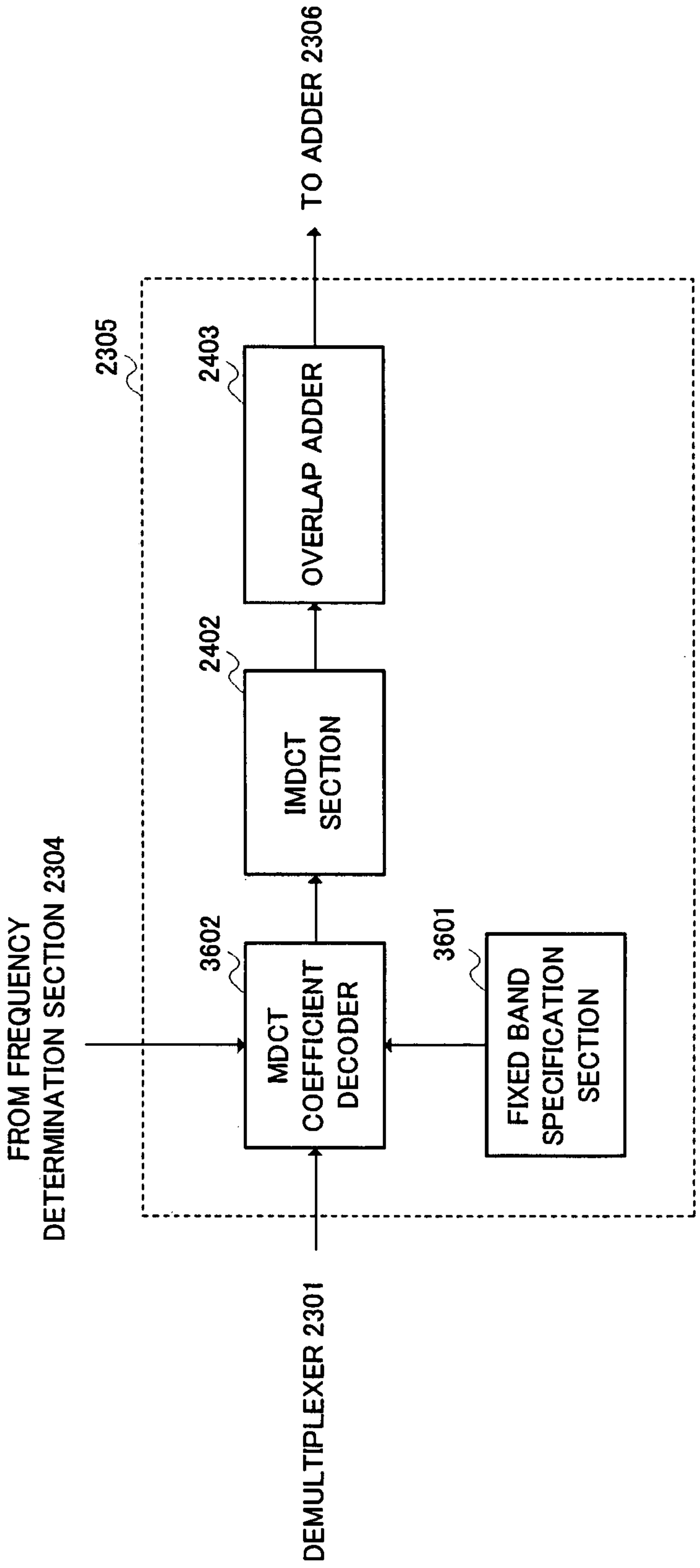
FIG. 37 is a block diagram showing an example of the internal configuration of the enhancement layer decoder of a sound decoding apparatus according to Embodiment 14 of the present invention.

The decoding side will now be described. FIG. 37 is a block diagram showing an example of the internal configuration of the enhancement layer decoder of a sound decoding apparatus according to Embodiment 14 of the present invention. Parts in FIG. 37 identical to those in FIG. 25 are assigned the same reference numerals as in FIG. 25 and detailed descriptions thereof are omitted. The enhancement layer decoder in FIG. 37 differs from the enhancement layer decoder in FIG. 25 in being provided with a fixed band specification section 3601 and MDCT coefficient decoder 3602, and in that the MDCT coefficients included in a band specified beforehand is decoded together with a frequency obtained from frequency determination section 2304.

In FIG. 37, a band important in terms of auditory perception is set beforehand in fixed band specification section 3601.

MDCT coefficient decoder 3602 decodes an MDCT coefficient quantized from second coding information output from demultiplexer 2301 based on error spectrum frequencies subject to decoding output from frequency determination section 2304. To be specific, MDCT coefficient decoder 3602 positions decoded MDCT coefficients corresponding to frequencies indicated by frequency determination section 2304 and fixed band specification section 3601, and supplies zero for other frequencies.

IMDCT section 2402 executes inverse MDCT processing on the MDCT coefficients output from MDCT coefficient decoder 3602, generates a time domain signal, and outputs this time domain signal to overlap adder 2403.

Thus, according to a sound decoding apparatus of this embodiment, by decoding the MDCT coefficients included in a band specified beforehand, it is possible to decode a signal in which a band that is unlikely to be selected as an object of quantization but that is important from an auditory standpoint has been forcibly quantized, and even if the frequencies that should really be selected as an object of coding on the coding side is not selected, an error spectrum located at the frequencies included in a band that is important from an auditory standpoint is quantized without fail, enabling quality to be improved.

Figure 38:
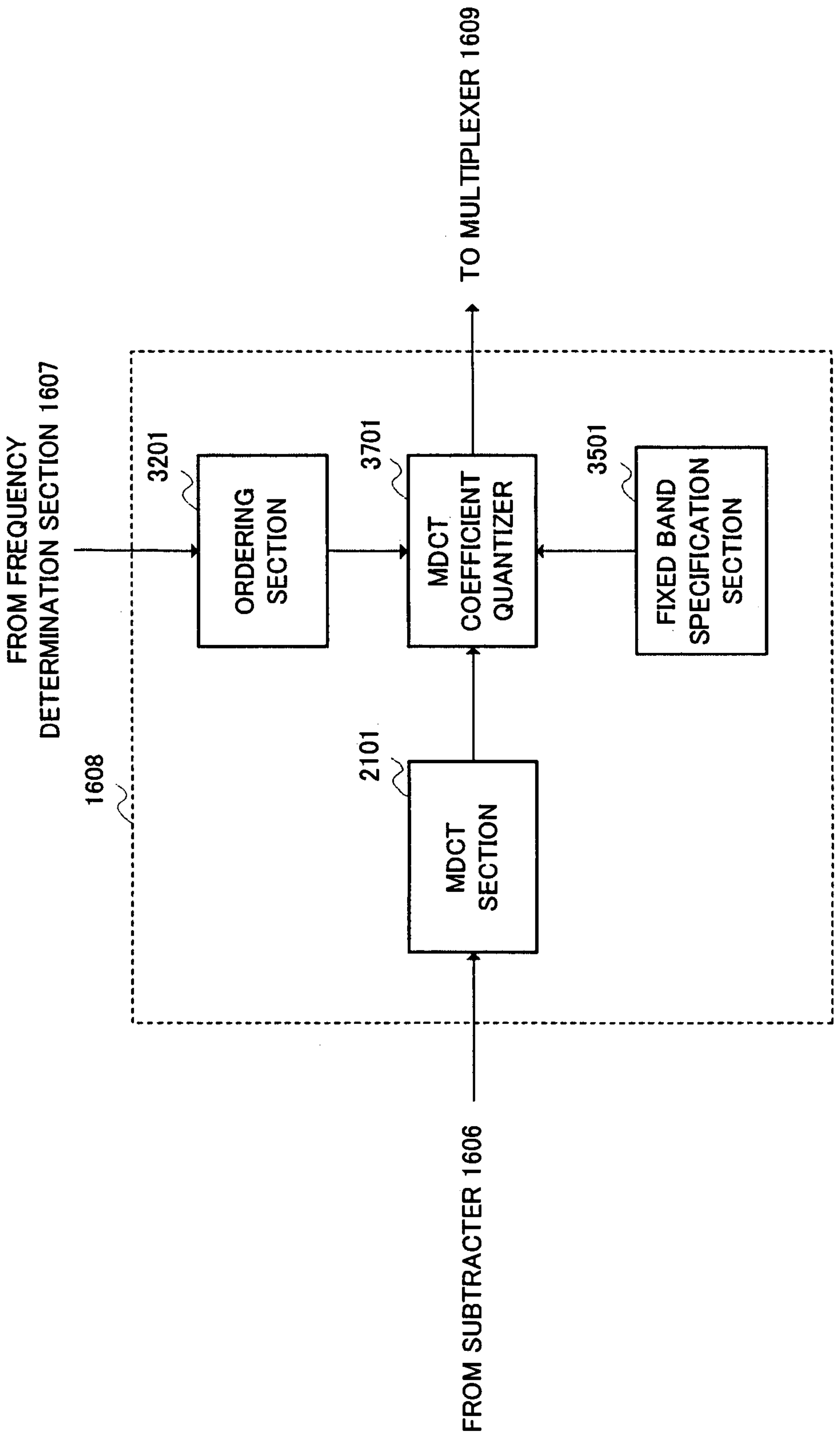
FIG. 38 is a block diagram showing an example of the internal configuration of the frequency determination section of a sound coding apparatus of the above embodiment.

It is also possible for an enhancement layer coder and enhancement layer decoder of this embodiment to employ a configuration combining this embodiment and Embodiment 13. FIG. 38 is a block diagram showing an example of the internal configuration of the frequency determination section of a sound coding apparatus of this embodiment. Parts in FIG. 38 identical to those in FIG. 22 are assigned the same reference numerals as in FIG. 22 and detailed descriptions thereof are omitted.

In FIG. 38, MDCT section 2101 multiplies the input signal output from subtracter 1606 by an analysis window, then performs MDCT (Modified Discrete Cosine Transform) processing to obtain the MDCT coefficients, and outputs the MDCT coefficients to MDCT coefficient quantizer 3701.

Ordering section 3201 receives frequency information obtained by frequency determination section 1607, and calculates the amount by which estimated error spectrum E'(m) of each frequency exceeds estimated auditory masking M'(m) (hereinafter referred to as the estimated distortion value), D(m).

A band important in terms of auditory perception is set beforehand in fixed band specification section 3501.

MDCT coefficient quantizer 3701 performs quantization, allocating bits proportionally to error spectra E(m) positioned at frequencies in high-to-low distortion value D(m) order based on frequency information ordered according to estimated distortion value D(m). MDCT coefficient quantizer 3701 also encodes the coefficients in a band set by fixed band specification section 3501.

Figure 39:
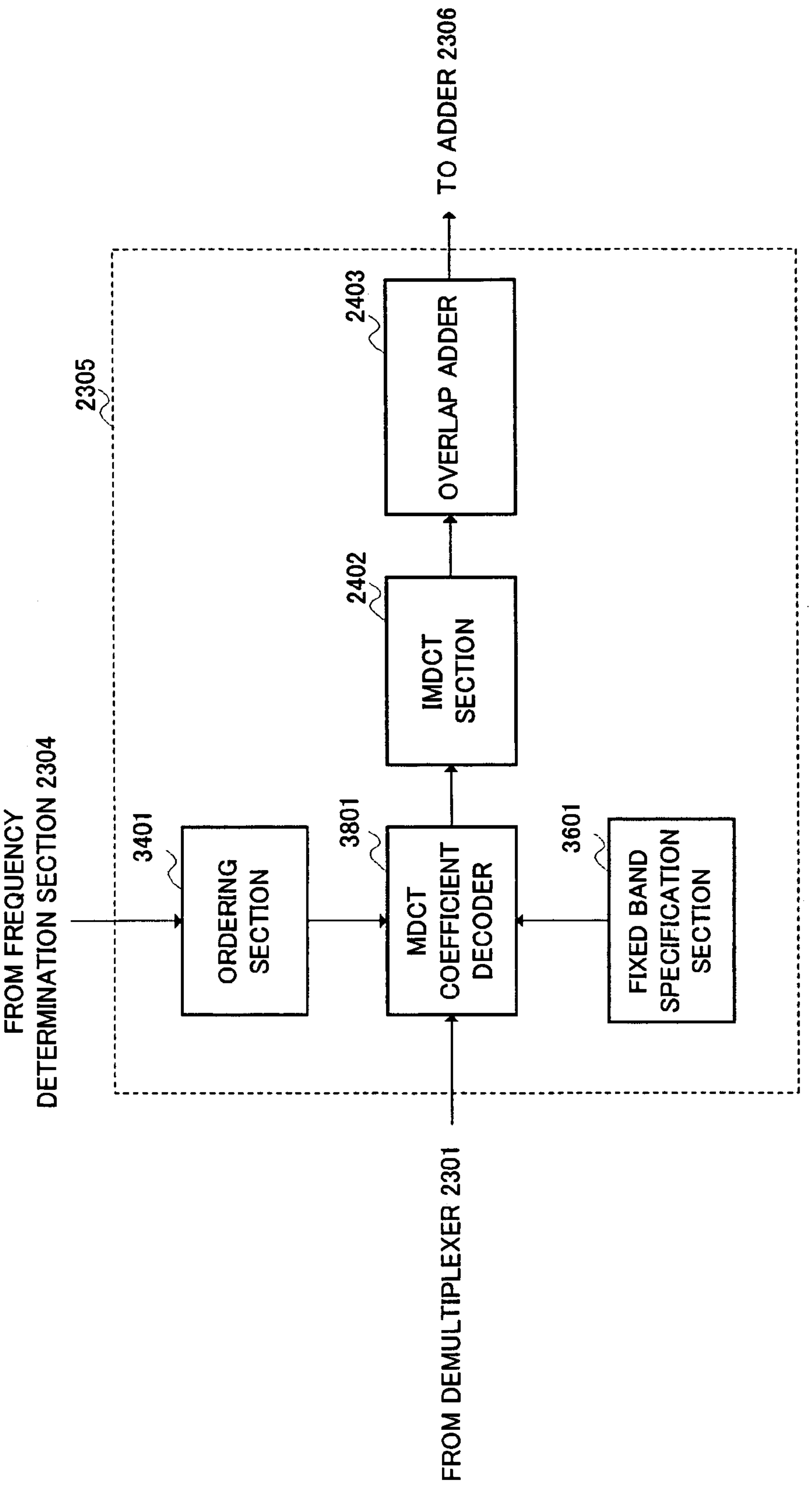
FIG. 39 is a block diagram showing an example of the internal configuration of the enhancement layer decoder of a sound decoding apparatus according to Embodiment 14 of the present invention.

The decoding side will now be described. FIG. 39 is a block diagram showing an example of the internal configuration of the enhancement layer decoder of a sound decoding apparatus according to Embodiment 14 of the present invention. Parts in FIG. 39 identical to those in FIG. 25 are assigned the same reference numerals as in FIG. 25 and detailed descriptions thereof are omitted.

In FIG. 39, ordering section 3401 receives frequency information obtained by frequency determination section 2304, and calculates the amount by which estimated error spectrum E'(m) of each frequency exceeds estimated auditory masking M'(m) (hereinafter referred to as the estimated distortion value), D(m).

Then ordering section 3401 performs ordering in high-to-low estimated distortion value D(m) order, and outputs the corresponding frequency information to MDCT coefficient decoder 3801. A band important in terms of auditory perception is set beforehand in fixed band specification section 3601.

MDCT coefficient decoder 3801 decodes the MDCT coefficients quantized from second coding information output from demultiplexer 2301 based on the error spectrum frequencies subject to decoding output from ordering section 3401. To be specific, MDCT coefficient decoder 3801 positions decoded MDCT coefficients corresponding to frequencies indicated by ordering section 3401 and fixed band specification section 3601, and supplies zero for other frequencies.

IMDCT section 2402 executes inverse MDCT processing on the MDCT coefficients output from MDCT coefficient decoder 3801, generates a time domain signal, and outputs this time domain signal to overlap adder 2403.

Embodiment 15

Figure 40:
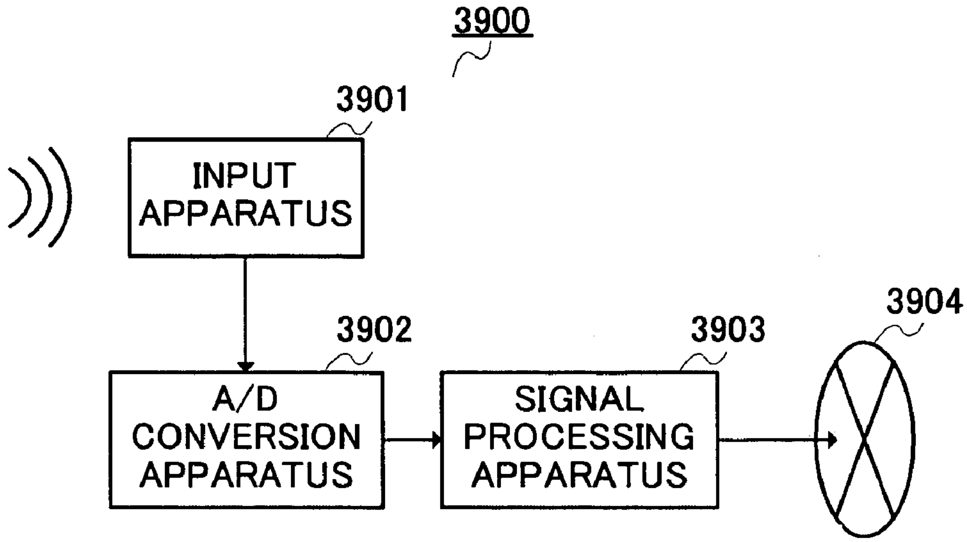
FIG. 40 is a block diagram showing the configuration of a communication apparatus according to Embodiment 15 of the present invention.

Embodiment 15 of the present invention will now be described with reference to the attached drawings. FIG. 40 is a block diagram showing the configuration of a communication apparatus according to Embodiment 15 of the present invention. A feature of this embodiment is that signal processing apparatus 3903 in FIG. 40 is configured as one of the sound coding apparatuses shown in above-described Embodiment 1 through Embodiment 14.

As shown in FIG. 40, a communication apparatus 3900 according to Embodiment 15 of the present invention comprises an input apparatus 3901, A/D conversion apparatus 3902, and signal processing apparatus 3903 connected to a network 3904.

A/D conversion apparatus 3902 is connected to an output terminal of input apparatus 3901. An input terminal of signal processing apparatus 3903 is connected to an output terminal of A/D conversion apparatus 3902. An output terminal of signal processing apparatus 3903 is connected to network 3904.

Input apparatus 3901 converts a sound wave audible to the human ear to an analog signal, which is an electrical signal, and supplies this analog signal to A/D conversion apparatus 3902. A/D conversion apparatus 3902 converts the analog signal to a digital signal, and supplies this digital signal to signal processing apparatus 3903. Signal processing apparatus 3903 encodes the input digital signal and generates code, and outputs this code to network 3904.

Thus, according to a communication apparatus of this embodiment of the present invention, effects such as shown in above-described Embodiments 1 through 14 can be obtained in communications, and it is possible to provide a sound coding apparatus that encodes an acoustic signal efficiently with a small number of bits.

Embodiment 16

Figure 41:
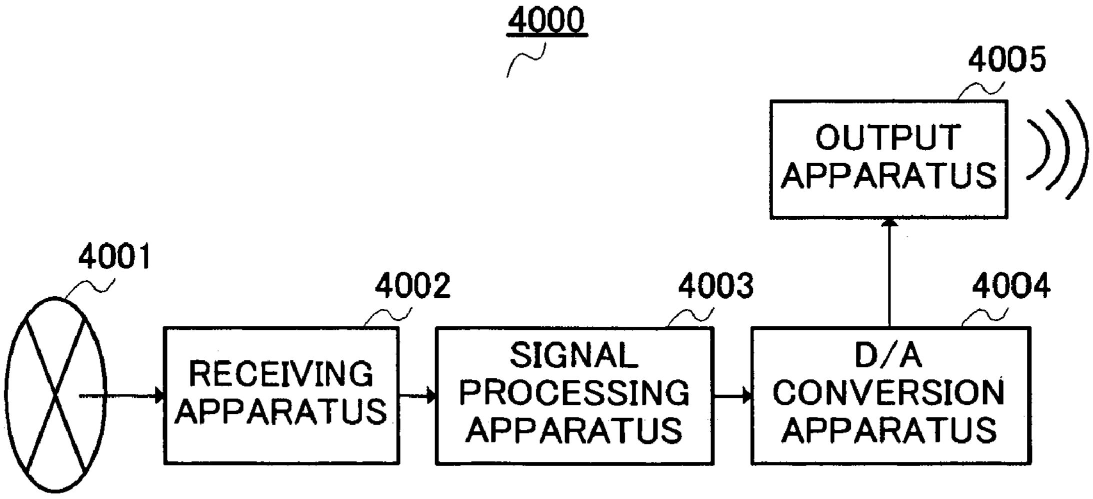
FIG. 41 is a block diagram showing the configuration of a communication apparatus according to Embodiment 16 of the present invention.

Embodiment 16 of the present invention will now be described with reference to the attached drawings. FIG. 41 is a block diagram showing the configuration of a communication apparatus according to Embodiment 16 of the present invention. A feature of this embodiment is that signal processing apparatus 4003 in FIG. 41 is configured as one of the sound decoding apparatuses shown in above-described Embodiment 1 through Embodiment 14.

As shown in FIG. 41, a communication apparatus 4000 according to Embodiment 16 of the present invention comprises a receiving apparatus 4002 connected to a network 4001, a signal processing apparatus 4003, a D/A conversion apparatus 4004, and an output apparatus 4005.

Receiving apparatus 4002 is connected to network 4001. An input terminal of signal processing apparatus 4003 is connected to an output terminal of receiving apparatus 4002. An input terminal of D/A conversion apparatus 4004 is connected to an output terminal of signal processing apparatus 4003. An input terminal of output apparatus 4005 is connected to an output terminal of D/A conversion apparatus 4004.

Receiving apparatus 4002 receives a digital coded acoustic signal from network 4001, generates a digital received acoustic signal, and supplies this received acoustic signal to signal processing apparatus 4003. Signal processing apparatus 4003 receives the received acoustic signal from receiving apparatus 4002, performs decoding processing on this received acoustic signal and generates a digital decoded acoustic signal, and supplies this digital decoded acoustic signal to D/A conversion apparatus 4004. D/A conversion apparatus 4004 converts the digital decoded speech signal from signal processing apparatus 4003 and generates an analog decoded speech signal, and supplies this analog decoded speech signal to output apparatus 4005. Output apparatus 4005 converts the analog decoded speech signal, which is an electrical signal, to air vibrations, and outputs these air vibrations so as to be audible to the human ear as a sound wave.

Thus, according to a communication apparatus of this embodiment, effects such as shown in above-described Embodiments 1 through 14 can be obtained in communications, and it is possible to decode an acoustic signal coded efficiently with a small number of bits, enabling a good acoustic signal to be output.

Embodiment 17

Figure 42:
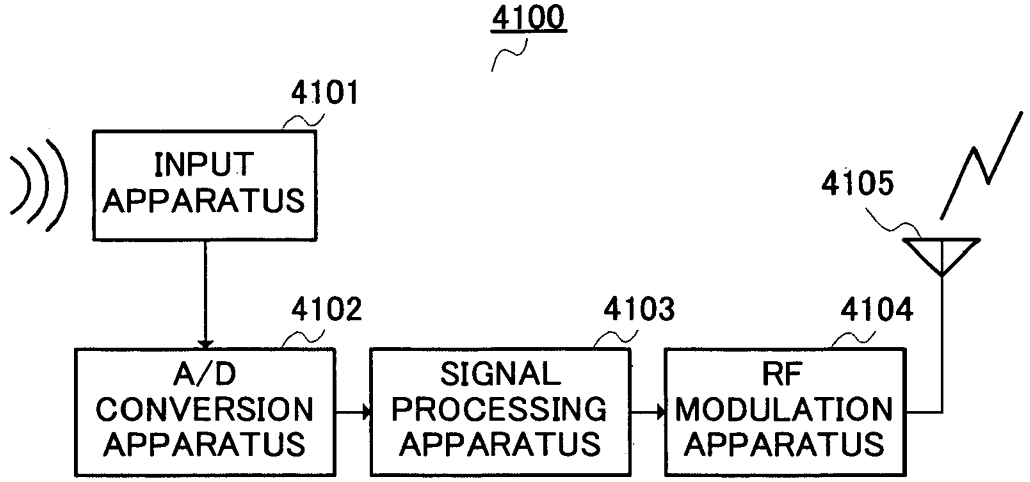
FIG. 42 is a block diagram showing the configuration of a communication apparatus according to Embodiment 17 of the present invention.

Embodiment 17 of the present invention will now be described with reference to the attached drawings. FIG. 42 is a block diagram showing the configuration of a communication apparatus according to Embodiment 17 of the present invention. A feature of this embodiment is that signal processing apparatus 4103 in FIG. 42 is configured as one of the sound coding apparatuses shown in above-described Embodiment 1 through Embodiment 14.

As shown in FIG. 42, a communication apparatus 4100 according to Embodiment 17 of the present invention comprises an input apparatus 4101, A/D conversion apparatus 4102, signal processing apparatus 4103, RF modulation apparatus 4104, and antenna 4105.

Input apparatus 4101 converts a sound wave audible to the human ear to an analog signal, which is an electrical signal, and supplies this analog signal to A/D conversion apparatus 4102. A/D conversion apparatus 4102 converts the analog signal to a digital signal, and supplies this digital signal to signal processing apparatus 4103. Signal processing apparatus 4103 encodes the input digital signal and generates a coded acoustic signal, and supplies this coded acoustic signal to RF modulation apparatus 4104. RF modulation apparatus 4104 modulates the coded acoustic signal and generates a modulated coded acoustic signal, and supplies this modulated coded acoustic signal to antenna 4105. Antenna 4105 transmits the modulated coded acoustic signal as a radio wave.

Thus, according to a communication apparatus of this embodiment, effects such as shown in above-described Embodiments 1 through 14 can be obtained in radio communications, and it is possible to code an acoustic signal efficiently with a small number of bits.

The present invention can be applied to a transmitting apparatus, transmit coding apparatus, or acoustic signal coding apparatus that uses audio signals. The present invention can also be applied to a mobile station apparatus or base station apparatus.

Embodiment 18

Figure 43:
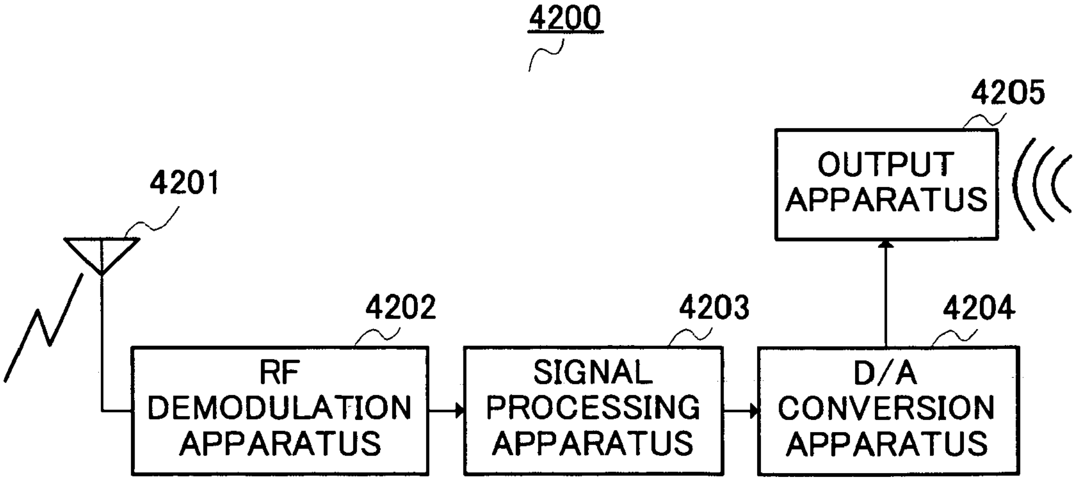
FIG. 43 is a block diagram showing the configuration of a communication apparatus according to Embodiment 18 of the present invention.

Embodiment 18 of the present invention will now be described with reference to the attached drawings. FIG. 43 is a block diagram showing the configuration of a communication apparatus according to Embodiment 18 of the present invention. A feature of this embodiment is that signal processing apparatus 4203 in FIG. 43 is configured as one of the sound decoding apparatuses shown in above-described Embodiment 1 through Embodiment 14.

As shown in FIG. 43, a communication apparatus 4200 according to Embodiment 18 of the present invention comprises an antenna 4201, RF demodulation apparatus 4202, signal processing apparatus 4203, D/A conversion apparatus 4204, and output apparatus 4205.

Antenna 4201 receives a digital coded acoustic signal as a radio wave, generates a digital received coded acoustic signal, which is an electrical signal, and supplies this digital received coded acoustic signal to RF demodulation apparatus 4202. RF demodulation apparatus 4202 demodulates the received coded acoustic signal from antenna 4201 and generates a demodulated coded acoustic signal, and supplies this demodulated coded acoustic signal to signal processing apparatus 4203.

Signal processing apparatus 4203 receives the digital demodulated coded acoustic signal from RF demodulation apparatus 4202, performs decoding processing and generates a digital decoded acoustic signal, and supplies this digital decoded acoustic signal to D/A conversion apparatus 4204. D/A conversion apparatus 4204 converts the digital decoded speech signal from signal processing apparatus 4203 and generates an analog decoded speech signal, and supplies this analog decoded speech signal to output apparatus 4205. Output apparatus 4205 converts the analog decoded speech signal, which is an electrical signal, to air vibrations, and outputs these air vibrations so as to be audible to the human ear as a sound wave.

Thus, according to a communication apparatus of this embodiment, effects such as shown in above-described Embodiments 1 through 14 can be obtained in radio communications, and it is possible to decode an acoustic signal coded efficiently with a small number of bits, enabling a good acoustic signal to be output.

The present invention can be applied to a receiving apparatus, receive decoding apparatus, or speech signal decoding apparatus that uses audio signals. The present invention can also be applied to a mobile station apparatus or base station apparatus.

The present invention is not limited to the above-described embodiments, and various variations and modifications may be possible without departing from the scope of the present invention. For example, in the above embodiments a case has been described in which the present invention is implemented as a signal processing apparatus, but the present invention is not limited to this, and this signal processing method can also be implemented as software.

For example, it is also possible for a program that executes the above-described signal processing method to be stored in ROM (Read Only Memory) beforehand, and forth is program to be operated by a CPU (Central Processing Unit).

It is also possible for a program that executes the above-described signal processing method to be stored in a computer-readable storage medium, for the program stored in the storage medium to be recorded in RAM (Random Access Memory) of a computer, and for the computer to be operated in accordance with that program.

In the above description, a case has been described in which MDCT is used as a method of transformation from the time domain to the frequency domain, but the present invention is not limited to this, and any transformation method can be applied as long as it is an orthogonal transformation method. For example, a discrete Fourier transform, discrete cosine transform or wavelet transform method can also be applied.

The present invention can be applied to a receiving apparatus, receive decoding apparatus, or speech signal decoding apparatus that uses audio signals. The present invention can also be applied to a mobile station apparatus or base station apparatus.

As is clear from the above description, according to a coding apparatus, decoding apparatus, coding method, and decoding method of the present invention, by performing enhancement layer coding using information obtained from base layer coding information, it is possible to perform high-quality coding at a low bit rate even in the case of a signal in which speech is predominant and music or environmental sound is superimposed in the background.

This application is based on Japanese Patent Application No. 2002-127541 filed on Apr. 26, 2002, and Japanese Patent Application No. 2002-267436 filed on Sep. 12, 2002, entire content of which is expressly incorporated by reference herein.

INDUSTRIAL APPLICABILITY

The present invention is suitable for use in apparatuses that code and decode speech signals, and communication apparatuses.

[FIG. 1]

ACOUSTIC DATA (INPUT SIGNAL)

101 DOWN-SAMPLER

102 BASE LAYER CODER

103 LOCAL DECODER

104 UP-SAMPLER

105 DELAYER

107 ENHANCEMENT LAYER CODER

108 MULTIPLEXER

CODED DATA (CODED SIGNAL)

[FIG. 2]

AMOUNT OF INFORMATION

BACKGROUND MUSIC AND BACKGROUND NOISE INFORMATION

VOICE INFORMATION

FREQUENCY

[FIG. 3]

AMOUNT OF INFORMATION

ENHANCEMENT LAYER

BASE LAYER

FREQUENCY

[FIG. 4]

FROM DOWN-SAMPLER 101
401 LPC ANALYZER
402 WEIGHTING SECTION
403 ADAPTIVE CODE BOOK SEARCH UNIT
404 ADAPTIVE GAIN QUANTIZER
405 TARGET VECTOR GENERATOR
406 NOISE CODE BOOK SEARCH UNIT
407 NOISE GAIN QUANTIZER
408 MULTIPLEXER

TO LOCAL DECODER 103 AND MULTIPLEXER 108

[FIG. 5]

FROM SUBTRACTER 106
501 LPC ANALYZER
502 SPECTRAL ENVELOPE CALCULATOR
503 MDCT SECTION
504 POWER CALCULATOR
505 POWER NORMALIZER
506 SPECTRUM NORMALIZER
507 BARK SCALE SHAPE CALCULATOR
508 BARK SCALE NORMALIZER
509 VECTOR QUANTIZER
510 MULTIPLEXER

TO MULTIPLEXER 108

[FIG. 6]

FROM SUBTRACTER 106
503 MDCT SECTION
504 POWER CALCULATOR
505 POWER NORMALIZER
506 SPECTRUM NORMALIZER
507 BARK SCALE SHAPE CALCULATOR
508 BARK SCALE NORMALIZER
509 VECTOR QUANTIZER
510 MULTIPLEXER

TO MULTIPLEXER 108

FROM LOCAL DECODER 103
601 CONVERSION TABLE
602 LPC COEFFICIENT MAPPING SECTION
603 SPECTRAL ENVELOPE CALCULATOR
604 TRANSFORMATION SECTION

[FIG. 7]

BASE LAYER LPC COEFFICIENTS

APPROXIMATION DETERMINATION.

MAPPING CODE BOOK

ENHANCEMENT LAYER LPC COEFFICIENT CANDIDATES

OUTPUT

[FIG. 8]

FROM SUBTRACTER 106
501 LPC ANALYZER
502 SPECTRAL ENVELOPE CALCULATOR
503 MDCT SECTION
504 POWER CALCULATOR
505 POWER NORMALIZER
506 SPECTRUM NORMALIZER

507 BARK SCALE SHAPE CALCULATOR
508 BARK SCALE NORMALIZER
509 VECTOR QUANTIZER
510 MULTIPLEXER

TO MULTIPLEXER 108

FROM LOCAL DECODER 103
801 SPECTRAL FINE STRUCTURE CALCULATOR

[FIG. 9]

FROM SUBTRACTER 106
501 LPC ANALYZER
502 SPECTRAL ENVELOPE CALCULATOR
503 MDCT SECTION
505 POWER NORMALIZER
506 SPECTRUM NORMALIZER
507 BARK SCALE SHAPE CALCULATOR
508 BARK SCALE NORMALIZER
509 VECTOR QUANTIZER
510 MULTIPLEXER

TO MULTIPLEXER 108

FROM LOCAL DECODER 103
901 POWER ESTIMATION UNIT
902 POWER FLUCTUATION AMOUNT QUANTIZER

[FIG. 10]

CODED DATA (CODED SIGNAL)
1001 DEMULTIPLEXER
1002 BASE LAYER DECODER
1003 UP-SAMPLER
1004 ENHANCEMENT LAYER DECODER
1005 DECODING RESULT

[FIG. 11]

FROM DEMULTIPLEXER 1001
1101 DEMULTIPLEXER
1102 EXCITATION GENERATOR
1103 SYNTHESIS FILTER

TO UP-SAMPLER 1003 AND ENHANCEMENT LAYER DECODER 1004

[FIG. 12]

FROM DEMULTIPLEXER 1001
1201 DEMULTIPLEXER
1202 LPC COEFFICIENT DECODER
1203 SPECTRAL ENVELOPE CALCULATOR
1204 VECTOR DECODER
1205 BARK SCALE SHAPE DECODER
1208 POWER DECODER
1210 IMDCT SECTION

TO ADDER 1005

[FIG. 13]

FROM DEMULTIPLEXER 1001
1201 DEMULTIPLEXER
1204 VECTOR DECODER
1205 BARK SCALE SHAPE DECODER
1208 POWER DECODER
1210 IMDCT SECTION

TO ADDER 1005

FROM BASE LAYER DECODER 1002
1301 CONVERSION TABLE
1302 LPC COEFFICIENT MAPPING SECTION

1303 SPECTRAL ENVELOPE CALCULATOR
1304 TRANSFORMATION SECTION

[FIG. 14]

FROM DEMULTIPLEXER 1001
1201 DEMULTIPLEXER
1202 LPC COEFFICIENT DECODER
1203 SPECTRAL ENVELOPE CALCULATOR
1204 VECTOR DECODER
1205 BARK SCALE SHAPE DECODER
1208 POWER DECODER
1210 IMDCT SECTION

TO ADDER 1005

FROM BASE LAYER DECODER 1002
1401 SPECTRAL FINE STRUCTURE CALCULATOR

[FIG. 15]

FROM DEMULTIPLEXER 1001
1201 DEMULTIPLEXER
1202 LPC COEFFICIENT DECODER
1203 SPECTRAL ENVELOPE CALCULATOR
1204 VECTOR DECODER
1205 BARK SCALE SHAPE DECODER
1210 IMDCT SECTION

TO ADDER 1005

FROM BASE LAYER DECODER 1002
1501 POWER ESTIMATION UNIT
1502 POWER FLUCTUATION AMOUNT DECODER
1503 POWER GENERATOR

[FIG. 16]

INPUT SIGNAL
1601 DOWN-SAMPLER
1602 BASE LAYER CODER
1603 LOCAL DECODER
1604 UP-SAMPLER
1605 DELAYER
1607 FREQUENCY DETERMINATION SECTION
1608 ENHANCEMENT LAYER CODER
1609 MULTIPLEXER

[FIG. 17]

AMOUNT OF INFORMATION

BACKGROUND MUSIC AND BACKGROUND NOISE INFORMATION

VOICE INFORMATION

FREQUENCY

[FIG. 18]

AMOUNT OF INFORMATION

ENHANCEMENT LAYER

BASE LAYER

FREQUENCY

[FIG. 19]

AMPLITUDE

MASKING M(m)

RESIDUAL ERROR E(m)

FREQUENCY

REGIONS REQUIRING QUANTIZATION

REGIONS NOT REQUIRING QUANTIZATION

[FIG. 20]

FROM UP-SAMPLER 1604
1901 FFT SECTION
1902 ESTIMATED AUDITORY MASKING CALCULATOR
1903 DETERMINATION SECTION

TO ENHANCEMENT LAYER CODER 1608

[FIG. 21]

FROM FFT SECTION 1901
2001 BARK SPECTRUM CALCULATOR
2002 SPREAD FUNCTION CONVOLUTION UNIT
2003 TONALITY CALCULATOR
2004 AUDITORY MASKING CALCULATOR

TO DETERMINATION SECTION 1903

[FIG. 22]

FROM SUBTRACTER 1606
2101 MDCT SECTION
2102 MDCT COEFFICIENT QUANTIZER

TO MULTIPLEXER 1609

FROM FREQUENCY DETERMINATION SECTION 1607

[FIG. 23]

FROM UP-SAMPLER 1604
2201 MDCT SECTION
1902 ESTIMATED AUDITORY MASKING CALCULATOR
1903 DETERMINATION SECTION

TO ENHANCEMENT LAYER CODER 1608

[FIG. 24]

CODED DATA
2301 DEMULTIPLEXER
2302 BASE LAYER DECODER
2303 UP-SAMPLER
2304 FREQUENCY DETERMINATION SECTION
2305 ENHANCEMENT LAYER DECODER

[FIG. 25]

FROM FREQUENCY DETERMINATION SECTION 2304

FROM DEMULTIPLEXER 2301
2401 MDCT COEFFICIENT DECODER
2402 IMDCT SECTION
2403 SUPERIMPOSITION ADDER

TO ADDER 2306

[FIG. 26]

FROM DOWN-SAMPLER 1601
2501 LPC ANALYZER
2502 WEIGHTING SECTION
2503 ADAPTIVE CODE BOOK SEARCH UNIT
2504 ADAPTIVE GAIN QUANTIZER
2505 TARGET VECTOR GENERATOR
2506 NOISE CODE BOOK SEARCH UNIT
2507 NOISE GAIN QUANTIZER
2508 MULTIPLEXER

TO LOCAL DECODER 1603 AND MULTIPLEXER 1609

[FIG. 27]

FROM DEMULTIPLEXER 2301
2601 DEMULTIPLEXER

2602 EXCITATION GENERATOR
2603 SYNTHESIS FILTER

TO UP-SAMPLER 2303

[FIG. 28]

FROM DEMULTIPLEXER 2301
2601 DEMULTIPLEXER
2602 EXCITATION GENERATOR
2603 COMBINING FILTER
2701 POST-FILTER

TO UP-SAMPLER 2303

[FIG. 29]

FROM UP-SAMPLER 1604
1901 FFT SECTION
1902 ESTIMATED AUDITORY MASKING CALCULATOR
2801 ESTIMATED ERROR SPECTRUM CALCULATOR
2802 DETERMINATION SECTION

TO ENHANCEMENT LAYER CODER 1608

[FIG. 30]

AMPLITUDE

FREQUENCY
P(m): BASE LAYER DECODED SIGNAL SPECTRUM
E(m): ERROR SPECTRUM
E'(m): ESTIMATED ERROR SPECTRUM

[FIG. 31]

FROM UP-SAMPLER 1604
1901 FFT SECTION
1902 ESTIMATED AUDITORY MASKING CALCULATOR
3001 ESTIMATED AUDITORY MASKING CORRECTION SECTION FROM LOCAL DECODER 1603
3002 DETERMINATION SECTION

TO ENHANCEMENT LAYER CODER 1608

[FIG. 32]

FROM UP-SAMPLER 1604
1901 FFT SECTION
1902 ESTIMATED AUDITORY MASKING CALCULATOR
2801 ESTIMATED ERROR SPECTRUM CALCULATOR
3001 ESTIMATED AUDITORY MASKING CORRECTION SECTION FROM LOCAL DECODER 1603
3101 DETERMINATION SECTION

TO ENHANCEMENT LAYER CODER 1608

[FIG. 33]

FROM SUBTRACTER 1606
2101 MDCT SECTION

FROM FREQUENCY DETERMINATION SECTION 1607
3201 ORDERING SECTION
3202 MDCT COEFFICIENT QUANTIZER

TO MULTIPLEXER 1609

[FIG. 34]

FREQUENCY (m)

ESTIMATED DISTORTION VALUE D(m)

ORDER

[FIG. 35]

FROM FREQUENCY DETERMINATION SECTION 2304
3401 ORDERING SECTION

FROM DEMULTIPLEXER 2301
3402 MDCT COEFFICIENT DECODER
2402 IMDCT SECTION
2403 SUPERIMPOSITION ADDER

TO ADDER 2306

[FIG. 36]

FROM SUBTRACTER 1606
2101 MDCT SECTION

FROM FREQUENCY DETERMINATION SECTION 1607
3502 MDCT COEFFICIENT QUANTIZER

TO MULTIPLEXER 1609
3501 FIXED BAND SPECIFICATION SECTION

[FIG. 37]

FROM FREQUENCY DETERMINATION SECTION 2304

FROM DEMULTIPLEXER 2301
3601 FIXED BAND SPECIFICATION SECTION
3602 MDCT COEFFICIENT DECODER
2402 IMDCT SECTION
2403 SUPERIMPOSITION ADDER

TO ADDER 2306

[FIG. 38]

FROM SUBTRACTER 1606
2101 MDCT SECTION

FROM FREQUENCY DETERMINATION SECTION 1607
3201 ORDERING SECTION
3701 MDCT COEFFICIENT QUANTIZER

TO MULTIPLEXER 1609
3501 FIXED BAND SPECIFICATION SECTION

[FIG. 39]

FROM FREQUENCY DETERMINATION SECTION 2304
3401 ORDERING SECTION

FROM DEMULTIPLEXER 2301
3601 FIXED BAND SPECIFICATION SECTION
3801 MDCT COEFFICIENT DECODER
2402 IMDCT SECTION
2403 SUPERIMPOSITION ADDER

TO ADDER 2306

[FIG. 40]
3901 INPUT APPARATUS
3902 A/D CONVERSION APPARATUS
3903 SIGNAL PROCESSING APPARATUS

[FIG. 41]
4002 RECEIVING APPARATUS
4003 SIGNAL PROCESSING APPARATUS
4004 D/A CONVERSION APPARATUS
4005 OUTPUT APPARATUS

[FIG. 42]
4101 INPUT APPARATUS
4102 A/D CONVERSION APPARATUS
4103 SIGNAL PROCESSING APPARATUS
4104 RF MODULATION APPARATUS

[FIG. 43]

4202 RF DEMODULATION APPARATUS

4203 SIGNAL PROCESSING APPARATUS

4204 D/A CONVERSION APPARATUS

4205 OUTPUT APPARATUS

The invention claimed is:

1. A sound coding apparatus comprising:

a first coder that performs weighting on an input signal to mask a spectrum of quantization distortion by a spectral envelope of the input signal, and thereafter encodes the input signal and obtains first coding information;

a decoder that decodes the first coding information outputted from the first coder and obtains a decoded signal;

a computer processor that calculates an auditory masking threshold for a decoded spectrum that is obtained from the decoded signal outputted from the decoder, generates an estimated error spectrum by calculating an equation using the decoded spectrum, compares the estimated error spectrum with the auditory masking threshold, and specifics a frequency region in the estimated error spectrum showing an amplitude equal to or greater than the auditory masking threshold;

a subtracter that obtains a residual error signal of the input signal and the decoded signal; and a second coder that encodes the frequency region in the residual error signal outputted from the subtracter specified by the computer processor, and obtains second coding information, wherein:

the equation is expressed as:

$$E'(m)=a\cdot P(m)^{\gamma}$$

where

E'(m) is the estimated error spectrum,

P(m) is the decoded spectrum, and a and γ are constants of 0 or above and less than 1.

2. The sound coding apparatus according to claim 1, wherein:

with respect to the input signal, the first coder encodes a low frequency region; and with respect to the residual signal, the second coder encodes the frequency region in a low frequency region specified by the computer processor, and encodes a predetermined region in a high frequency region.

3. The sound coding apparatus according to claim 1, wherein the second coder finds a difference from the auditory masking threshold value every frequency and determines a distribution of encoded bits based on the differences.

4. The sound coding apparatus according to claim 1, wherein the computer processor normalizes the auditory masking threshold and specifies a frequency region showing an amplitude equal to or greater than the normalized auditory masking threshold.

5. The sound coding apparatus according to claim 1, wherein:

the first coder performs encoding using a code excited linear prediction method; and the second coder performs encoding using a modified discrete cosine transform method.

6. A sound signal decoding apparatus comprising:

a first decoder that decodes first coding information obtained in the sound coding apparatus of claim 1, and obtains a first decoded signal;

a computer processor that calculates an auditory masking threshold for a decoded spectrum that is obtained from the first decoded signal outputted from the first decoder, generates an estimated error spectrum by calculating an equation using the decoded spectrum, compares the estimated error spectrum with the auditory masking threshold, and specifies a frequency region in the estimated error spectrum showing an amplitude equal to or greater than the auditory masking threshold;

a second decoder that decodes the frequency region in second coding information obtained in the sound coding apparatus of claim 1 specified by the computer processor, and obtains a second decoded signal; and an adder that adds the first decoded signal outputted from the first decoder and the second decoded signal outputted from the second decoder and obtains a sound signal, wherein:

the equation is expressed as:

$$E'(m)=a\cdot P(m)^{\gamma}$$

where

E'(m) is the estimated error spectrum,

P(m) is the decoded spectrum, and a and γ are constants of 0 or above and less than 1.

7. The sound decoding apparatus according to claim 6, wherein:

the first decoder decodes the first coding information and obtains the decoded signal of a low frequency region; and with respect to the second coding information, in the low frequency region, the second decoder decodes the frequency region specified by the computer processor, and decodes a predetermined frequency region in a high frequency region.

8. The sound decoding apparatus according to claim 6, wherein the second decoder finds a difference from the auditory masking threshold value every frequency and determines a distribution of encoded bits based on the differences.

9. The sound decoding apparatus according to claim 6, wherein the computer processor normalizes the auditory masking threshold and specifies a frequency region showing an amplitude equal to or greater than the normalized auditory masking threshold.

10. The sound decoding apparatus according to claim 6, wherein:

the first decoder performs decoding using a code excited linear prediction method; and the second decoder performs decoding using an inverse modified discrete cosine transform method.

11. A communication terminal apparatus comprising one of the sound coding apparatus of claim 1 and the sound decoding apparatus of claim 6.

12. A base station apparatus comprising one of the sound coding apparatus of claim 1 and the sound decoding apparatus of claim 6.

13. A sound coding method comprising:

a first coding step, in a first coder, of performing weighting on an input signal to mask a spectrum of quantization distortion by a spectral envelope of the input signal, and thereafter encoding the input signal and obtaining first coding information;

a decoding step, in a decoder, of decoding the first coding information and obtaining a decoded signal;

a specifying step, in a specificator, of calculating an auditory masking threshold for a decoded spectrum that is obtained from the decoded signal, generating an estimated error spectrum by calculating an equation using the decoded spectrum, comparing the estimated error spectrum with the auditory masking threshold, and specifying a frequency region in the estimated error spectrum showing an amplitude equal to or greater than the auditory masking threshold;

a subtracting step, in a subtracter, of obtaining a residual error signal of the input signal and the decoded signal; and a second coding step, in a second coder, of encoding the frequency region in the residual error signal specified in the specifying step, and obtaining second coding information, wherein:

the equation is expressed as:

$$E'(m)=a\cdot P(m)^{\gamma}$$

where

E'(m) is the estimated error spectrum,

P(m) is the decoded spectrum, and a and γ are constants of 0 or above and less than 1.

14. A sound decoding method comprising:

a first decoding step, in a first decoder, of decoding first coding information obtained by the sound coding method of claim 13, and obtaining a first decoded signal;

a specifying step, in a specificator, of calculating an auditory masking threshold for a decoded spectrum that is obtained from the first decoded signal, generating an estimated error spectrum by calculating an equation using the decoded spectrum, comparing the estimated error spectrum with the auditory masking threshold, and specifying a frequency region in the estimated error spectrum showing an amplitude equal to or greater than the auditory masking threshold;

a second decoding step, in a second decoder, of decoding the frequency region in second coding information obtained by the sound coding method of claim 13 specified in the specifying step, and obtaining a second decoded signal; and an adding step, in an adder, of adding the first decoded signal and the second decoded signal and obtaining a sound signal, wherein:

the equation is expressed as:

$$E'(m)=a\cdot P(m)^{\gamma}$$

where

E'(m) is the estimated error spectrum,

P(m) is the decoded spectrum, and a and γ are constants of 0 or above and less than 1.

* * * * *